United States Patent
Duan et al.

(10) Patent No.: US 11,929,923 B2
(45) Date of Patent: Mar. 12, 2024

(54) PACKET TRANSMISSION METHOD AND APPARATUS

(71) Applicant: Huawei Technologies Co., Ltd., Shenzhen (CN)

(72) Inventors: Fanghong Duan, Nanjing (CN); Jingrong Xie, Beijing (CN); Zhidan Zhu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/327,556

(22) Filed: Jun. 1, 2023

(65) Prior Publication Data

US 2023/0308386 A1     Sep. 28, 2023

Related U.S. Application Data

(63) Continuation of application No. PCT/CN2021/134943, filed on Dec. 2, 2021.

(30) Foreign Application Priority Data

Dec. 2, 2020 (CN) .......................... 202011393626.5
Apr. 14, 2021 (CN) .......................... 202110400461.8
Jun. 30, 2021 (CN) .......................... 202110739631.5

(51) Int. Cl.
    *H04L 45/42*     (2022.01)
    *H04L 45/655*     (2022.01)
    *H04L 45/748*     (2022.01)

(52) U.S. Cl.
    CPC ............ *H04L 45/42* (2013.01); *H04L 45/655* (2022.05); *H04L 45/748* (2013.01)

(58) Field of Classification Search
    CPC ...... H04L 45/42; H04L 45/655; H04L 45/748

USPC .......................................................... 709/238
See application file for complete search history.

(56) References Cited

U.S. PATENT DOCUMENTS

| | | | | |
|---|---|---|---|---|
| 9,712,458 | B2 * | 7/2017 | Wijnands | H04L 49/201 |
| 9,832,031 | B2 * | 11/2017 | Zhao | H04L 43/0811 |
| 10,476,691 | B2 * | 11/2019 | Xu | H04L 45/745 |
| 10,574,589 | B2 * | 2/2020 | Kotalwar | H04L 12/185 |
| 10,637,675 | B2 * | 4/2020 | Wijnands | H04L 12/1886 |
| 10,644,900 | B2 * | 5/2020 | Zhang | H04L 12/1836 |
| 10,764,082 | B2 * | 9/2020 | Bidgoli | H04L 12/2861 |
| 10,841,111 | B2 * | 11/2020 | Zhang | H04L 45/16 |
| 10,855,576 | B2 * | 12/2020 | Zhang | H04L 12/4641 |
| 10,887,209 | B2 * | 1/2021 | Nainar | H04L 69/22 |
| 11,038,790 | B2 * | 6/2021 | Nainar | H04L 43/0823 |
| 11,050,657 | B2 * | 6/2021 | Zhang | H04L 12/184 |
| 11,070,464 | B2 * | 7/2021 | Goud Gadela | H04L 45/24 |
| 11,115,329 | B1 * | 9/2021 | Mishra | H04L 45/16 |
| 11,196,580 | B2 * | 12/2021 | Peng | H04L 12/185 |

(Continued)

OTHER PUBLICATIONS

Previdi, S. et al., "A Policy Control Mechanism in IS-IS Using Administrative Tags," Network Working Group; Request for Comments: 5130, Feb. 2008, 8 pages.

(Continued)

*Primary Examiner* — Melvin H Pollack
(74) *Attorney, Agent, or Firm* — Slater Matsil, LLP

(57) ABSTRACT

In accordance with an embodiment, a packet transmission method includes receiving, by a second provider edge (PE) through a multicast tunnel, a bit indexed explicit replication (BIER) packet sent by a first PE, wherein the BIER packet comprises a bit string, and the bit string indicates a customer edge (CE) designated to receive the BIER packet; and processing, by the second PE based on the bit string, the BIER packet.

21 Claims, 30 Drawing Sheets

(56) References Cited

U.S. PATENT DOCUMENTS

| | | | |
|---|---|---|---|
| 11,233,724 B2 * | 1/2022 | Xie | H04L 45/24 |
| 11,394,578 B2 * | 7/2022 | Bidgoli | H04L 45/16 |
| 11,405,307 B2 * | 8/2022 | Zhang | H04L 12/1886 |
| 11,451,474 B2 * | 9/2022 | Wijnands | H04L 45/7453 |
| 11,483,237 B2 * | 10/2022 | Dutta | H04L 47/724 |
| 11,627,070 B2 * | 4/2023 | Zhu | H04L 45/16 |
| | | | 370/389 |
| 11,792,044 B2 * | 10/2023 | Dutta | H04L 12/4641 |
| | | | 370/254 |
| 2020/0245206 A1 * | 7/2020 | Allan | H04L 45/04 |
| 2021/0243111 A1 * | 8/2021 | Dutta | H04L 45/745 |
| 2022/0045938 A1 * | 2/2022 | Senoo | H04L 12/1881 |
| 2022/0150155 A1 * | 5/2022 | Xiong | H04L 45/12 |
| 2023/0155932 A1 * | 5/2023 | Zhang | H04L 45/04 |
| | | | 709/238 |
| 2023/0231780 A1 * | 7/2023 | Qiu | H04L 12/1863 |
| | | | 370/252 |
| 2023/0336459 A1 * | 10/2023 | Zhang | H04L 45/306 |

OTHER PUBLICATIONS

Zhang, Z. et al., "BIER Prefix Redistribute: draft-ietf-bier-prefix-redistribute-00", BIER Internet-Draft, Aug. 4, 2020, 23 pages.

Ginsberg, Ed. L. et al., "Bit Index Explicit Replication (BIER) Support via IS-IS," Internet Engineering Task Force (IETF); Request for Comments: 8401, Jun. 2018, 12 pages.

Psenak, Ed. L, et al,, "OSPFv2 Extensions for Bit Index Explicit Replication (BIER)," Internet Engineering Task Force (IETF); Request for Comments: 8444, Nov. 2018, 12 pages.

* cited by examiner

| Local VPN identifier | BFR ID | Next hop | Neighbor type |
|---|---|---|---|
| First VPN instance | 4 | CE4 | Directly connected |
| First VPN instance | 2 | PE2 | Remote |
| First VPN instance | 3 | PE3 | Remote |

PACKET TRANSMISSION METHOD AND APPARATUS

CROSS-REFERENCE TO RELATED APPLICATIONS

This application is a continuation of International Application No. PCT/CN2021/134943, filed on Dec. 2, 2021, which claims priorities to Chinese Patent Application No. 202011393626.5, filed on Dec. 2, 2020, and Chinese Patent Application No. 202110400461.8, filed on Apr. 14, 2021, and Chinese Patent Application No. 202110739631.5, filed on Jun. 30, 2021. All of the aforementioned applications are hereby incorporated by reference in their entireties.

TECHNICAL FIELD

Embodiments of this application relate to the field of communication technologies, and in particular, to a packet transmission method and apparatus.

BACKGROUND

As a technology applied to construct a multicast packet forwarding path in the communication field, a bit indexed explicit replication (BIER) technology is widely applied because no multicast distribution tree needs to be constructed. In a related technology, the BIER technology is mainly applied in a provider network, and a protocol independent multicast (PIM) protocol is deployed in a customer network, so that packets between different customer sides in the customer network can be transmitted in the provider network by using the BIER technology. A large quantity of packets need to be maintained in the provider network. As a result, the network is overloaded and scalability is poor.

SUMMARY

This application provides a packet transmission method and apparatus, to transmit a BIER packet between user equipments across provider networks, thereby improving network extensibility, and reducing a load of the provider network.

According to a first aspect, a packet transmission method is provided. The method is applied to a second provider edge (PE), and includes: The second PE receives, through a multicast tunnel, a BIER packet sent by a first PE, where the BIER packet includes a bit string, and the bit string indicates a customer edge (CE) that receives the BIER packet. The second PE processes, based on the bit string, the BIER packet sent to the CE.

According to the technical solution provided in this application, a customer BIER packet is transmitted between PEs, so that the BIER packet can be transmitted across provider networks, thereby improving network extensibility and reducing a load of the provider network. In addition, the BIER packet is transmitted through the multicast tunnel, so that an occupied bandwidth can be reduced, and network bandwidth utilization can be improved.

In a possible implementation, that the second PE processes, based on the bit string, the BIER packet sent to the CE includes: The second PE determines that the second PE has a forwarding priority for the CE. The second PE sends the BIER packet to the CE based on the bit string. After receiving the BIER packet, the second PE sends the BIER packet when determining that the second PE has a forwarding priority, so as to prevent a plurality of PEs from sending a same BIER packet to a same CE.

In a possible implementation, that the second PE determines that the second PE has a forwarding priority for the CE includes: The second PE obtains a router identifier of a third PE communicating with the CE. The second PE determines, based on a router identifier of the second PE and the router identifier of the third PE, that the second PE has a forwarding priority for the CE.

In a possible implementation, that the second PE determines that the second PE has a forwarding priority for the CE includes: The second PE obtains a priority value of a third PE communicating with the CE. The second PE determines, based on a priority value of the second PE and the priority value of the third PE, that the second PE has a forwarding priority for the CE. Whether a PE has a forwarding priority for a CE is determined based on a router identifier or a priority value, and a determining manner is flexible.

In a possible implementation, that the second PE determines that the second PE has a forwarding priority for the CE further includes: The second PE obtains a first forwarding bit mask based on a bit-forwarding router identifier BFR ID of the CE, where the first forwarding bit mask indicates to send the BIER packet to the CE.

In a possible implementation, that the second PE sends the BIER packet to the CE based on the bit string includes: The second PE performs an AND operation on the bit string and the first forwarding bit mask, and sends the BIER packet to the CE when a result of the AND operation is not zero.

In a possible implementation, that the second PE processes, based on the bit string, the BIER packet sent to the CE includes: The second PE determines that the second PE has no forwarding priority for the CE. The second PE skips sending the BIER packet to the CE. After receiving the BIER packet, the second PE does not send the BIER packet when determining that the second PE has no forwarding priority, so as to prevent a plurality of PEs from sending a same BIER packet to a same CE.

In a possible implementation, that the second PE determines that the second PE has no forwarding priority for the CE includes: The second PE obtains a router identifier of a third PE communicating with the CE. The second PE determines, based on a router identifier of the second PE and the router identifier of the third PE, that the second PE has no forwarding priority for the CE.

In a possible implementation, that the second PE determines that the second PE has no forwarding priority for the CE includes: The second PE obtains a priority value of a third PE communicating with the CE. The second PE determines, based on a priority value of the second PE and the priority value of the third PE, that the second PE has no forwarding priority for the CE.

In a possible implementation, that the second PE determines that the second PE has no forwarding priority for the CE further includes: The second PE obtains a second forwarding bit mask, where the second forwarding bit mask indicates not to send the BIER packet to the CE.

In a possible implementation, that the second PE skips sending the BIER packet to the CE includes: The second PE performs an AND operation on the bit string and the second forwarding bit mask, and skips sending the BIER packet to the CE when a result of the AND operation is zero.

In a possible implementation, the multicast tunnel includes: an internet protocol version 6 (IPv6) multicast tunnel, an internet protocol version 4 (IPv4) multicast tunnel, a multiprotocol label switching (MPLS) multicast tunnel, a virtual extensible local area network (VXLAN) multicast tunnel, a BIER multicast tunnel, or an ingress replication (IR) tunnel. There are various types of multicast tunnels, and a corresponding multicast tunnel type may be selected according to a specific application scenario, so as to improve flexibility.

In a possible implementation, the method further includes: The second PE sends a routing message to the first PE, where the routing message includes a type of the multicast tunnel and an identifier of the second PE, and the identifier of the second PE is for addressing the second PE.

In a possible implementation, the first PE is located in a first network and a provider network, the provider network is connected to the first network and a second network, the second PE is located in the second network and the provider network, and the CE that receives the BIER packet is located in the second network.

According to a second aspect, a packet transmission method is provided. The method is applied to a first PE, and includes: The first PE obtains a BIER packet, where the BIER packet includes a bit string, and the bit string indicates a CE that receives the BIER packet. The first PE sends the BIER packet to a second PE corresponding to the CE through a multicast tunnel based on the bit string.

According to the technical solution provided in this application, a first PE obtains a bit string indicating a CE that receives a BIER packet, and then sends a BIER packet including the bit string to a second PE. In this way, a customer-side BIER packet is transmitted between PEs, so that the BIER packet can be transmitted across provider networks, thereby improving network extensibility and reducing a load of the provider network. In addition, the BIER packet is transmitted through the multicast tunnel, so that an occupied bandwidth can be reduced, and network bandwidth utilization can be improved.

In a possible implementation, that the first PE sends the BIER packet to a second PE corresponding to the CE through a multicast tunnel based on the bit string includes: The first PE obtains an identifier of the second PE based on the bit string. The first PE performs tunnel encapsulation on the BIER packet based on the identifier of the second PE, to obtain an encapsulated BIER packet, where an encapsulation format included in the encapsulated BIER packet matches the multicast tunnel. The first PE sends the encapsulated BIER packet to the second PE through the multicast tunnel. Tunnel encapsulation is performed on the BIER packet based on the identifier of the second PE, and the encapsulation format included in the encapsulated BIER packet matches the multicast tunnel, so that the BIER packet can be normally transmitted in the multicast tunnel, and the second PE can identify the BIER packet.

In a possible implementation, the multicast tunnel includes: an IPv6 multicast tunnel, an IPv4 multicast tunnel, an MPLS multicast tunnel, a VXLAN multicast tunnel, a BIER multicast tunnel, or an IR tunnel. There are various types of multicast tunnels, and selection may be performed based on an application scenario, thereby improving flexibility of this method.

In a possible implementation, the method further includes: The first PE receives a routing message sent by the second PE, where the routing message sent by the second PE includes a type of the multicast tunnel and the identifier of the second PE, and the identifier of the second PE is for addressing the second PE. The type of the multicast tunnel and the identifier of the second PE are sent to the first PE through the routing message, so that the first PE can address the second PE and perform encapsulation that matches the tunnel.

According to a third aspect, a packet transmission apparatus is provided. The apparatus is used in a second PE, and the apparatus includes:

a receiving module, configured to receive, through a multicast tunnel, a bit indexed explicit replication BIER packet sent by a first PE, where the BIER packet includes a bit string, and the bit string indicates a customer edge CE that receives the BIER packet; and a processing module, configured to process, based on the bit string, the BIER packet sent to the CE.

In a possible implementation, the processing module is configured to determine that the second PE has a forwarding priority for the CE; and send the BIER packet to the CE based on the bit string.

In a possible implementation, the processing module is configured to obtain a router identifier of a third PE communicating with the CE; and determine, based on a router identifier of the second PE and the router identifier of the third PE, that the second PE has a forwarding priority for the CE.

In a possible implementation, the processing module is configured to obtain a priority value of a third PE communicating with the CE; and determine, based on a priority value of the second PE and the priority value of the third PE, that the second PE has a forwarding priority for the CE.

In a possible implementation, the processing module is further configured to obtain a first forwarding bit mask based on a bit-forwarding router identifier BFR ID of the CE, where the first forwarding bit mask indicates to send the BIER packet to the CE.

In a possible implementation, the processing module is configured to perform an AND operation on the bit string and the first forwarding bit mask, and send the BIER packet to the CE when a result of the AND operation is not zero.

In a possible implementation, the processing module is configured to determine that the second PE has no forwarding priority for the CE; and skip sending the BIER packet to the CE.

In a possible implementation, the processing module is configured to obtain a router identifier of a third PE communicating with the CE; and determine, based on a router identifier of the second PE and the router identifier of the third PE, that the second PE has no forwarding priority for the CE.

In a possible implementation, the processing module is configured to obtain a priority value of a third PE communicating with the CE; and determine, based on a priority value of the second PE and the priority value of the third PE, that the second PE has no forwarding priority for the CE.

In a possible implementation, the processing module is further configured to obtain a second forwarding bit mask, where the second forwarding bit mask indicates not to send the BIER packet to the CE.

In a possible implementation, the processing module is configured to perform an AND operation on the bit string and the second forwarding bit mask, and skip sending the BIER packet to the CE when a result of the AND operation is zero.

In a possible implementation, the multicast tunnel includes: an internet protocol version 6 IPv6 multicast tunnel, an internet protocol version 4 IPv4 multicast tunnel, a multiprotocol label switching MPLS multicast tunnel, a virtual extensible local area network VXLAN multicast tunnel, a BIER multicast tunnel, or an IR tunnel.

In a possible implementation, the processing module is further configured to send a routing message to the first PE, where the routing message includes a type of the multicast tunnel and an identifier of the second PE, and the identifier of the second PE is for addressing the second PE.

According to a fourth aspect, a packet transmission apparatus is provided. The apparatus is used in a first PE, and the apparatus includes:

an obtaining module, configured to obtain a BIER packet, where the BIER packet includes a bit string, and the bit string indicates a customer edge CE that receives the BIER packet; and a sending module, configured to send the BIER packet to a second PE corresponding to the CE through a multicast tunnel based on the bit string.

In a possible implementation, the sending module is configured to obtain an identifier of the second PE based on the bit string; perform tunnel encapsulation on the BIER packet based on the identifier of the second PE, to obtain an encapsulated BIER packet, where an encapsulation format included in the encapsulated BIER packet matches the multicast tunnel; and send the encapsulated BIER packet to the second PE through the multicast tunnel.

In a possible implementation, the multicast tunnel includes: an IPv6 multicast tunnel, an IPv4 multicast tunnel, an MPLS multicast tunnel, a VXLAN multicast tunnel, a BIER multicast tunnel, or an IR tunnel.

In a possible implementation, the apparatus further includes:

a receiving module, configured to receive a routing message sent by the second PE, where the routing message sent by the second PE includes a type of the multicast tunnel and the identifier of the second PE, and the identifier of the second PE is for addressing the second PE.

According to a fifth aspect, a packet transmission device is provided, where the packet transmission device includes a processor, the processor is coupled to a memory, the memory stores at least one instruction, and the at least one instruction is loaded and executed by the processor, so that the packet transmission device implements the packet transmission method according to any one of the first aspect and the second aspect, or the packet transmission method according to any possible implementation of any one of the first aspect and the second aspect.

According to a sixth aspect, a computer-readable storage medium is provided, where the computer-readable storage medium stores at least one instruction, and the instruction is loaded and executed by a processor, so that a computer implements the packet transmission method according to any one of the first aspect and the second aspect, or the packet transmission method according to any possible implementation of any one of the first aspect and the second aspect.

According to a seventh aspect, a computer program product is provided, including a computer program or code. When the computer program or code is executed by a computer, the packet transmission method according to any one of the first aspect and the second aspect, or the packet transmission method according to any possible implementation of any one of the first aspect and the second aspect is implemented.

According to an eighth aspect, a communication apparatus is provided. The apparatus includes a transceiver, a memory, and a processor. The transceiver, the memory, and the processor communicate with each other by using an internal connection path. The memory is configured to store instructions. The processor is configured to execute the instructions stored in the memory, to control the transceiver to receive a signal and control the transceiver to send a signal. When the processor executes the instructions stored in the memory, the processor is enabled to perform the packet transmission method according to any one of the first aspect and the second aspect, or the packet transmission method according to any possible implementation of any one of the first aspect and the second aspect.

In an example embodiment, there are one or more processors, and there are one or more memories.

In an example embodiment, the memory and the processor may be integrated together, or the memory and the processor are disposed separately.

In a specific implementation process, the memory may be a non-transitory memory, for example, a read-only memory (ROM), and the memory and the processor may be integrated on a same chip, or may be separately disposed on different chips. A type of the memory and a manner of disposing the memory and the processor are not limited in this embodiment of this application.

According to a ninth aspect, a chip is provided, including a processor configured to invoke, from a memory, instructions stored in the memory and run the instructions, so that a communication device on which the chip is installed performs the packet transmission method according to any one of the first aspect and the second aspect, or the packet transmission method according to any possible implementation of any one of the first aspect and the second aspect.

According to a tenth aspect, another chip is provided, including an input interface, an output interface, a processor, and a memory. The input interface, the output interface, the processor, and the memory are connected by using an internal connection path. The processor is configured to execute code in the memory, and when the code is executed, the processor is configured to perform the packet transmission method according to any one of the first aspect and the second aspect, or the packet transmission method according to any possible implementation of any one of the first aspect and the second aspect.

According to an eleventh aspect, a packet transmission system is provided. The packet transmission system includes a first provider edge PE and a second PE, the second PE performs the packet transmission method according to the first aspect or any possible implementation of the first aspect, and the first PE performs the packet transmission method according to the second aspect or any possible implementation of the second aspect.

DETAILED DESCRIPTION OF ILLUSTRATIVE EMBODIMENTS

The following further describes implementations of this application in detail with reference to the accompanying drawings.

A BIER technology is a technology that is proposed in the communication field in recent years and applied to construct a multicast packet forwarding path. A BIER network includes an intermediate node and edge nodes. The intermediate node is configured to forward a BIER packet. The edge node can communicate with another node in the BIER network, and communication between the BIER network and another communication network can also be implemented through the edge node.

Each edge node in the BIER network is configured with a bit-forwarding router identifier (BFR ID), for example, the BFR ID is configured as a value from 1 to 256. Configuration information of each edge node in the BIER network may be flooded in the network, and such flooded information is referred to as BIER information. Through flooding, each node in the network can determine the BFR ID identifier and the corresponding node. In this application, the node in the BIER network is a device in the BIER network, and may be a data communication device such as a router or a switch.

Figure 1:
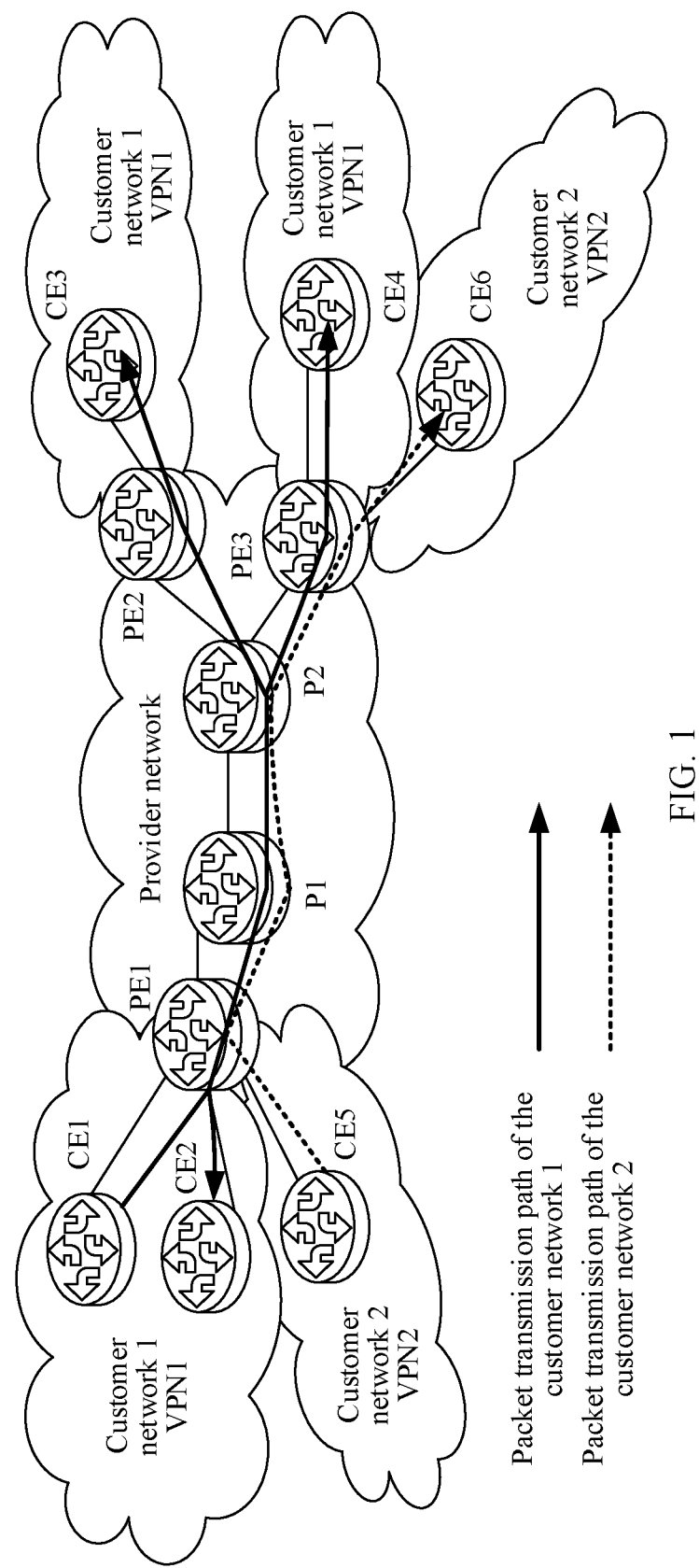
FIG. 1 is a schematic diagram of an implementation environment of packet transmission according to an embodiment of this application.

A schematic diagram of an implementation environment shown in FIG. 1 is used as an example. The implementation environment includes devices such as a provider edge (PE)1, a PE2, and a PE3, and a CE1, a CE2, a CE3, a CE4, a CE5, and a CE6.

For ease of understanding, concepts involved in embodiments of this application are described based on the implementation environment shown in FIG. 1. In embodiments of this application, one or more customer networks may be obtained through division based on different customers. For example, a network in which a PE and a CE through which a transmission path of a BIER packet passes are located is referred to as a customer network. A virtual private network (VPN) is configured on a provider PE node to distinguish different customer networks, and one VPN corresponds to one customer network. Each PE can independently provide BIER services for different customer networks. For example, on each PE in FIG. 1, a VPN, referred to as VPN1, is configured for a customer network 1, and another VPN, referred to as VPN2, is configured for a customer network 2.

In addition, one customer network includes one or more sites, and each site is a part of the customer network. Each site is a CE connected to a same PE in a same VPN. The PE and the CE can be directly or indirectly connected. As shown in FIG. 1, the PE1, the PE2, the PE3, the CE1, the CE2, the CE3, and the CE4 are located in the customer network 1, and the PE1, the PE3, the CE5, and the CE6 are located in the customer network 2. The customer network 1 includes three sites: the CE1 and the CE2 connected to the PE1 are one site; the CE3 connected to the PE2 is one site; and the CE4 connected to the PE3 is one site. The customer network 2 includes two sites: the CE5 connected to the PE1 is one site; and the CE6 connected to the PE3 is one site.

It should be noted that, in FIG. 1, that a network in which the PE1, the PE2, the PE3, the CE1, the CE2, the CE3, and the CE4 are located is used as one customer network 1, and a same VPN is configured is merely used an example for description, but division into a customer network is not limited. In an example embodiment, networks in which the PE1, the PE2, the PE3, the CE1, the CE2, the CE3, and the CE4 are located may alternatively be used as three different customer networks. For example, a network in which the PE1, the CE1, and the CE2 are located is one customer network, a network in which the PE2 and the CE3 are located is one customer network, and a network in which the PE3 and the CE4 are located is one customer network.

The implementation environment shown in FIG. 1 includes two packet transmission paths. A first transmission path is shown by a solid line in FIG. 1, and is a transmission path in which the CE1 is used as a packet sender and the CE2, the CE3, and the CE4 are used as packet recipients. A second transmission path is shown by a dashed line in FIG. 1, and is a transmission path in which the CE5 is used as a packet sender and the CE6 is used as a packet recipient.

In a related technology, the BIER technology is mainly applied in a provider network, and a protocol independent multicast (PIM) protocol is deployed in a customer network, so that multicast streams between different sites in the customer network can be carried in the provider network through a BIER tunnel. The first packet transmission path in FIG. 1 is used as an example. In the related technology, only the BIER technology is applied in the provider network (that is, a network including a P1, a P2, the PE1, the PE2, and the PE3), and the PIM protocol is separately deployed between the CE1 and the PE1, between the CE2 and the PE1, between the CE3 and the PE2, and between the CE4 and the PE3. That is, in the related technology, a packet sent by the CE1 is first transmitted to the PE1 according to the PIM protocol, and then is encapsulated into a BIER packet on the PE1 and transmitted to the PE2 and the PE3 through the provider network. After being decapsulated on the PE2 and the PE3, the packet is sent by the PE2 and the PE3 to the CE3 and the CE4 respectively according to the PIM protocol.

Because a quantity of edge nodes is limited in the BIER technology, a quantity of CEs that can be accessed when the BIER technology is applied in the provider network in the related technology is also limited, and scalability is poor. In addition, because the provider network needs to maintain a large quantity of packets, the provider network is overloaded.

An embodiment of this application provides a packet transmission method. In the method, the BIER technology is deployed on a customer network, and a provider network does not need to establish a BIER sub-domain for each customer network. The provider network uses a multicast tunneling technology, that is, a multicast tunnel is established between PEs. In this way, BIER networks of customers at different sites of a provider can communicate with each other, and BIER packet encapsulation and transmission of the customers at different sites are implemented. In addition, BIER sub-domain IDs and BFR IDs in different customer VPNs can be planned independently without affecting signaling and forwarding technologies selected by a provider public network.

For example, in the implementation environment shown in FIG. 1, a BIER protocol is deployed on the customer network 1, the customer network 2, and a provider network. The customer network 1 and the customer network 2 in FIG. 1 belong to two independent VPNs, namely, the VPN1 and the VPN2 respectively on a provider PE. A sub-domain 0 and a sub-domain 1 can be configured in the customer network 1, and the sub-domain 0 and the sub-domain 1 can also be configured in the customer network 2. A PE device independently establishes a forwarding table for the sub-domain 0 or the sub-domain 1 in the VPN1 instance and the VPN2 instance, which do not restrict and affect each other. The first packet transmission path in FIG. 1 is used as an example, and a BIER protocol is deployed between the CE1 and the PE1, between the CE2 and the PE1, between the CE3 and the PE2, and between the CE4 and the PE3 respectively. A packet sent by the CE1 is first transmitted to the PE1 based on the BIER protocol, is then transmitted to the PE2 and the PE3 through the provider network, and the packet is then sent to the CE3 and the CE4 devices by the PE2 and the PE3 respectively. A packet sent by the CE5 is first transmitted to the PE1 based on the BIER protocol, is then transmitted to the PE3 through the provider network, and the packet is then sent to the CE6 device by the PE3. In this way, a BIER packet can be transmitted across provider networks, thereby improving network extensibility and reducing a load of the provider network.

Figure 2:
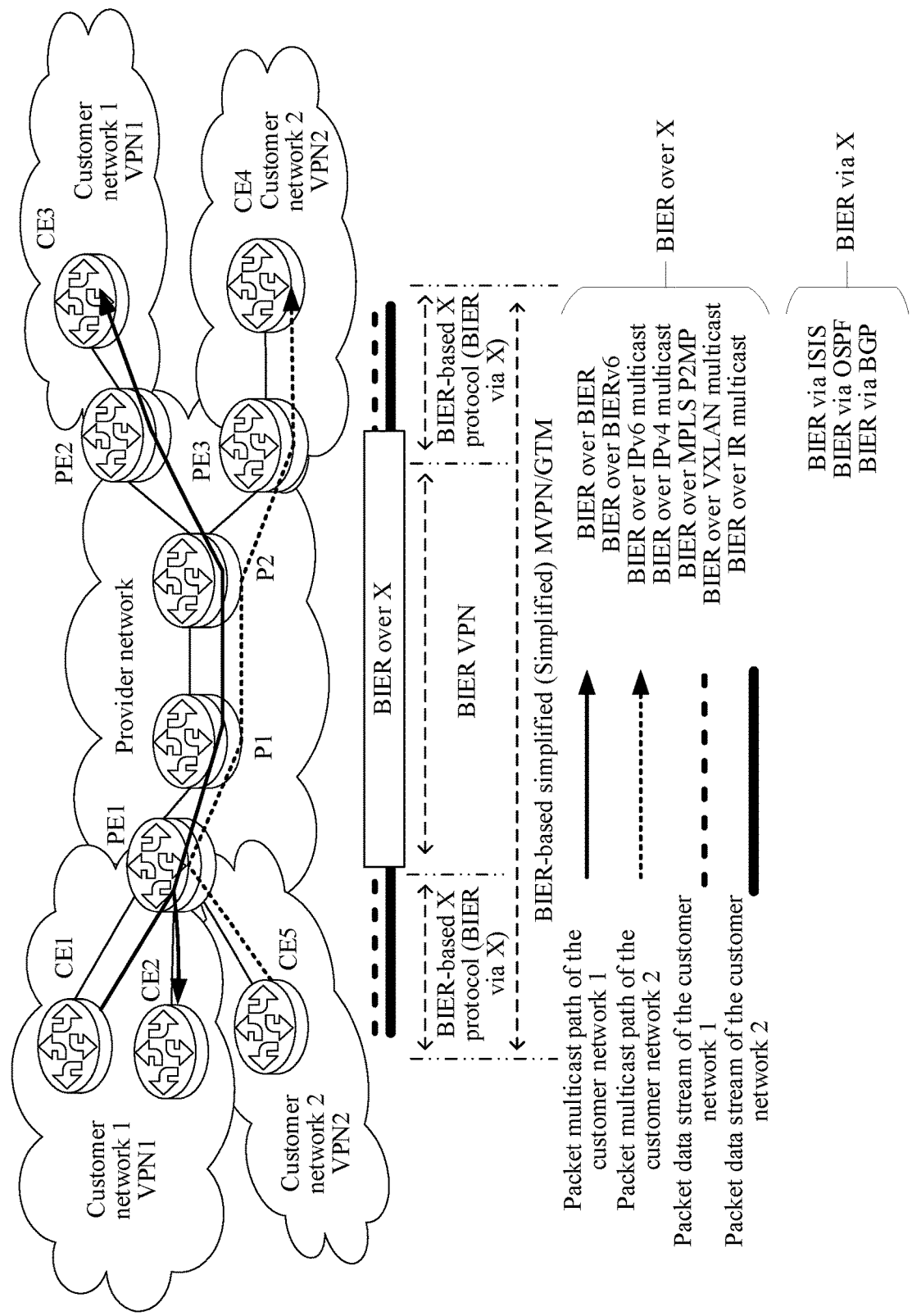
FIG. 2 is a schematic diagram of another implementation environment of packet transmission according to an embodiment of this application.

In another example, the method provided in this embodiment of this application is also applicable to an implementation environment shown in FIG. 2. As shown in FIG. 2, in addition to being connected to a customer network 1 including a CE1 and a CE2, a PE1 is further connected to a customer network 2 including a CE5. The customer network 1 and the customer network 2 in FIG. 2 belong to two independent VPNs, namely, a VPN1 and a VPN2 respectively on a provider PE. A sub-domain 0 and a sub-domain 1 can be configured in the customer network 1, and the sub-domain 0 and the sub-domain 1 can also be configured in the customer network 2. A PE device independently establishes a forwarding table for the sub-domain 0 or the sub-domain 1 in the VPN1 instance and the VPN2 instance, which do not restrict and affect each other. As shown in FIG. 2, the implementation environment includes two packet transmission paths. The first transmission path is shown by a solid line in FIG. 2, and is a transmission path in which the CE1 is used as a packet sender and the CE2 and a CE3 are used as packet recipients. The second transmission path is shown by a dashed line in FIG. 2, and is a transmission path in which the CE5 is used as a packet sender and a CE4 is used as a packet recipient.

In addition, BIER over X in FIG. 2 indicates an encapsulation type of a packet in a provider public network. As shown in FIG. 2, the BIER over X includes but is not limited to BIER over BIER, BIER over BIERv6, BIER over IPv6 multicast, BIER over IPv4 multicast, BIER over MPLS point-to-multipoint (P2MP), BIER over VXLAN multicast, and BIER over IR multicast. BIER via X in FIG. 2 indicates an encapsulation type of a packet in a customer network. As shown in FIG. 2, the BIER via X includes but is not limited to BIER via intermediate system to intermediate system (ISIS), BIER via open shortest path first (OSPF), and BIER via border gateway protocol (BGP).

In the method provided in this embodiment of this application, BIER encapsulation types of different sites in a same customer VPN may be flexibly selected. Different sites may use a same encapsulation type, which is referred to homogeneous; and different sites may alternatively use different encapsulation types, which is referred to as heterogeneous. For example, in the implementation environment shown in FIG. 2, a BIERv6 protocol may be run in the customer network 1, and a BIER MPLS protocol may be run in the customer network 2. In another example, at different sites in the customer network 2, some sites run BIER MPLS, and some sites may run BIER ETH. A splicing policy and manner of the BIER MPLS and the BIER ETH are determined by each customer network. This is not limited in this embodiment of this application.

Figures 3, 4:
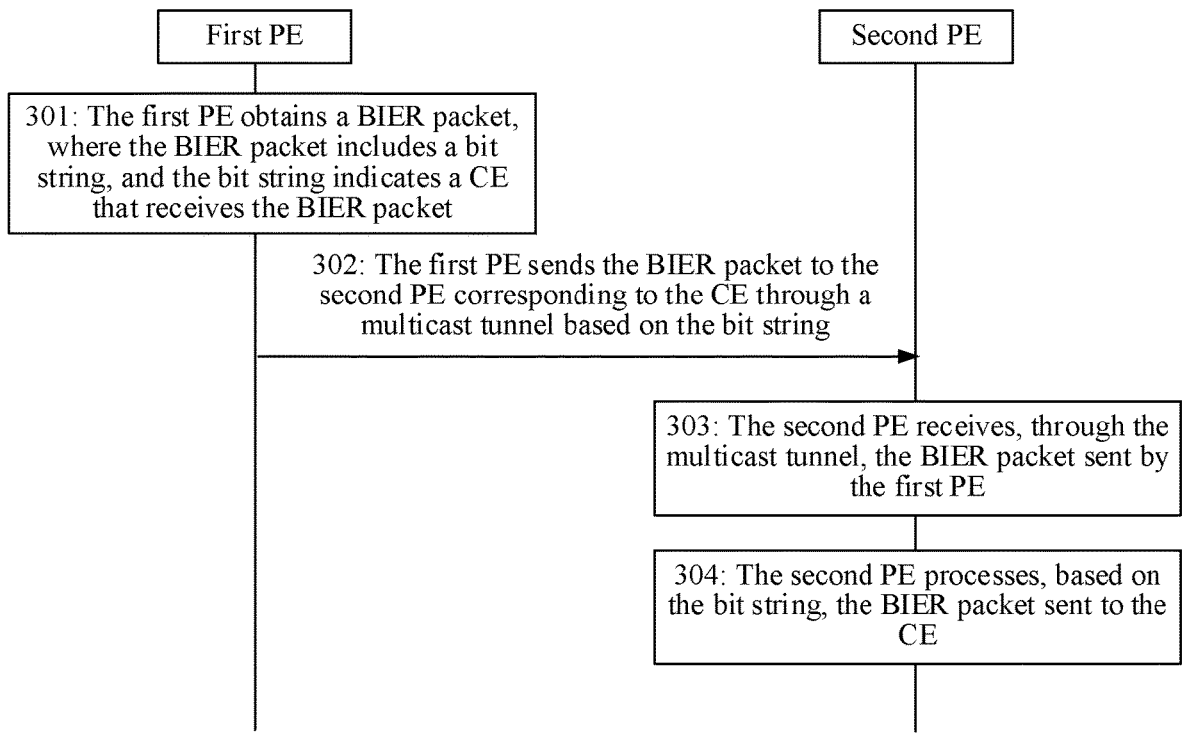
FIG. 3 is a flowchart of a packet transmission method according to an embodiment of this application.
FIG. 4 is a schematic diagram of a forwarding relationship according to an embodiment of this application.

An embodiment of this application provides a packet transmission method. The method may be applied to, for example, the implementation environment shown in FIG. 2. FIG. 3 is a flowchart of a packet transmission method according to an embodiment of this application. As shown in FIG. 3, the packet transmission method provided in this embodiment of this application includes the following steps.

Step 301: A first PE obtains a BIER packet, where the BIER packet includes a bit string, and the bit string indicates a CE that receives the BIER packet.

In this embodiment of this application, the first PE is connected to one or more customer networks, VPNs are used on the first PE to distinguish between different customer networks, and services are provided for running BIER on the different customer networks. Before the first PE obtains the BIER packet, the method provided in this embodiment of this application further includes a process of PE member discovery and provider network multicast tunnel technology negotiation, and a process of customer network BIER information learning and determining a BIER data forwarding relationship between PEs. Implementations of the two processes are not described herein. For details, refer to the following explanation and description.

A manner in which the first PE obtains the BIER packet is not limited in this embodiment of this application. For example, the first PE receives a BIER packet sent by one CE in a customer network to another CE. For ease of description, the CE that sends the BIER packet is referred to as a first CE, and the CE that receives the BIER packet is referred to as a second CE. There may be one or more second CEs. For example, in the implementation environment shown in FIG. 2, the first PE is the PE1 in FIG. 2, the first CE is the CE1 in FIG. 2, and a connection manner between the PE1 and the CE1 includes a direct connection and a non-direct connection. With reference to the descriptions in the implementation environment in FIG. 2, the CE1 is located in a first network, for example, the customer network 1 in FIG. 2. The first network is a BIER network, and the CE1 sends the BIER packet to the PE1.

In a sub-domain, a CE that receives a BIER packet is represented by a bit string, that is, the bit string indicates the CE that receives the BIER packet. A location or index of each bit in the bit string represents a BFR ID of an edge node, that is, a BFR ID of the CE that receives the BIER packet. For example, the first CE that sends the BIER packet encapsulates the bit string into a BIER header of the BIER packet and sends the bit string to the first PE.

In a possible implementation, before the first PE receives the BIER packet sent by the first CE, the first PE configures a VPN for the first network and a second network. For example, the first network and the second network belong to a same VPN, and the first PE configures a first VPN for a same customer network to which the first network and the second network belong. The first VPN is for isolating a packet transmitted in another customer network when a BIER packet is transmitted in the customer network.

Optionally, the first PE may further configure a corresponding VPN for another customer network. In this embodiment of this application, only a method for transmitting a BIER packet in the first VPN is described as an example. For a method for transmitting a BIER packet in another VPN, refer to the method for transmitting a BIER packet in the first VPN. Details are not described in this embodiment of this application.

After a VPN is configured for the first network and the second network on the first PE, the first PE binds an interface, on the first PE, connected to the CE to a corresponding VPN. For example, as shown in FIG. 2, the PE1 is used as an example, where a connection interface between the PE1 and the CE1 on the PE1 is bound to the VPN1, a connection interface between the PE1 and the CE2 on the PE1 is bound to the VPN1, and a connection interface between the PE1 and the CE5 on the PE1 is bound to the VPN2. A PE2 is used as an example, a connection between the PE2 and the CE3 on the PE2 is bound to the VPN1. A PE3 is used as an example, a connection between the PE3 and the CE4 on the PE3 is bound to the VPN2.

After the first PE configures a VPN for the first network and the second network, and the interface (that is, a connection interface between the first PE and the first CE) on the first PE and connected to the CE is bound to the corresponding first VPN, the first PE receives the BIER packet sent by the first CE. Optionally, the first PE receives, through the connection interface between the first PE and the first CE, the BIER packet sent by the first CE.

Step 302: The first PE sends the BIER packet to a second PE corresponding to the CE through a multicast tunnel based on the bit string.

Because the BIER packet includes a bit string, after receiving the BIER packet, the first PE decapsulates the packet to obtain the bit string. For example, the bit string is encapsulated in a BIER header of the BIER packet, and the first PE obtains the bit string by decapsulating the BIER header of the BIER packet.

After obtaining the bit string, the first PE determines a next-hop device based on the bit string. For example, the first PE may query a forwarding table, where the forwarding table includes a correspondence between a bit string and an identifier of a next-hop device, so that the first PE determines an identifier of the next-hop device. An example in which the next-hop device is the second PE is used, that the first PE sends the BIER packet to a second PE corresponding to the CE through a multicast tunnel based on the bit string includes but is not limited to: The first PE obtains an identifier of the second PE based on the bit string. The first PE performs tunnel encapsulation on the BIER packet based on the identifier of the second PE, to obtain an encapsulated BIER packet, where an encapsulation format included in the encapsulated BIER packet matches the multicast tunnel. The first PE sends the encapsulated BIER packet to the second PE through the multicast tunnel. A type of the multicast tunnel established in the provider public network is not limited in this embodiment of this application. For example, the multicast tunnel includes: an IPv6 multicast tunnel, an IPv4 multicast tunnel, an MPLS multicast tunnel, a VXLAN multicast tunnel, a BIER multicast tunnel, or an IR multicast tunnel.

In addition, a manner of determining the identifier of the second PE in the forwarding table and the type of the multicast tunnel is not limited in this embodiment of this application. In a possible implementation, the method further includes: The second PE sends a routing message to the first PE, where the routing message includes a type of the multicast tunnel and an identifier of the second PE, and the identifier of the second PE is for addressing the second PE. Corresponding, the method further includes: The first PE receives the routing message sent by the second PE, where the routing message sent by the second PE includes the type of the multicast tunnel and the identifier of the second PE, and the identifier of the second PE is for addressing the second PE.

It should be noted that a process in which the second PE sends the routing message and the first PE receives the routing message is the foregoing process of PE member discovery and provider network multicast tunnel technology negotiation. For a detailed process, refer to the following content, and details are not described herein.

Figure 14:
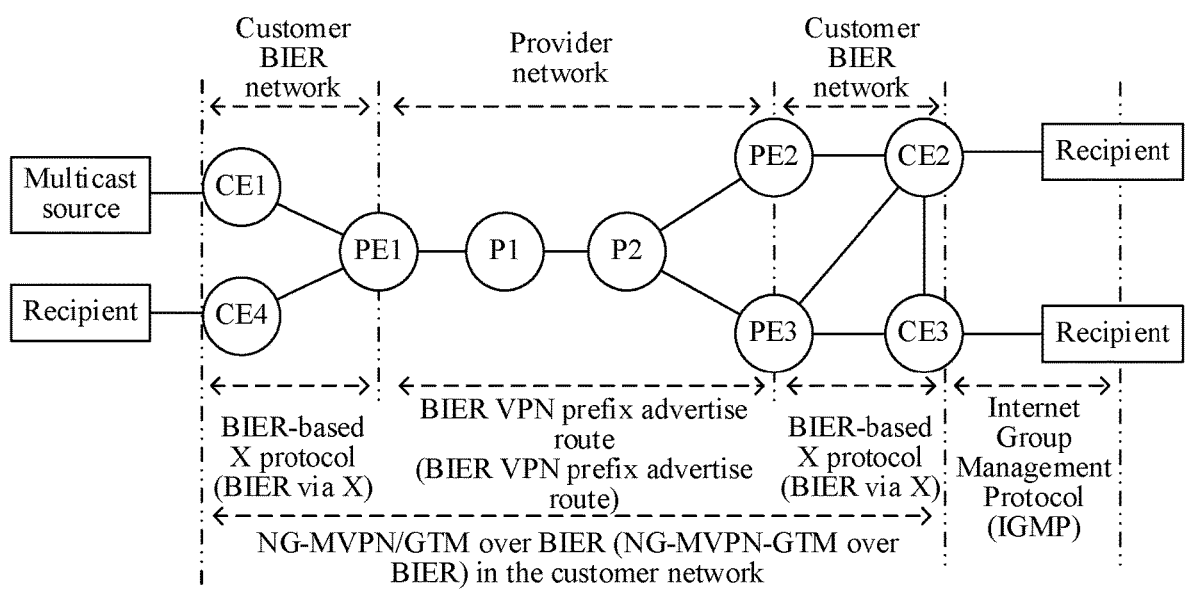
FIG. 14 is a schematic diagram of another implementation environment of packet transmission according to an embodiment of this application.

For ease of understanding a process of sending a BIER packet, an implementation environment shown in FIG. 14 is used as an example for description. In FIG. 14, BFR IDs of devices CE1, CE2, CE3, and CE4 in a customer-side BIER network are 1, 2, 3, and 4 respectively. The CE1 sends a BIER packet to the CE2, the CE3, and the CE4, and the CE2, the CE3, and the CE4 correspond to a same BIER VPN instance 1. Through the process of customer network BIER information learning and determining a BIER data forwarding relationship between PEs, a BFR prefix and the BFR ID of the CE2 may be learned on a PE1 through remote BFR neighbors PE2 and PE3 at the same time. If the PE1 preferentially selects the remote BFR neighbor PE2 as a next hop of the route, a BFR ID-based forwarding relationship shown in FIG. 4 is formed on the PE1 device. In FIG. 4, a next hop from the PE1 to the CE4 is the CE4, and the CE4 is a directly connected neighbor of the PE1; a next hop from the PE1 to the CE2 is the PE2, and the PE2 is a remote neighbor of the PE1; and a next hop from the PE1 to the CE3 is the PE3, and the PE3 is a remote neighbor of the PE1.

Figure 5:
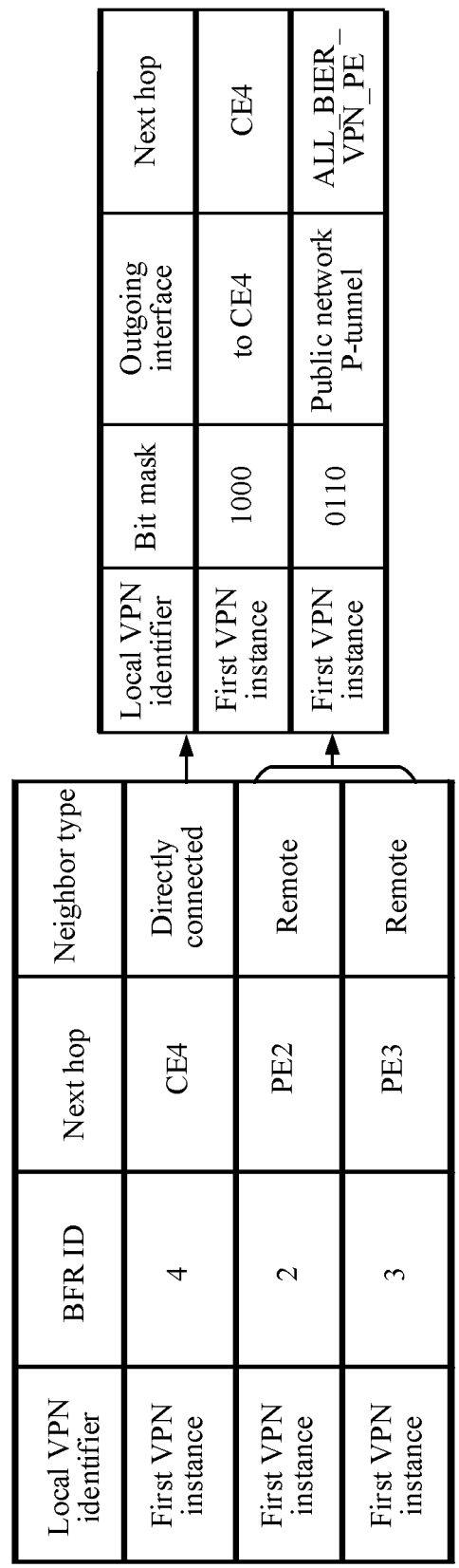
FIG. 5 is a schematic diagram of another forwarding relationship according to an embodiment of this application.
Figure 6:
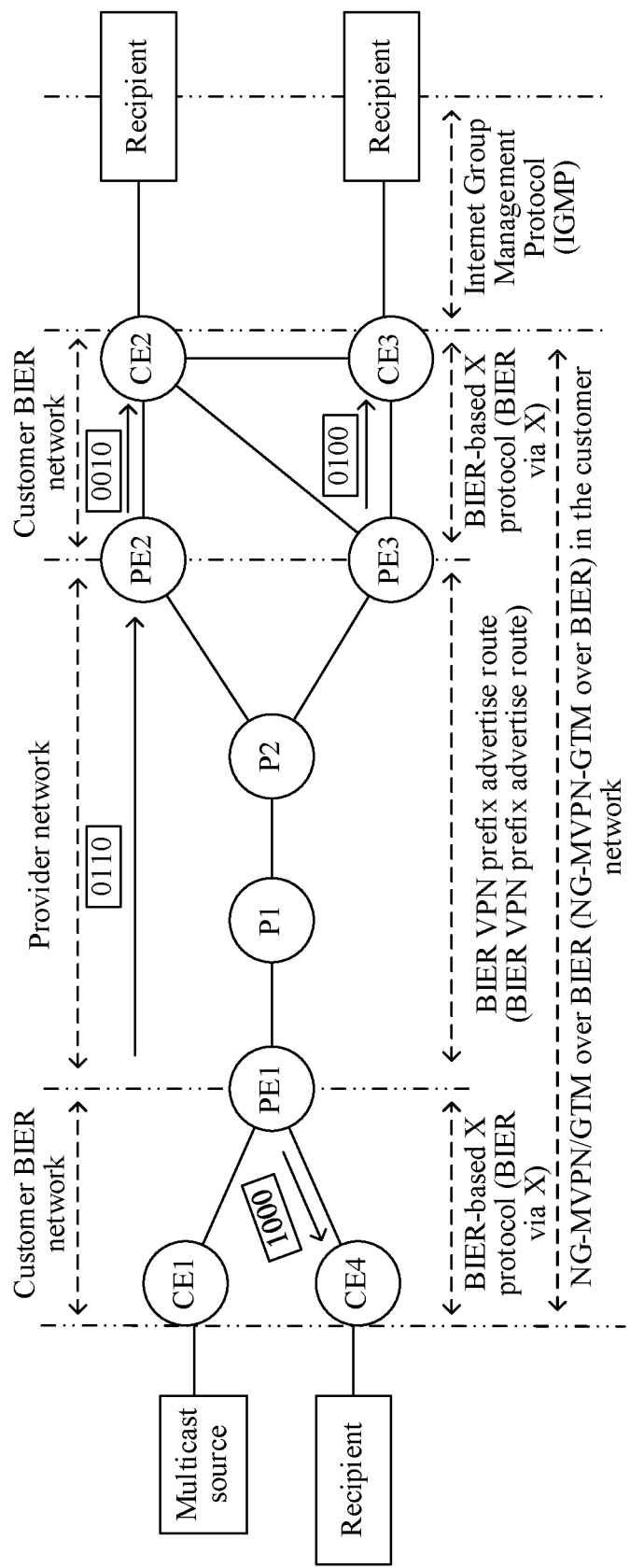
FIG. 6 is a schematic diagram of BIER data transmission according to an embodiment of this application.

Because data encapsulation from the PE1 to the PE2 and the PE3 uses a multicast tunnel established by a provider public network, the PE1 may send a BIER packet to the PE2 and the PE3 by using the multicast tunnel of the provider public network, and after the BFR IDs are represented by using bit masks, the BFR Id-based forwarding relationship shown in FIG. 4 is further converted into a bit mask-based forwarding relationship. For example, the bit mask-based forwarding relationship is shown in FIG. 5. In FIG. 5, a bit mask 0110 corresponds to the BFR IDs of the CE2 and the CE3. An outgoing interface of the PE1 is a public network P-tunnel (provider multicast tunnel) and a next hop is ALL_BIER_VPN_PE. Therefore, both the PE2 and the PE3 can receive a BIER packet with a bit string of 0110. An example of transmission of customer network BIER data between provider networks is shown in FIG. 6. After a PE1 receives a BIER packet sent by a CE1, the PE1 sends a BIER packet carrying a bit string of 1000 to a directly connected CE4, and the PE1 sends a BIER packet carrying a bit string of 0110 to a PE2 and a PE3 through a multicast tunnel of a provider public network. For example, in FIG. 6, a customer network transmits a packet through next-generation multicast virtual private network (NG-MVPN)/global table multicast (GTM) over BIER.

Step 303: The second PE receives, through the multicast tunnel, the BIER packet sent by the first PE.

As described in step 302, there may be one or more recipients of the BIER packet. Therefore, there are one or more second PEs, and each second PE can receive, through the multicast tunnel, the BIER packet sent by the first PE. The implementation environment shown in FIG. 14 is still used as an example. The first PE is the PE1, the second PE is the PE2 and the PE3, and both the PE2 and the PE3 receive, through the multicast tunnel, the BIER packet sent by the PE1.

Step 304: The second PE processes, based on the bit string, the BIER packet sent to the CE.

Because there are one or more second PEs, each second PE can receive the BIER packet through the multicast tunnel of the provider public network. When there are a plurality of second PEs, and all of the plurality of second PEs can communicate with a recipient of the BIER packet, that is, the CE, if all of the plurality of second PEs send the BIER packet to the same CE, there may be a case in which the same CE receives a plurality of BIER packets sent by the plurality of second PEs.

For example, in the implementation environment shown in FIG. 14, because both the PE2 and the PE3 are connected to the customer BIER network device CE2, both the PE2 and the PE3 can communicate with the CE2. If the CE2 is a recipient of the BIER packet, a case that the PE2 and the PE3 send the BIER packet to the CE2 at the same time, and a final customer connected to the CE2 receives two multicast streams need to be avoided.

Therefore, the method provided in this embodiment of this application provides a negotiation process of a forwarding priority of a local customer BIER network, and the negotiation process is a priority comparison process. Based on a negotiation result, a PE with a forwarding priority has the right to send a BIER packet to a BFER represented by the BFR ID through a local customer-side BIER network, and a PE that does not have a forwarding priority is prohibited from sending a BIER packet to the BFER represented by the BFR ID through the local customer-side BIER network. A forwarding priority negotiation manner is not limited in this embodiment of this application, and includes but is not limited to the following two negotiation manners.

Negotiation manner 1: Router identifiers (router IDs) of all BIER VPN PEs that learn the BFR ID from the local customer BIER network are compared, and a forwarding priority is determined based on a value of each router ID.

Based on the negotiation manner 1, that the second PE determines that the second PE has a forwarding priority for the CE includes but is not limited to: The second PE obtains a router identifier of a third PE communicating with the CE. The second PE determines, based on a router identifier of the second PE and the router identifier of the third PE, that the second PE has a forwarding priority for the CE.

Figure 7:
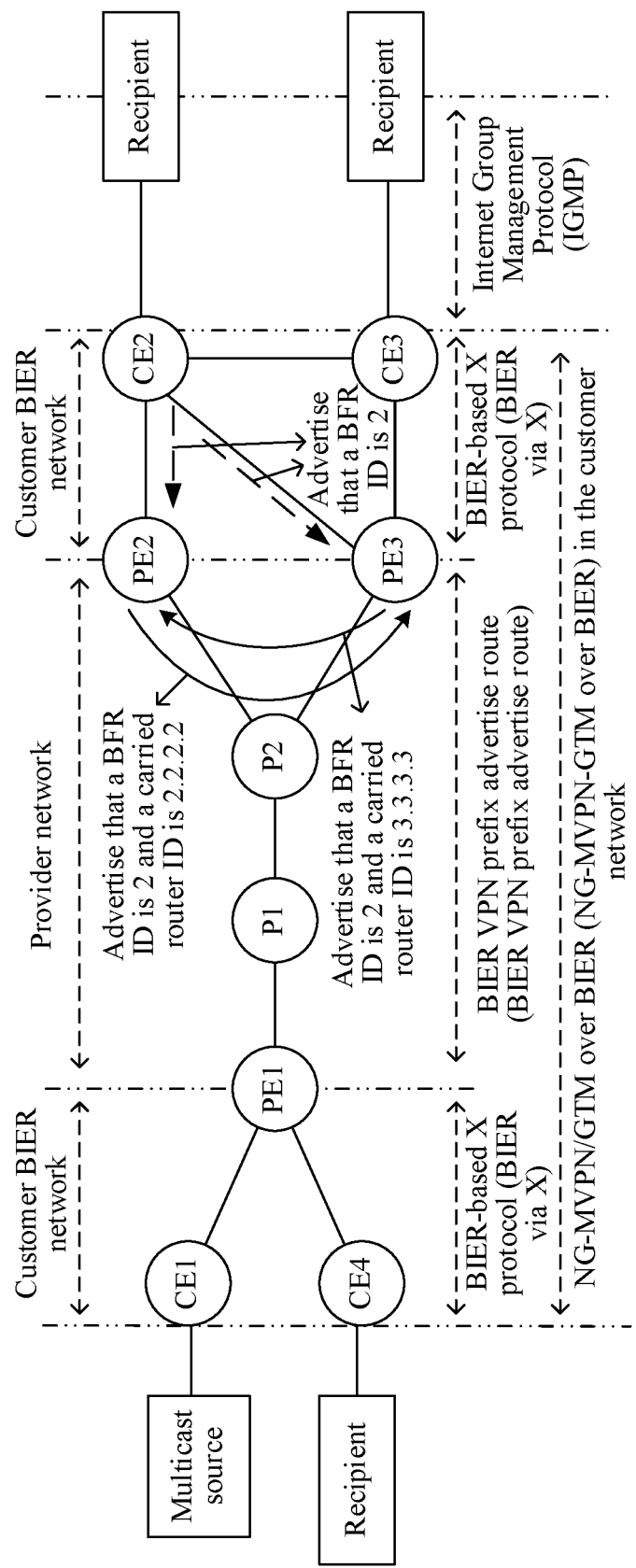
FIG. 7 is a schematic diagram of another implementation environment of packet transmission according to an embodiment of this application.

For example, an implementation environment shown in FIG. 7 is used as an example, and a CE2 advertises a PE2 and a PE3 that a BFR ID of the CE2 is 2. The PE2 and the PE3 advertise routing information to each other, the PE2 advertises the PE3 that the BFR ID is 2 and a carried router ID of the PE2 is 2.2.2.2, and the PE3 advertises the PE2 that the BFR ID is 2 and a carried router ID of the PE3 is 3.3.3.3. If a device with a larger router ID has a forwarding priority, a BIER packet sent to the CE2 (the BFR ID is 2) can only be sent by the PE3 through the local customer-side BIER network. That is, the PE3 serves as the second PE, and determines that the PE3 has a forwarding priority for the CE2.

Based on the negotiation manner 1, that the second PE determines that the second PE has no forwarding priority for the CE includes but is not limited to: The second PE obtains a router identifier of a third PE communicating with the CE. The second PE determines, based on a router identifier of the second PE and the router identifier of the third PE, that the second PE has no forwarding priority for the CE.

The implementation environment shown in FIG. 7 is still used as an example, and the CE2 advertises the PE2 and the PE3 that the BFR ID of the CE2 is 2. The PE2 and the PE3 advertise routing information to each other, the PE2 advertises the PE3 that the BFR ID is 2 and the carried router ID of the PE2 is 2.2.2.2, and the PE3 advertises the PE2 that the BFR ID is 2 and the carried router ID of the PE3 is 3.3.3.3. If a device with a larger router ID has a forwarding priority, a BIER packet sent to the CE2 (the BFR ID is 2) can only be sent by the PE3 through the local customer-side BIER network, and the PE2 has no forwarding priority. That is, the PE2 serves as the second PE, and determines that the PE2 has no forwarding priority for the CE2.

The foregoing description is based only on an example in which whether the PE2 and the PE3 have a forwarding priority for the CE2. For whether the PE2 and the PE3 have a forwarding priority for the CE3, because the PE3 is connected to the CE3 and can communicate with the CE3, but the PE2 is not connected to the CE3. Therefore, the PE3 has a forwarding priority for the CE3.

Figure 8:
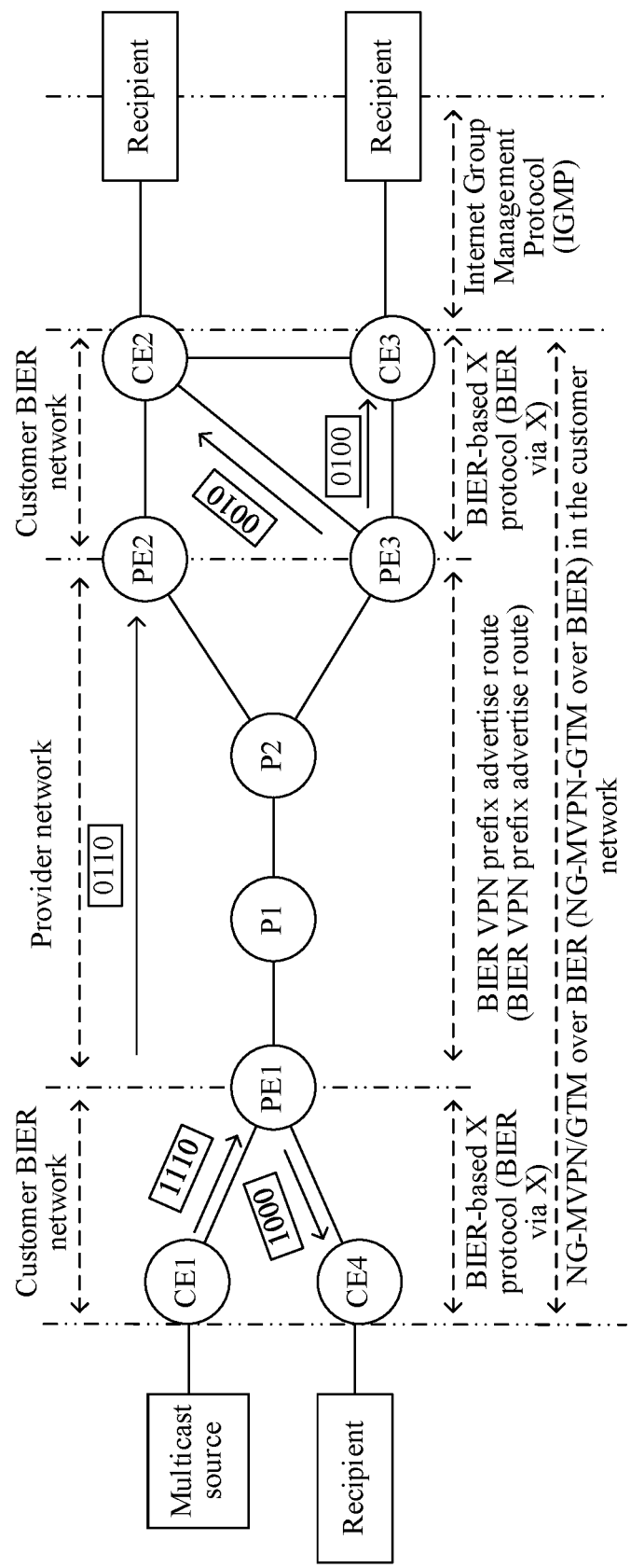
FIG. 8 is a schematic diagram of a process of transmitting a customer-side BIER data stream according to an embodiment of this application.

Based on the foregoing forwarding priority negotiation process, a process of transmitting a customer-side BIER packet is shown in FIG. 8. After the PE1 receives a BIER packet carrying a bit string of 1110 from the CE1, the PE1 sends a BIER packet carrying a bit string of 1000 to the directly connected CE4, and the PE1 sends a BIER packet carrying a bit string of 0110 to the PE2 and the PE3 through the multicast tunnel of the provider public network. Because the PE3 has a forwarding priority for the CE2, and the PE3 also has a forwarding priority for the CE3, the PE3 sends a BIER packet carrying a bit string of 0010 to the CE2, and sends a BIER packet carrying a bit string of 0100 to the CE3.

Negotiation manner 2: Priority values in BIER VPN advertise routes carrying the BFR ID published by all BIER VPN PEs that learn the BFR ID from the local customer BIER network are compared, and a forwarding priority is determined based on a value of each priority value.

In this negotiation manner, a priority value is a newly added BGP transitive path attribute in a BIER VPN advertise route. This attribute includes at least one field to specify a priority value of an originating BIER VPN PE device corresponding to the BIER VPN advertise route. The priority value indicates a priority having a forwarding priority. Whether a PE has a forwarding priority can be determined by comparing the priority value.

Based on the negotiation manner 2, that the second PE determines that the second PE has a forwarding priority for the CE includes but is not limited to: The second PE obtains a priority value of a third PE communicating with the CE. The second PE determines, based on a priority value of the second PE and the priority value of the third PE, that the second PE has a forwarding priority for the CE.

Figure 9:
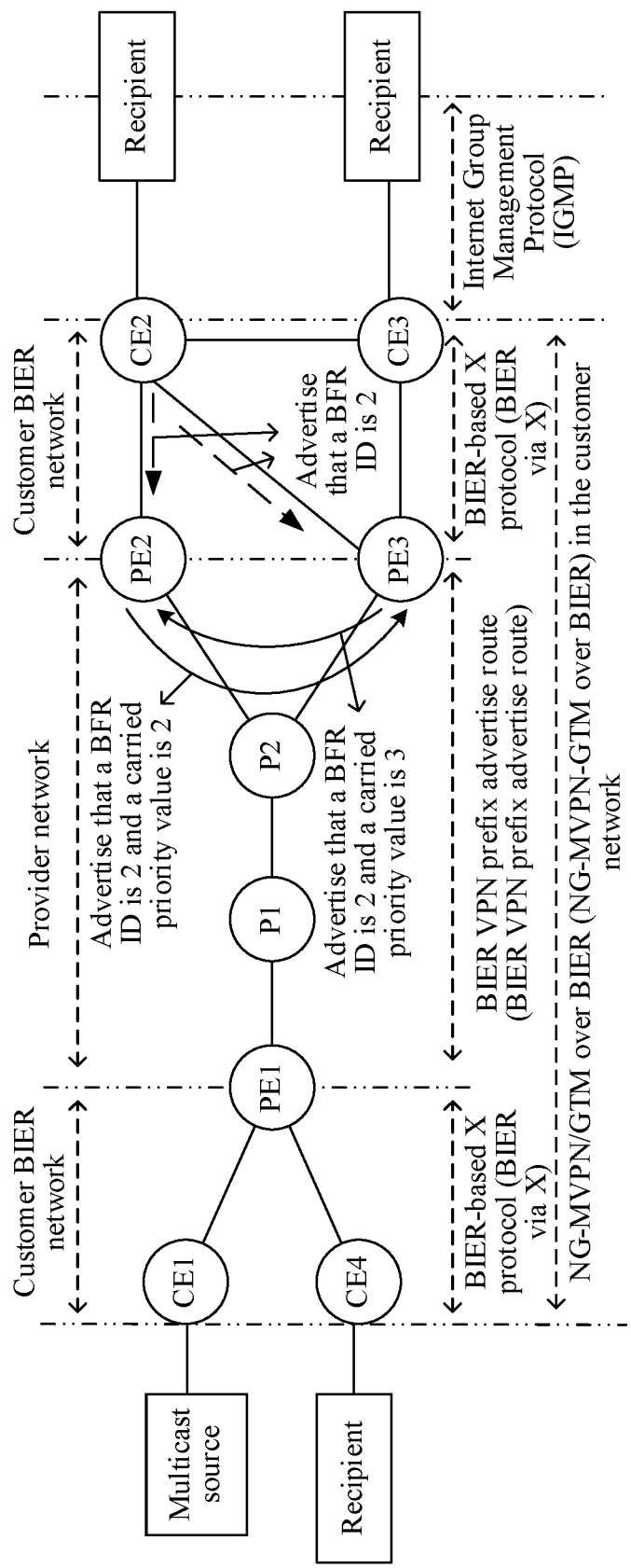
FIG. 9 is a schematic diagram of another implementation environment of packet transmission according to an embodiment of this application.

For example, an implementation environment shown in FIG. 9 is used as an example, and a CE2 advertises a PE2 and a PE3 that a BFR ID of the CE2 is 2. The PE2 and the PE3 advertise routing information to each other, the PE2 advertises the PE3 that the BFR ID is 2 and a carried priority value of the PE2 is 2, and the PE3 advertises the PE2 that the BFR ID is 2 and a carried priority value of the PE3 is 3. If a device with a smaller priority value has a forwarding priority, a BIER packet sent to the CE2 (the BFR ID is 2) can only be sent by the PE2 through the local customer-side BIER network. That is, the PE2 serves as the second PE, and determines that the PE2 has a forwarding priority for the CE2.

Based on the negotiation manner 2, that the second PE determines that the second PE has no forwarding priority for the CE includes but is not limited to: The second PE obtains a priority value of a third PE communicating with the CE. The second PE determines, based on a priority value of the second PE and the priority value of the third PE, that the second PE has no forwarding priority for the CE.

The implementation environment shown in FIG. 9 is still used as an example, and the CE2 advertises the PE2 and the PE3 that the BFR ID of the CE2 is 2. The PE2 and the PE3 advertise routing information to each other, the PE2 advertises the PE3 that the BFR ID is 2 and the carried priority value of the PE2 is 2, and the PE3 advertises the PE2 that the BFR ID is 2 and the carried priority value of the PE3 is 3. If a device with a smaller priority value has a forwarding priority, a BIER packet sent to the CE2 (the BFR ID is 2) can only be sent by the PE2 through the local customer-side BIER network, and the PE3 has no forwarding priority. That is, the PE3 serves as the second PE, and determines that the PE3 has no forwarding priority for the CE2.

The foregoing description is based only on an example in which whether the PE2 and the PE3 have a forwarding priority for the CE2. For whether the PE2 and the PE3 have a forwarding priority for the CE3, because the PE3 is connected to the CE3 and can communicate with the CE3, but the PE2 is not connected to the CE3. Therefore, the PE3 has a forwarding priority for the CE3.

Figure 10:
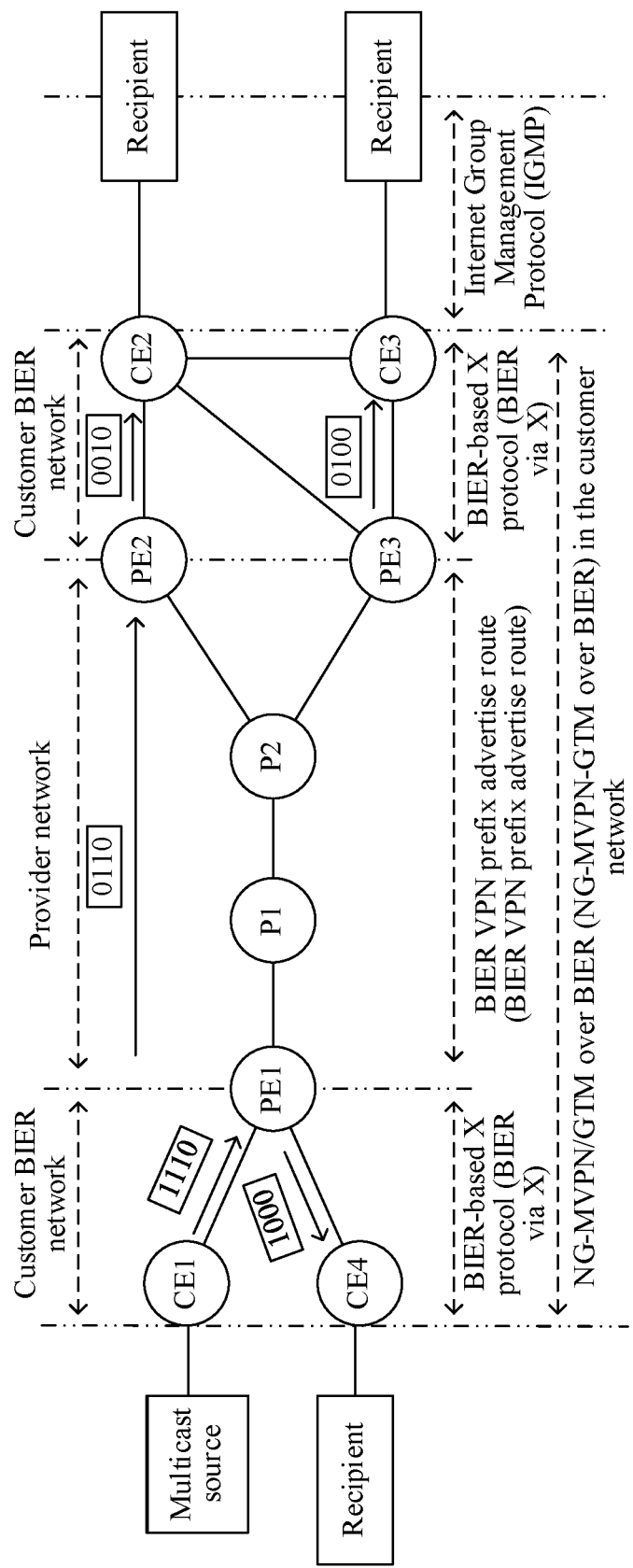
FIG. 10 is a schematic diagram of another process of transmitting a customer-side BIER data stream according to an embodiment of this application.

Based on the foregoing forwarding priority negotiation process, a process of transmitting a customer-side BIER packet is shown in FIG. 10. After the PE1 receives a BIER packet carrying a bit string of 1110 from the CE1, the PE1 sends a BIER packet carrying a bit string of 1000 to the directly connected CE4, and the PE1 sends a BIER packet carrying a bit string of 0110 to the PE2 and the PE3 through the multicast tunnel of the provider public network. Because the PE2 has a forwarding priority for the CE2, and the PE3 also has a forwarding priority for the CE3, the PE2 sends a BIER packet carrying a bit string of 0010 to the CE2, and the PE3 sends a BIER packet carrying a bit string of 0100 to the CE3.

It can be learned from the foregoing forwarding priority negotiation process that, the second PE processes the BIER packet sent to the CE based on the bit string in different manners because of different forwarding priority negotiation results. In a possible implementation, a preferential forwarding bit mask may be generated on the second PE based on a forwarding priority negotiation result. After the BIER VPN PE receives and decapsulates data from the public network P-Tunnel, the preferential forwarding bit mask is used for performing a "bit AND" operation on a bit string in a customer BIER header. A bit string obtained from an operation result is bit information that the BIER VPN PE is allowed to send to the local customer BIER network of the second PE, and the second PE searches for a BIER forwarding relationship in a local VPN instance of the second PE based on the bit string obtained from the operation result, and sends a BIER packet to the local customer BIER network of the second PE based on an indication of the forwarding relationship.

Therefore, that the second PE processes, based on the bit string, the BIER packet sent to the CE includes but is not limited to the following processing manners.

Processing manner 1: That the second PE processes, based on the bit string, the BIER packet sent to the CE includes: The second PE determines that the second PE has a forwarding priority for the CE. The second PE sends the BIER packet to the CE based on the bit string.

In a possible implementation, that the second PE determines that the second PE has a forwarding priority for the CE further includes: The second PE obtains a first forwarding bit mask based on a BFR ID of the CE, where the first forwarding bit mask indicates to send the BIER packet to the CE. For example, that the second PE sends the BIER packet to the CE based on the bit string includes: The second PE performs an AND operation on the bit string and the first forwarding bit mask, and sends the BIER packet to the CE when a result of the AND operation is not zero.

Processing manner 2: That the second PE processes, based on the bit string, the BIER packet sent to the CE includes: The second PE determines that the second PE has no forwarding priority for the CE. The second PE skips sending the BIER packet to the CE.

In a possible implementation, that the second PE determines that the second PE has no forwarding priority for the CE further includes: The second PE obtains a second forwarding bit mask, where the second forwarding bit mask indicates not to send the BIER packet to the CE. For example, that the second PE skips sending the BIER packet to the CE includes: The second PE performs an AND operation on the bit string and the second forwarding bit mask, and skips sending the BIER packet to the CE when a result of the AND operation is zero.

For example, the forwarding priority is determined through negotiation based on the foregoing negotiation manner 1 by using the value of the router ID of the PE. The implementation environment shown in FIG. 7 is used as an example, the BFR ID of the CE2 is 2, and the PE3 has a forwarding priority for the CE2; and a BFR ID of the CE3 is 3, because only the PE3 can learn the BFR ID of the CE3 through the local customer-side BIER network, the PE3 has a forwarding priority for the CE3. The preferential forwarding bit mask generated on the PE2, that is, the second forwarding bit mask, is 0000, a preferential forwarding bit mask generated on the PE3, that is, the first forwarding bit mask, is 0110, and a bit corresponding to the BFR ID of the CE2 and a bit corresponding to the BFR ID of the CE3 in the first forwarding bit mask are set. After receiving the BIER packet sent by the PE1 and decapsulating the P-tunnel, the PE2 performs a "bit AND" operation on a bit string 0110 in the customer BIER header and the preferential forwarding bit mask 0000, and a result is 0000. In this case, the PE2 does not forward the BIER data packet to the local customer-side BIER network of the PE2. After receiving the BIER packet sent by the PE1 and decapsulating the P-tunnel, the PE3 performs a "bit AND" operation on the bit string 0110 in the BIER header and the preferential forwarding bit mask 0110, and a result is 0110. Therefore, the PE3 is responsible for sending the BIER packet to the CE2 and the CE3 through the local customer BIER network of the PE3.

In another example, the forwarding priority is determined through negotiation based on the foregoing negotiation manner 2 by using the value of the priority value of the BIER VPN Prefix route. The implementation environment shown in FIG. 9 is used as an example, the BFR ID of the CE2 is 2, and the PE2 has a forwarding priority for the CE2; and a BFR ID of the CE3 is 3, because only the PE3 can learn the BFR ID of the CE3 through the local customer-side BIER network of the PE3, the PE3 has a forwarding priority for the CE3. The preferential forwarding bit mask generated on the PE2, that is, the first forwarding bit mask, is 0010, and a bit corresponding to the BFR ID of the CE3 in the preferential forwarding bit mask generated on the PE2 is set. A preferential forwarding bit mask generated on the PE3 is, that is, the first forwarding bit mask is 0100, and a bit corresponding to the BFR ID of the CE2 in the preferential forwarding bit mask generated on the PE3 is set. After receiving the BIER packet sent by the PE1 and decapsulating the P-tunnel, the PE2 performs a "bit AND" operation on the bit string 0110 in the BIER header and the preferential forwarding bit mask 0010, and a result is 0010. Therefore, the PE2 is responsible for sending the BIER packet to the CE2 through the local customer BIER network of the PE2. After receiving the BIER packet sent by the PE1 and decapsulating the P-tunnel, the PE3 performs a "bit AND" operation on the bit string 0110 in the BIER header and the preferential forwarding bit mask 0100, and a result is 0100. Therefore, the PE3 is responsible for sending the BIER packet to the CE3 through the local customer BIER network of the PE3.

Figure 11:
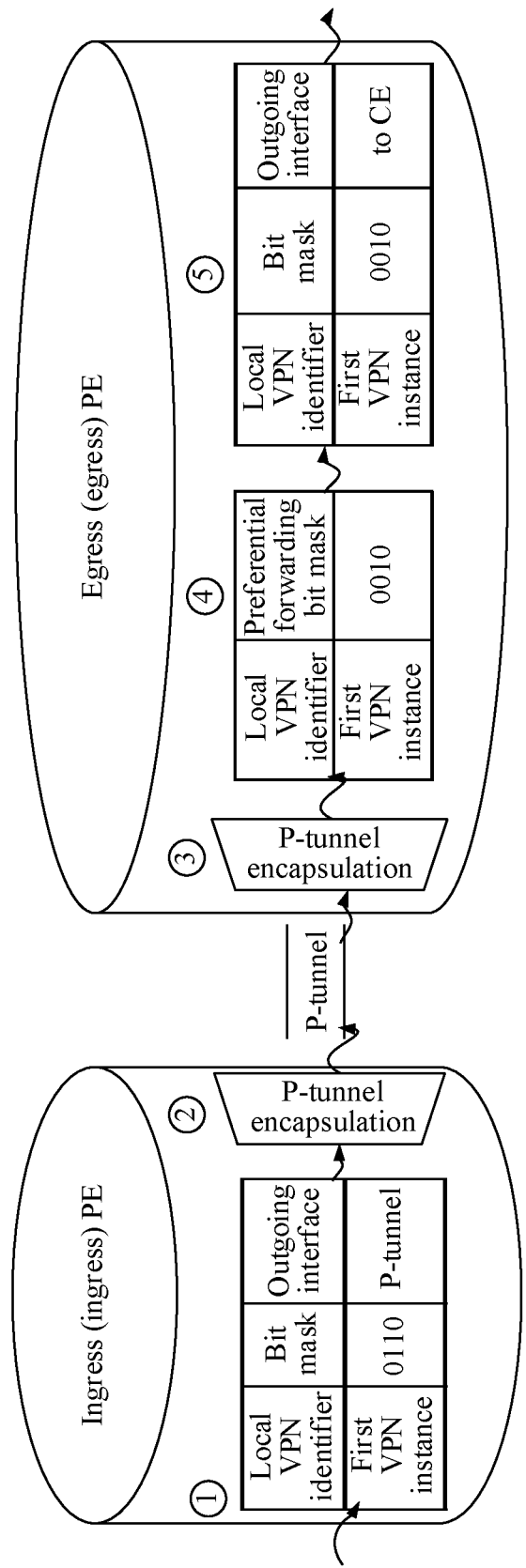
FIG. 11 is a schematic diagram of forwarding a BIER packet on PEs according to an embodiment of this application.

In conclusion, in the packet transmission method provided in this embodiment of this application, a schematic diagram of forwarding a customer BIER packet on an ingress PE and an egress PE is shown in FIG. 11. The ingress PE corresponds to the first PE in the method procedure shown in FIG. 3, and the egress PE corresponds to the second PE in the method procedure shown in FIG. 3. A customer BIER packet flowing into a provider network and flowing out of the provider network may be summarized as the following five processes. The first process and the second process are located on the ingress PE, and the third, the fourth, and the fifth processes are located on the egress PE. For implementation processes of the first process to the fifth process, refer to the processes in the packet transmission method shown in FIG. 3. Details are not described herein again.

In the first process, after receiving the customer BIER packet from a user equipment in a local site, the ingress PE searches for a BIER forwarding relationship in a corresponding VPN instance, and modifies a bit string in the BIER data packet (by performing a "bit AND" operation) based on "bit mask information" in the forwarding relationship, and determines a public network tunnel for data encapsulation based on P-tunnel information (tunnel information of the provider public network) in the forwarding relationship.

In the second process, the ingress PE performs encapsulation of the multicast tunnel of the provider public network based on the P-tunnel information in the forwarding relationship, and in the encapsulation process, uses the customer BIER packet as a load of the multicast tunnel of the provider public network.

In the third process, the egress PE receives an encapsulated BIER packet from the multicast tunnel of the provider public network, and performs decapsulation on the encapsulated BIER packet, that is, strips off a packet header encapsulated by the ingress PE to obtain the customer BIER packet sent by the CE. The egress PE determines information about a local VPN instance to which the BIER packet belongs based on related encapsulation information of the multicast tunnel on the provider public network. It should be noted that in this process, regardless of an encapsulation manner that is used between the ingress PE and the egress PE, the egress PE strips off content encapsulated in the encapsulation manner. A packet header of the customer BIER packet in this application is an encapsulation format of the CE, and the egress PE does not strip off the encapsulation format of the CE.

In the fourth process, the egress PE searches for a preferential forwarding bit mask (a first forwarding bit mask or a second forwarding bit mask) in the local VPN instance to which the customer BIER packet belongs, and modifies (by performing a "bit AND" operation) bit string information in a customer BIER header based on the preferential forwarding bit mask. Based on the forwarding priority negotiation principle provided in this embodiment of this application, the preferential forwarding bit mask obtained by the egress PE is obtained based on a BFR ID of a customer received by the egress PE. Therefore, the bit string in the customer BIER header modified based on "bit AND" also includes only corresponding customer BFR ID information in the local site.

In the fifth process, the egress PE searches for a BIER forwarding relationship in the local VPN instance, and sends the customer BIER packet to the user equipment in the local site, that is, the corresponding CE, based on indication information such as the bit string information in the customer BIER header and a next hop in the BIER forwarding relationship. The CE forwards the customer BIER packet to a corresponding user equipment.

Figure 12:
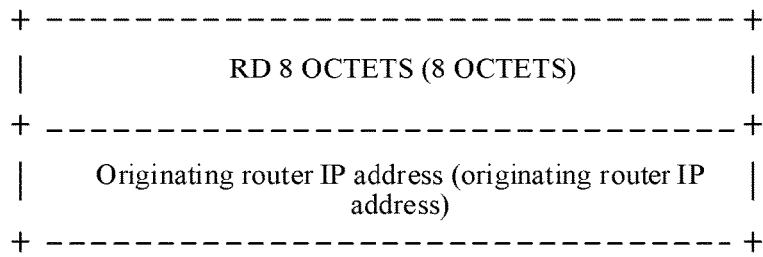
FIG. 12 is a schematic diagram of a structure of a key of a route according to an embodiment of this application.

This part describes the process of PE member discovery and provider network multicast tunnel technology negotiation. In this process, provider PE devices send a BIER VPN member discovery route to implement provider network PE member discovery, and the route is distinguished from an existing route by using a route type or a sub-address family identifier (SAFI) type of the route. A key of the route may include two parts: a route distinguisher (RD) and an originating router IP address shown in FIG. 12.

RD: an RD value of a BIER VPN instance on a PE that sends the route.

Originating router IP address: a BIER VPN router ID that sends the route. If the provider network is an IPv4 network, the value is a public network IPv4 address. If the provider network is an IPv6 network, the value is a public network IPv6 address. This address uniquely identifies a PE device that sends the route in the provider network.

Further, the route may further carry a PMSI tunnel attribute (PTA) defined in RFC 6514, or a BIER PMSI tunnel attribute defined in RFC 8556, which is used for negotiating information about a multicast tunnel used between BIER VPN members.

If a tunnel type in the PMSI tunnel attribute carried in the member discovery route sent by each PE is an IPv4 multicast tunnel, an IPv6 multicast tunnel, an MPLS P2MP tunnel, a VXLAN multicast tunnel, a BIER multicast tunnel, or an IR tunnel, corresponding public network signaling is triggered between PEs to establish a corresponding provider public network multicast tunnel P-tunnel. For example, if the tunnel type is an IPv4 multicast tunnel, protocol independent multicast-sparse mode (PIM SM) or protocol independent multicast-source-specific multicast (PIM SSM) signaling is triggered to establish the provider public network multicast tunnel P-Tunnel. If the tunnel type is an IPv6 multicast tunnel, PIM IPv6 SM or PIM IPv6 SSM signaling is triggered to establish the provider public network multicast tunnel P-tunnel. If the tunnel type is an MPLS P2MP tunnel, MLDP or RSVP-TE P2MP signaling is triggered to establish the provider public network multicast tunnel P-tunnel. If the tunnel type is a VXLAN multicast tunnel, PIM-SM or PIM SSM signaling is triggered to establish the provider public network multicast tunnel P-tunnel. If the tunnel type is an IR tunnel, a destination address of the IR tunnel needs to be reachable by a route. The foregoing process of establishing the provider public network multicast tunnel P-tunnel is not described in detail in this embodiment of this application. The established provider public network multicast tunnel P-tunnel is used for encapsulating data packets of customer BIER networks, so that the customer BIER networks can communicate with each other across provider PEs.

Figure 13:
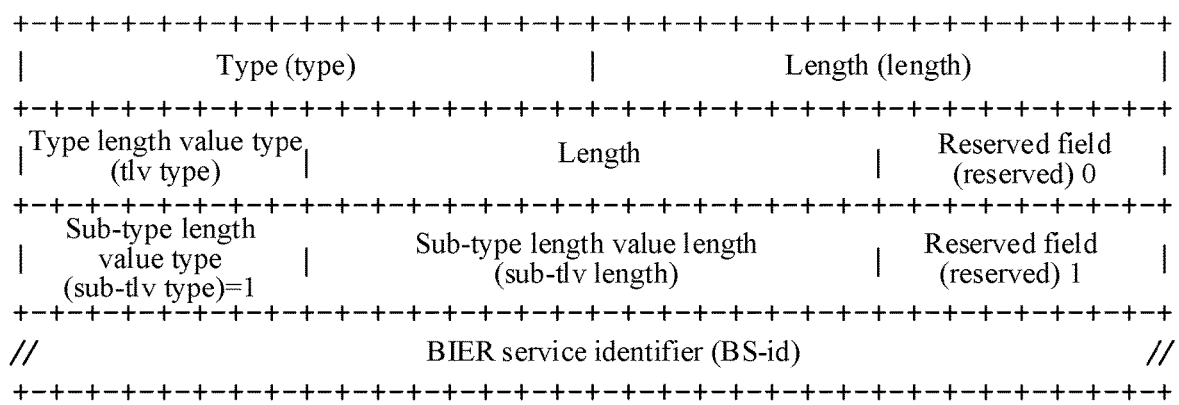
FIG. 13 is a schematic diagram of an attribute structure of a BGP PTA according to an embodiment of this application.

In addition, if the tunnel type in the PMSI tunnel attribute carried in the member discovery route sent by each PE is BIER (including two types: BIER MPLS and BIER Ethernet) or a BIERv6 tunnel type, the route may further include a BIER service identifier attribute, and the attribute is a newly added BGP transitive path attribute. An attribute structure of the BGP transitive path attribute (TPA for short) includes at least a BIER service identifier (BS-id) field shown in FIG. 13, and the BS-id may include an IPv6 address for distinguishing VPNs. In this case, to support a plurality of BIER VPN customers on a PE, a plurality of IPv6 addresses need to be configured. The plurality of IPv6 addresses may be allocated in an address block. Alternatively, the BS-id may be an MPLS label for distinguishing VPNs. In this case, to support a plurality of BIER VPN customers on a PE, a plurality of MPLS labels need to be allocated, and the plurality of MPLS labels may be allocated in an MPLS downstream label space, as shown in FIG. 13. Meanings of fields in FIG. 13 are as follows:

Type (type): a newly added BGP attribute type, which is to be determined (TBD).

Type length value type (tlv type): identifying a BIER service type, such as BIER IPv6, BIER-MPLS, BIER-ETH, which is TBD.

Sub-type length value type (sub-tlv type): identifying a type of a BS-id, where when the provider is a native IPv6 network, the BS-id type is an IPv6 address type, that is, TBD; and when the provider is an IPv4 network, the BS-id type is an MPLS downstream label type, that is, TBD.

BS-id: a 16-byte IPv6 address if the sub-tlv type is an IPv6 type; or 4-byte content if the sub-tlv type is an MPLS label type, where lower 20 bits thereof are an MPLS downstream label.

Figure 15:
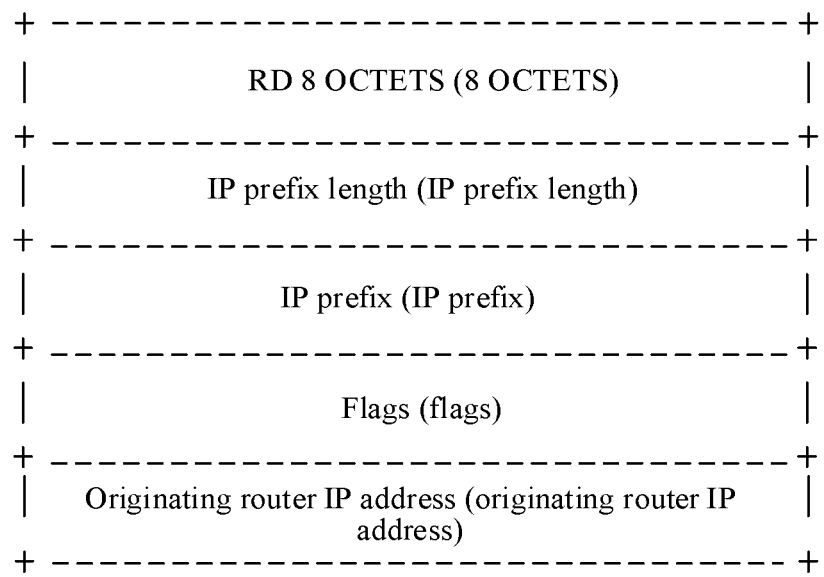
FIG. 15 is a schematic diagram of a structure of NLRI according to an embodiment of this application.

With regard to the process of customer network BIER information learning and determining a BIER data forwarding relationship between PEs, based on the foregoing BIER VPN member discovery, BIER VPN PE members become remote BFR neighbors of each other. For example, the implementation environment shown in FIG. 14 is used as an example, both the PE2 and the PE3 are remote BFR neighbors of the PE1, and both the PE1 and the PE2 are remote BFR neighbors of the PE3. The customer network BIER information includes the BFR IDs and BFR prefix information of the CE1, the CE2, the CE3, and the CE4 in FIG. 14. BIER VPN PE members advertise to and learn from each other by using BIER VPN prefix advertisement routes. For example, BGP link network layer reachability information (NLRI) is used for carrying at least RD and IP prefix fields shown in FIG. 15 (or these fields are carried in another TLV in a BGP message). A key of a route includes the following parts.

RD: an RD value of a BIER VPN instance on a PE that sends the route.

IP prefix length: a prefix length of a BIER prefix in a customer network. According to RFC 8279, the value is fixed at 32 (IPv4) or 128 (IPv6).

IP prefix: a BIER prefix in the customer network.

Figure 16:
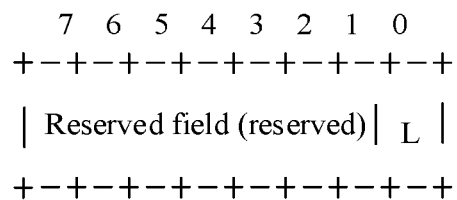
FIG. 16 is a schematic diagram of a structure of a flags field according to an embodiment of this application.

A non-key of a route is as follows:

Flags: a route flag, and marking whether a BIER prefix is a local BIER prefix of a PE where an originating router IP address is located. This field is one byte, as shown in FIG. 16. If an L bit is set to 1, it indicates that the prefix is a BFR prefix of the PE device.

Originating router IP address: an ID of a BIER VPN router that sends the route. If the provider network is an IPv4 network, the value is a public network IPv4 address. If the provider network is an IPv6 network, the value is a public network IPv6 address. This address uniquely identifies a PE device that sends the route in the provider network.

Figure 17:
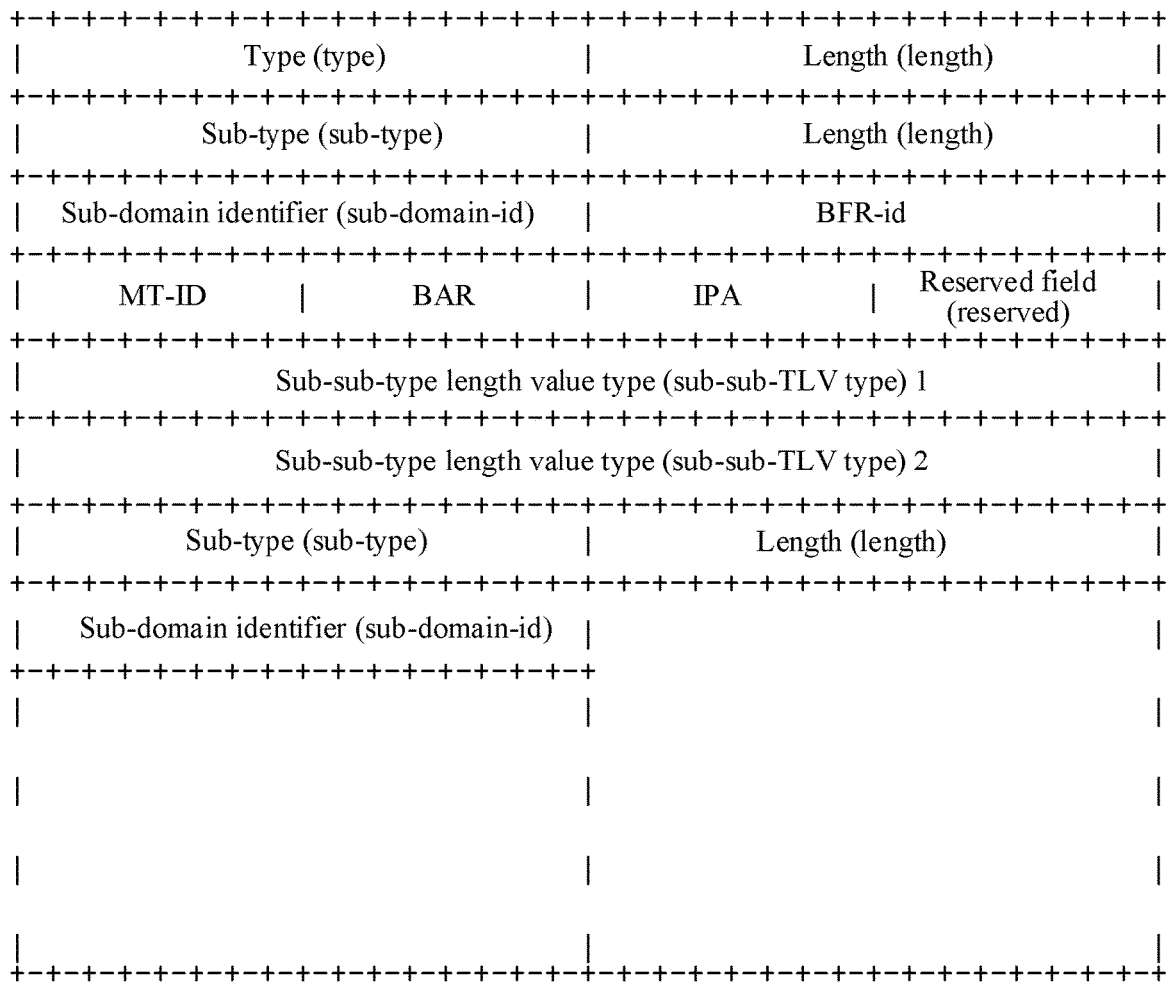
FIG. 17 is a schematic diagram of a structure of a sub-domain according to an embodiment of this application.

Further, the attribute of the route further includes a BIER service encapsulation attribute, which indicates a BIER encapsulation type (for example, BIER MPLS, BIER Ethernet, or BIERv6), a BFR ID, and other key BIER information of a customer BIER network. This attribute is a newly added BGP transitive path attribute, and the BGP transitive path attribute includes information about one or more sub-domains. For example, information about each sub-domain is carried by a sub-tlv shown in FIG. 17, and a sub-tlv of each sub-domain may carry one BFR ID (when the sub-domain does not carry a BFR ID, a field corresponding to a value of the BFR ID is set to 0.) Meanings of main fields shown in FIG. 17 are as follows:

Type: a newly added BGP attribute type, which is TBD.

Sub-type: a sub-TLV type of a BIER sub-domain, which is TBD.

Figure 18:
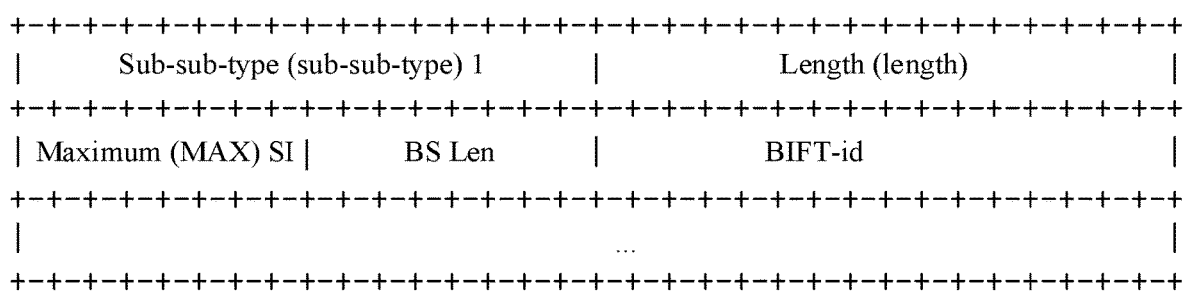
FIG. 18 is a schematic diagram of a structure of a sub-sub-type length value type according to an embodiment of this application.
Figure 19:
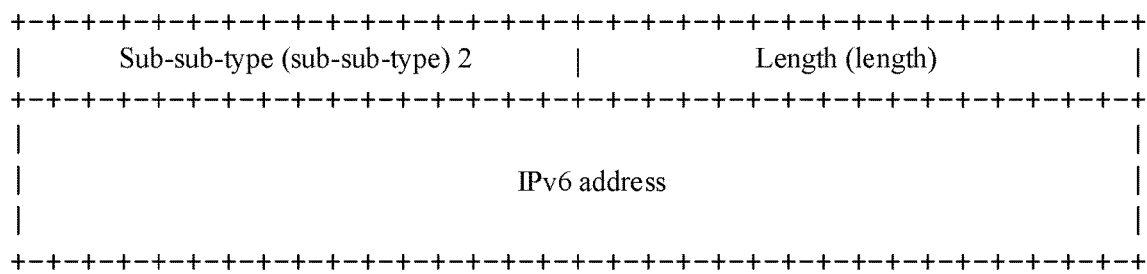
FIG. 19 is a schematic diagram of a structure of another sub-sub-type length value type according to an embodiment of this application.

In a possible implementation, the BGP transitive path attribute may further include zero or more BSL encapsulation types, that is, a sub-sub-type length value type (sub-sub-TLV type), including a sub-sub-TLV type 1 and a sub-sub-TLV type 2. For example, as shown in FIG. 18, a corresponding sub-domain and BSL encapsulation type are indicated through a sub-sub-TLV type field. When the customer network uses BIER IPv6, the attribute further includes a BIER IPv6 policy address of the sub-sub-TLV field. For example, as shown in FIG. 19, the IPv6 address is a BIER IPv6 policy address.

For ease of understanding, based on the BIER encapsulation type of the customer network and a type of the provider public network multicast tunnel, the method provided in embodiments of this application is described by using examples based on the following several scenarios.

Scenario 1: BIER MPLS over MPLS P2MP

BIER MPLS over MPLS P2MP means that BIER MPLS is used between a customer network and a PE thereof, and MPLS P2MP is used between PEs, that is, a BIER encapsulation type of the customer network is BIER MPLS, and a type of the provider public network multicast tunnel is MPLS P2MP.

Figure 20:
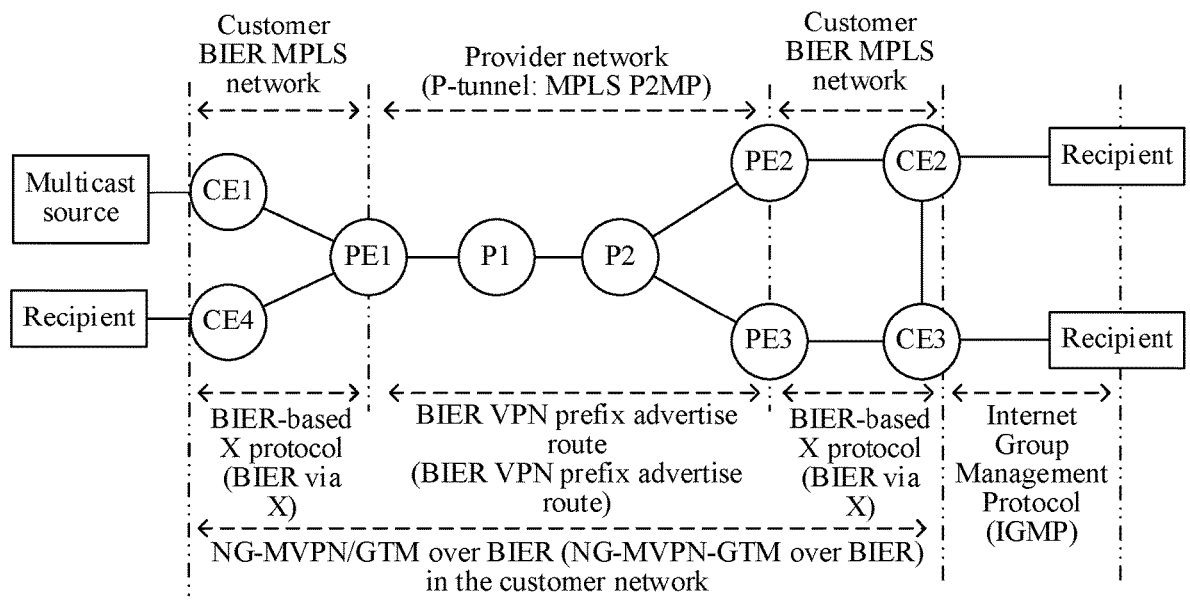
FIG. 20 is a diagram of another implementation environment of packet transmission according to an embodiment of this application.

For example, refer to FIG. 20. In this embodiment, the customer network performs BIER MPLS encapsulation and carries BIER information through ISIS signaling, and an MPLS P2MP public network multicast tunnel is used between provider PEs. This embodiment of this application does not depend on an MPLS P2MP signaling type used in a public network. Therefore, in this embodiment, a multicast label distribution protocol (MLDP) tunnel is used as an example for description. In this embodiment, an example in which BFR IDs of devices CE1, CE2, CE3, and CE4 in the customer BIER network are respectively 1, 2, 3, and 4 and the BFR IDs are all located in a sub-domain 0 is used. Before the packet transmission method provided in embodiments of this application is performed, the following several configurations may be performed.

(1) Basic BIER VPN Configuration

RD and route target (RT) information of a VPN instance in which a BIER VPN is located are configured on a PE1, a PE2, and a PE3 respectively. The RD and the RT are for identifying the VPN. Therefore, either of the RD and the RT may be set, or both the RD and the RT may be set. This is not limited in this embodiment of this application. For example, on the PE1, the RD of the BIER VPN is configured to be 1:1, and both an import RT and an export RT are configured to be 1:1; on the PE2, the RD of the BIER VPN is configured to be 1:1, both the import RT and the export RT are configured to be 1:1; and on the PE3, the RD of the BIER VPN is configured to be 1:1, and both the import RT and the export RT are configured to be 1:1.

(2) Basic BGP Configuration

Public network loopback addresses 1.1.1.1, 2.2.2.2, and 3.3.3.3 are configured on the PE1, the PE2, and the PE3 respectively. An ISIS protocol is enabled on the provider public network to advertise loopback addresses to each other. BGP neighbors are configured on the PE1, the PE2, and the PE3, so that every two of the PE1, the PE2, and the PE3 establish a neighbor relationship with each other based on the loopback addresses, and each BGP neighbor is enabled to advertise the BGP route in this embodiment of this application.

(3) BIER VPN ID and P-Tunnel Configuration

Configuration example corresponding to PE1;

bier vpn-id 1.1.1.1 bier vpn-instance bier_vpn pmsi tunnel

MLDP

Configuration example corresponding to PE2;

bier vpn-id 2.2.2.2 bier vpn-instance bier_vpn pmsi tunnel

MLDP

Configuration example corresponding to PE3;
bier vpn-id 3.3.3.3
bier vpn-instance bier_vpn
  pmsi tunnel
    MLDP In addition to the foregoing configurations, MLDP signaling also needs to be configured between PE-P-PE devices in the provider public network to establish an MLDP public network P-tunnel.

Through the foregoing configurations, the PE1, the PE2, and the PE3 trigger sending of BIER VPN auto discovery (BIER VPN auto discovery) routes to each other, which includes but is not limited to the following processes.

A1: The PE1 receives a BIER VPN auto discovery route from the PE2, where the RD is 1:1, the BIER VPN ID is 2.2.2.2, and the route carries a PTA attribute of the MLDP type. Therefore, the PE1 triggers MLDP signaling to establish a P2MP label switching path (LSP) with the PE2 as a root. The PE1 receives a BIER VPN auto discovery route from the PE3, where the RD is 1:1, the BIER VPN ID is 3.3.3.3, and the route carries a PTA attribute of the MLDP type. Therefore, the PE1 triggers MLDP signaling to establish a P2MP LSP with the PE3 as a root.

B1: The PE2 receives a BIER VPN auto discovery route from the PE1, where the RD is 1:1, the BIER VPN ID is 1.1.1.1, and the route carries a PTA attribute of the MLDP type. Therefore, the PE2 triggers MLDP signaling to establish a P2MP LSP with the PE1 as a root. The PE2 receives a BIER VPN auto discovery route from the PE3, where the RD is 1:1, the BIER VPN ID is 3.3.3.3, and the route carries a PTA attribute of the MLDP type. Therefore, the PE2 triggers MLDP signaling to establish a P2MP LSP with the PE3 as a root.

C1: The PE3 receives a BIER VPN auto discovery route from the PE1, where the RD is 1:1, the BIER VPN ID is 1.1.1.1, and the route carries a PTA attribute of the MLDP type. Therefore, the PE3 triggers MLDP signaling to establish a P2MP LSP with the PE1 as a root. The PE3 receives a BIER VPN auto discovery route from the PE2, where the RD is 1:1, the BIER VPN ID is 2.2.2.2, and the route carries a PTA attribute of the MLDP type. Therefore, the PE3 triggers MLDP signaling to establish a P2MP LSP with the PE2 as a root.

(4) Configure BIER Sub-Domain 0 on PE1/PE2/PE3 and Enable ISIS and BGP BIER Prefix Advertisement
Configuration example;
Bier vpn-instance bier_vpn
  sub-domain 0
    bfr-interface loopback 0
    encapsulation-type mpls bsl 64 max-si 255
    protocol isis
    protocol bgp Through the foregoing configurations, the PE1 sends BFR prefixes and BIER MPLS encapsulation information of the CE1 and the CE4 to the PE2 and the PE3, the PE2 sends BFR prefixes and BIER MPLS encapsulation information of the CE2 and the CE3 to the PE1 and the PE3, and the PE3 sends the BFR prefixes and the BIER MPLS encapsulation information of the CE2 and the CE3 to the PE2 and the PE1.

(5) Configure Priority Value of BFR Prefix of CE2 on PE2
It is assumed that the BFR prefix of the CE2 is 10.1.1.2
  #Configuration example corresponding to PE2;
  acl 100
    rule permit source 10.1.1.2 32;
  bier vpn-instance bier_vpn
    prefix acl 100 forwarding priority 2

Through the configuration of the priority value, a priority value carried in the BFR prefix of the CE2 sent by the PE2 to the PE1 and the PE3 is 2, no priority value is carried in a BFR prefix of the CE3 sent by the PE2 to the PE1 and the PE3, and no priority value is carried in the BFR prefixes of the CE2 and the CE3 sent by the PE3 to the PE2 and the PE1. The forwarding priority of the prefix configured on the PE2 is 2, which is higher than a default forwarding priority. Therefore, when the PE2 and the PE3 perform forwarding priority negotiation, the prefix of the CE2 has a forwarding priority on the PE2. Because both the PE2 and the PE3 use a default priority value for the prefix of the CE3, a device with a larger BIER VPN ID has a higher forwarding priority, and the prefix of the CE3 has a forwarding priority on the PE3.

Forwarding relationships formed on the PE1, the PE2, and the PE3 based on the foregoing service deployment are respectively as follows.

When the PE1 sends a customer BIER packet to a remote site, a bit mask in a corresponding forwarding relationship table is 0110, a multicast tunnel used is an MLDP tunnel, a root PE of the tunnel is the PE1, and leaf PEs are the PE2 and the PE3. When the PE1 receives a customer BIER packet sent by a remote site, a preferential forwarding bit mask (that is, a first forwarding bit mask) used by the PE1 is 1001 (for the CE1 and the CE4, only the PE1 receives advertisements from the local site, so that the PE1 has a forwarding priority for the CE1 and the CE4, and a bit corresponding to the BFR ID of the CE1 and a bit corresponding to the BFR ID of the CE4 in the preferential forwarding bit mask are set).

When the PE2 sends a customer BIER packet to a remote site, a bit mask in a corresponding forwarding relationship table is 1001, a multicast tunnel used is an MLDP tunnel, a root PE of the tunnel is the PE2, and leaf PEs are the PE1 and the PE3. When the PE2 receives a customer BIER packet sent by a remote site, a preferential forwarding bit mask (that is, a first forwarding bit mask) used by the PE2 is 0010.

When the PE3 sends a customer BIER packet to a remote site, a bit mask in a corresponding forwarding relationship table is 1001, a multicast tunnel used is an MLDP tunnel, a root PE of the tunnel is the PE3, and leaf PEs are the PE2 and the PE3. When the PE2 receives a customer BIER packet sent by a remote site, a preferential forwarding bit mask (that is, a first forwarding bit mask) used by the PE2 is 0100.

Figure 21:
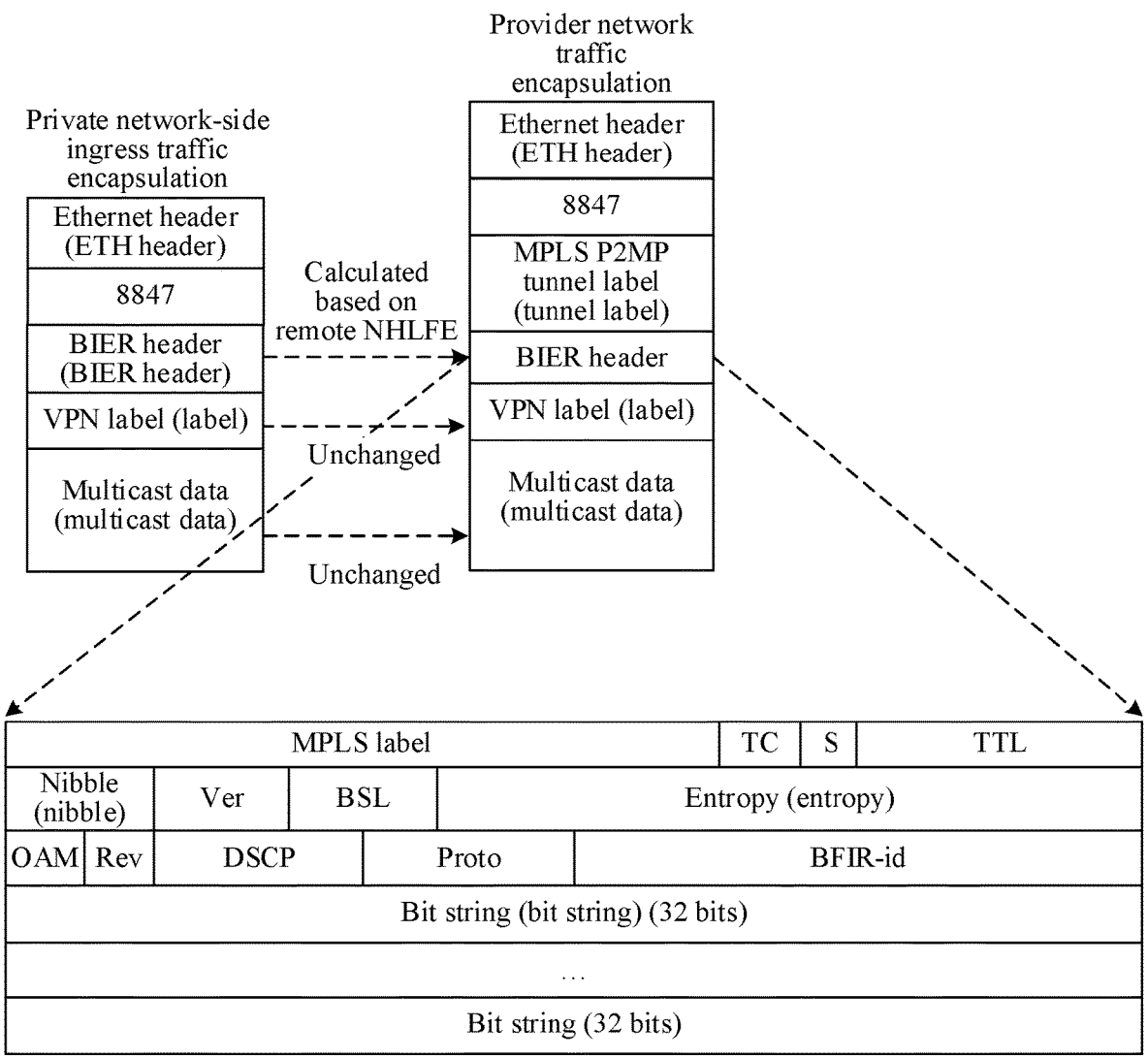
FIG. 21 is a schematic diagram of a mapping relationship between private network BIER traffic encapsulation and public network encapsulation on a PE1 for traffic sent by a multicast source according to an embodiment of this application.

Through the foregoing configuration deployment, a mapping relationship between private network BIER traffic encapsulation and public network encapsulation on a PE1 for traffic sent by a multicast source is shown in FIG. 21. The PE1 encapsulates a whole customer BIER packet (including a BIER header) in a public network P-tunnel, encapsulates the customer BIER packet (including the BIER header) in an MPLS P2MP tunnel, and determines a VPN instance based on an MPLS P2MP tunnel label. After receiving data from the public network P-tunnel and decapsulating the data, another PE identifies the BIER VPN instance to which the data belongs based on the MPLS P2MP tunnel label, searches for a forwarding relationship in the BIER VPN instance, and sends a data stream to the user equipment in the local site.

Scenario 2: BIERv6 Over MPLS P2MP

BIERv6 over MPLS P2MP means that BIERv6 is used between a customer network and a PE thereof, and MPLS P2MP is used between PEs, that is, a BIER encapsulation type of the customer network is BIERv6, and a type of the provider public network multicast tunnel is MPLS P2MP.

Figure 22:
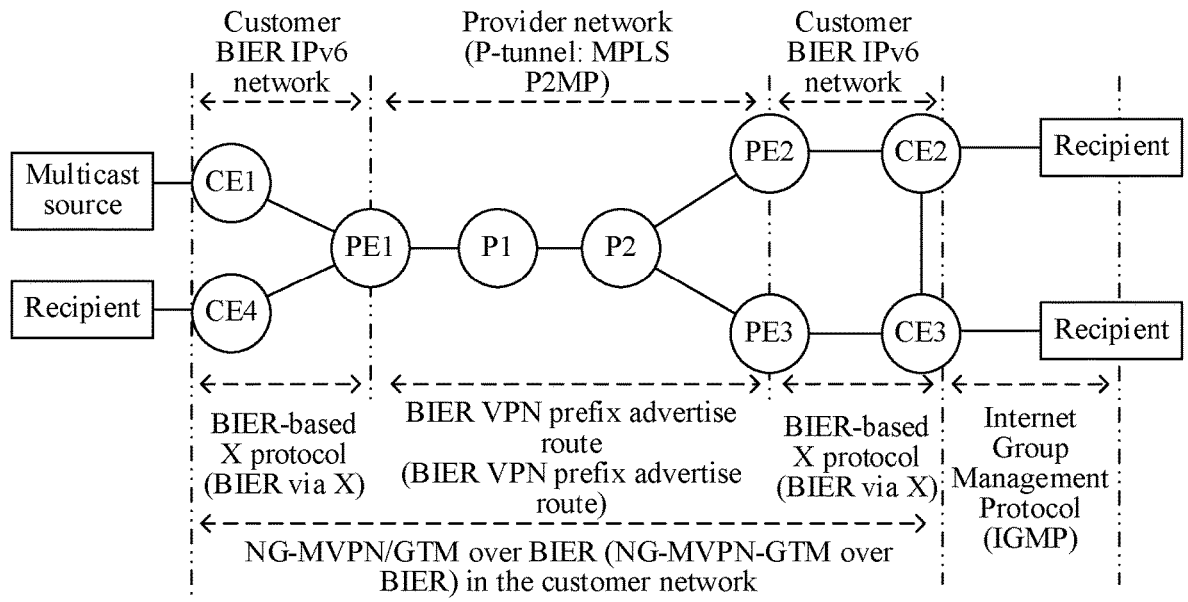
FIG. 22 is a diagram of another implementation environment of packet transmission according to an embodiment of this application.

For example, as shown in FIG. 22, in this embodiment, the customer network performs BIER IPv6 encapsulation and carries BIER information through ISIS signaling, and an MPLS P2MP public network multicast tunnel is used between provider PEs. This embodiment of this application does not depend on an MPLS P2MP signaling type used in a public network. Therefore, in this embodiment, an MLDP tunnel is used as an example for description. In this embodiment, an example in which BFR IDs of devices CE1, CE2, CE3, and CE4 in the customer BIER network are respectively 1, 2, 3, and 4 and the BFR IDs are all located in a sub-domain 0 is used. Before the packet transmission method provided in embodiments of this application is performed, the following several configurations may be performed.

(1) Basic BIER VPN Configuration

RD and RT information of a VPN instance in which a BIER VPN is located are configured on a PE1, a PE2, and a PE3 respectively. For example, on the PE1, the RD of the BIER VPN is configured to be 1:1, and both an import RT and an export RT are configured to be 1:1; on the PE2, the RD of the BIER VPN is configured to be 1:1, both the import RT and the export RT are configured to be 1:1; and on the PE3, the RD of the BIER VPN is configured to be 1:1, and both the import RT and the export RT are configured to be 1:1.

(2) Basic BGP Configuration

Public network loopback addresses 1.1.1.1, 2.2.2.2, and 3.3.3.3 are configured on the PE1, the PE2, and the PE3 respectively. An ISIS protocol is enabled on the provider public network to advertise loopback addresses to each other. BGP neighbors are configured on the PE1, the PE2, and the PE3, so that every two of the PE1, the PE2, and the PE3 establish a neighbor relationship with each other based on the loopback addresses, and each BGP neighbor is enabled to advertise the BGP route in the method provided in this embodiment of this application.

(3) BIER VPN ID and P-Tunnel Configuration

Configuration example corresponding to PE1;
   bier vpn-id 1.1.1.1
   bier vpn-instance bier_vpn
  pmsi tunnel
    MLDP
Configuration example corresponding to PE2;
   bier vpn-id 2.2.2.2
  bier vpn-instance bier_vpn
   pmsi tunnel
    MLDP
Configuration example corresponding to PE3;
   bier vpn-id 3.3.3.3
  bier vpn-instance bier_vpn
   pmsi tunnel
    MLDP In addition, MLDP signaling also needs to be configured between PE-P-PE devices in the provider public network to establish an MLDP public network P-tunnel.

Through the foregoing configurations, the PE1, the PE2, and the PE3 trigger sending of BIER VPN auto discovery routes to each other, which includes but is not limited to the following processes.

A2: The PE1 receives a BIER VPN auto discovery route from the PE2, where the RD is 1:1, the BIER VPN ID is 2.2.2.2, and the route carries a PTA attribute of the MLDP type. Therefore, the PE1 triggers MLDP signaling to establish a P2MP LSP with the PE2 as a root. The PE1 receives a BIER VPN auto discovery route from the PE3, where the RD is 1:1, the BIER VPN ID is 3.3.3.3, and the route carries a PTA attribute of the MLDP type. Therefore, the PE1 triggers MLDP signaling to establish a P2MP LSP with the PE3 as a root.

B2: The PE2 receives a BIER VPN auto discovery route from the PE1, where the RD is 1:1, the BIER VPN ID is 1.1.1.1, and the route carries a PTA attribute of the MLDP type. Therefore, the PE2 triggers MLDP signaling to establish a P2MP LSP with the PE1 as a root. The PE2 receives a BIER VPN auto discovery route from the PE3, where the RD is 1:1, the BIER VPN ID is 3.3.3.3, and the route carries a PTA attribute of the MLDP type. Therefore, the PE2 triggers MLDP signaling to establish a P2MP LSP with the PE3 as a root.

C2: The PE3 receives a BIER VPN auto discovery route from the PE1, where the RD is 1:1, the BIER VPN ID is 1.1.1.1, and the route carries a PTA attribute of the MLDP type. Therefore, the PE3 triggers MLDP signaling to establish a P2MP LSP with the PE1 as a root. The PE3 receives a BIER VPN auto discovery route from the PE2, where the RD is 1:1, the BIER VPN ID is 2.2.2.2, and the route carries a PTA attribute of the MLDP type. Therefore, the PE3 triggers MLDP signaling to establish a P2MP LSP with the PE2 as a root.

(4) Configure BIER Sub-Domain 0 on PE1/PE2/PE3 and Enable ISIS and BGP BIER Prefix Advertisement

Configuration example;
bier vpn-instance bier_vpn
  sub-domain 0 ipv6
    bfr-interface loopback 0
    encapsulation-type ipv6 bsl 64 max-si 255
    protocol isis
    protocol bgp Through the foregoing configurations, the PE1 sends BFR prefixes and BIER IPv6 encapsulation information of the CE1 and the CE4 to the PE2 and the PE3, the PE2 sends BFR prefixes and BIER IPv6 encapsulation information of the CE2 and the CE3 to the PE1 and the PE3, and the PE3 sends the BFR prefixes and the BIER IPv6 encapsulation information of the CE2 and the CE3 to the PE2 and the PE1.

(5) Configure Priority Value of BFR Prefix of CE2 on PE2

It is assumed that the BFR prefix of the CE2 is 10::1:2
   #Configuration example corresponding to PE2;
   acl 100
     rule permit source 10::1:2 128
    bier vpn-instance bier_vpn
     prefix acl 100 forwarding priority 2

Through the configuration of the priority value, a priority value carried in the BFR prefix of the CE2 sent by the PE2 to the PE1 and the PE3 is 2, no priority value is carried in a BFR prefix of the CE3 sent by the PE2 to the PE1 and the PE3, and no priority value is carried in the BFR prefixes of the CE2 and the CE3 sent by the PE3 to the PE2 and the PE1. The forwarding priority of the prefix configured on the PE2 is 2, which is higher than a default forwarding priority. Therefore, when the PE2 and the PE3 perform forwarding priority negotiation, the prefix of the CE2 has a forwarding priority on the PE2. Because both the PE2 and the PE3 use a default priority value for the prefix of the CE3, a device with a larger BIER VPN ID has a higher forwarding priority, so that the prefix of the CE3 has a forwarding priority on the PE3.

Forwarding relationships formed on the PE1, the PE2, and the PE3 based on the foregoing service deployment are respectively as follows:

When the PE1 sends a customer BIER packet to a remote site, a bit mask in a corresponding forwarding relationship table is 0110, a multicast tunnel used is an MLDP tunnel, a root PE of the tunnel is the PE1, and leaf PEs are the PE2 and the PE3. For the CE1 and the CE4, only the PE1 receives advertisements from the local site, so that the PE1 has a forwarding priority for CEs corresponding to the BFR ID 1 and the BFR ID 4, and when the PE1 receives a customer BIER packet sent by a remote site, a preferential forwarding bit mask used by the PE1 is 1001.

When the PE2 sends a customer BIER packet to a remote site, a bit mask in a corresponding forwarding relationship table is 1001, a multicast tunnel used is an MLDP tunnel, a root PE of the tunnel is the PE2, and leaf PEs are the PE1 and the PE3. When the PE2 receives a customer BIER packet sent by a remote site, a preferential forwarding bit mask used by the PE2 is 0010.

When the PE3 sends a customer BIER packet to a remote site, a bit mask in a corresponding forwarding relationship table is 1001, a multicast tunnel used is an MLDP tunnel, a root PE of the tunnel is the PE3, and leaf PEs are the PE2 and the PE3. When the PE2 receives a customer BIER packet sent by a remote site, a preferential forwarding bit mask used by the PE2 is 0100.

Figure 23:
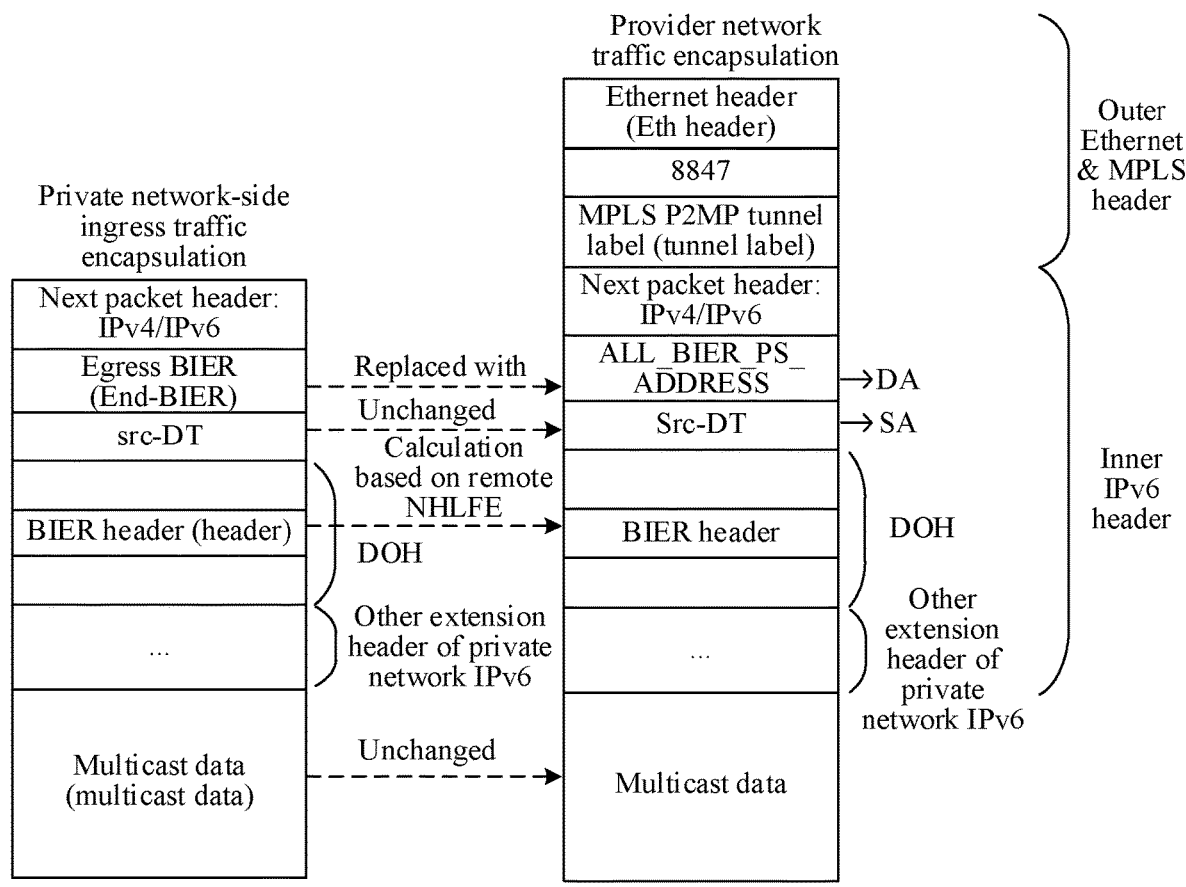
FIG. 23 is a schematic diagram of another mapping relationship between private network BIER traffic encapsulation and public network encapsulation on a PE1 for traffic sent by a multicast source according to an embodiment of this application.

Through the foregoing configuration deployment, a mapping relationship between private network BIER traffic encapsulation and public network encapsulation on a PE1 for traffic sent by a multicast source is shown in FIG. 23. A VPN instance is determined based on the MPLS P2MP tunnel label. ALL_BIER_PE_ADDRESS is a reserved multicast address. The PE1 encapsulates ALL_BIER_PE_ADDRESS in a destination address of a customer BIER IPv6 header when encapsulating a whole customer BIER packet (including a BIER header) in a public network P-tunnel. After receiving data from the public network P-tunnel and decapsulating the data, another PE identifies the specific IPv6 multicast address, searches for a BIER IPv6 forwarding relationship in the BIER VPN instance, and sends a data stream to the user equipment in the local site.

Scenario 3: BIER MPLS Over IPv4 Multicast

BIER MPLS over IPv4 multicast means that BIER MPLS is used between a customer network and a PE thereof, and IPv4 multicast is used between PEs, that is, a BIER encapsulation type of the customer network is BIER MPLS, and a type of the provider public network multicast tunnel is IPv4 multicast.

Figure 24:
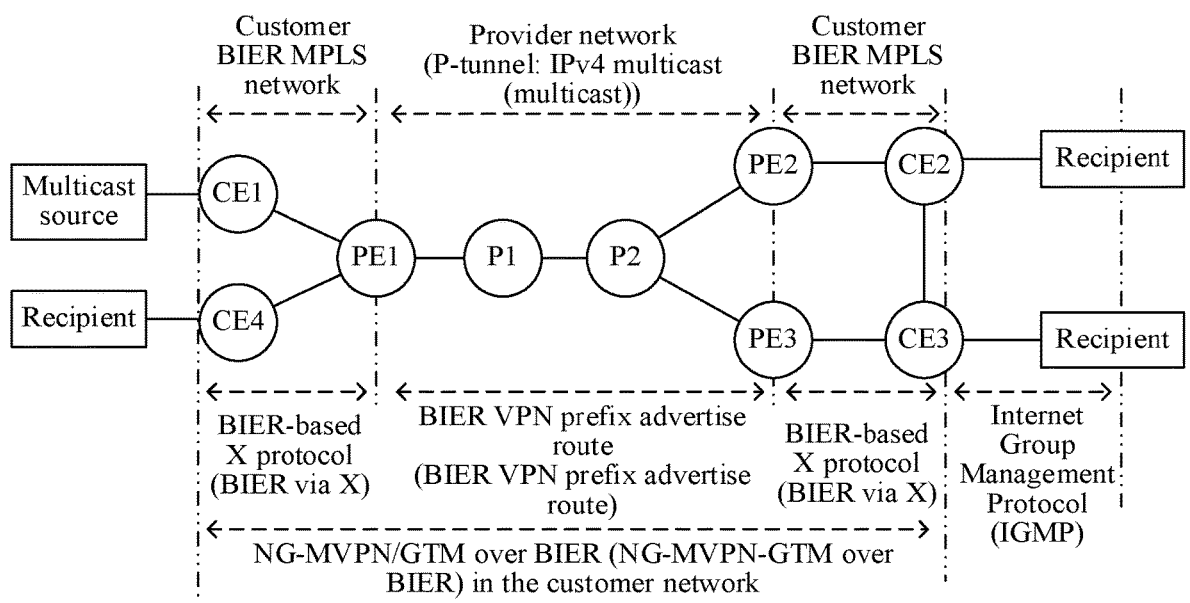
FIG. 24 is a diagram of another implementation environment of packet transmission according to an embodiment of this application.

For example, as shown in FIG. 24, in this embodiment, the customer network performs BIER MPLS encapsulation and carries BIER information through ISIS signaling, and an IPv4 multicast public network multicast tunnel is used between provider PEs. In this embodiment, only PIM SSM signaling is used for establishing the IPv4 multicast public network multicast tunnel. In actual deployment and application, PIM SM signaling may be used. This is not limited in this embodiment of this application. In this embodiment, an example in which BFR IDs of devices CE1, CE2, CE3, and CE4 in the customer BIER network are respectively 1, 2, 3, and 4 and the BFR IDs are all located in a sub-domain 0 is used for description. Before the packet transmission method provided in embodiments of this application is performed, the following several configurations may be performed.

(1) Basic BIER VPN Configuration

RD and RT information of a VPN instance in which a BIER VPN is located are configured on a PE1, a PE2, and a PE3 respectively. For example, on the PE1, the RD of the BIER VPN is configured to be 1:1, and both an import RT and an export RT are configured to be 1:1; on the PE2, the RD of the BIER VPN is configured to be 1:1, both the import RT and the export RT are configured to be 1:1; and on the PE3, the RD of the BIER VPN is configured to be 1:1, and both the import RT and the export RT are configured to be 1:1.

(2) Basic BGP Configuration

Public network loopback addresses 1.1.1.1, 2.2.2.2, and 3.3.3.3 are configured on the PE1, the PE2, and the PE3 respectively. An ISIS protocol is enabled on the provider public network to advertise loopback addresses to each other. BGP neighbors are configured on the PE1, the PE2, and the PE3, so that every two of the PE1, the PE2, and the PE3 establish a neighbor relationship with each other based on the loopback addresses, and each BGP neighbor is enabled to advertise the BGP route in this embodiment of this application.

(3) BIER VPN ID and P-Tunnel Configuration

Configuration example corresponding to PE1;
   bier vpn-id 1.1.1.1
   bier vpn-instance bier_vpn
pmsi tunnel
pim ssm group 232.0.0.1 source 1.1.1.1
Configuration example corresponding to PE2;
   bier vpn-id 2.2.2.2
bier vpn-instance bier_vpn
   pmsi tunnel
   pim ssm group 232.0.0.2 source 2.2.2.2
Configuration example corresponding to PE3;
   bier vpn-id 3.3.3.3
bier vpn-instance bier_vpn
   pmsi tunnel
      pim ssm group 232.0.0.3 source 3.3.3.3

In addition, PIM signaling needs to be configured between PE-P-PE devices in the provider public network to establish a PIM SSM public network P-tunnel.

Through the foregoing configurations, the PE1, the PE2, and the PE3 trigger sending of BIER VPN auto discovery routes to each other, which includes but is not limited to the following processes.

A3: The PE1 receives a BIER VPN auto discovery route from the PE2, where the RD is 1:1, the BIER VPN ID is 2.2.2.2, and the route carries a PTA attribute of the PIM SSM type. Therefore, the PE1 triggers PIM signaling to send PIM SSM join of (2.2.2.2, 232.0.0.2) to the PE2. The PE1 receives a BIER VPN auto discovery route from the PE3, where the RD is 1:1, the BIER VPN ID is 3.3.3.3, and the route carries a PTA attribute of the PIM SSM type. Therefore, the PE1 triggers PIM signaling to send PIM SSM join of (3.3.3.3, 232.0.0.3) to the PE3.

B3: The PE2 receives a BIER VPN auto discovery route from the PE1, where the RD is 1:1, the BIER VPN ID is 1.1.1.1, and the route carries a PTA attribute of the PIM SSM type. Therefore, the PE2 triggers PIM signaling to send PIM SSM join of (1.1.1.1, 232.0.0.1) to the PE1. The PE2 receives a BIER VPN auto discovery route from the PE3, where the RD is 1:1, the BIER VPN ID is 3.3.3.3, and the route carries a PTA attribute of the PIM SSM type. Therefore, the PE2 triggers PIM signaling to send PIM SSM join of (3.3.3.3, 232.0.0.3) to the PE3.

C3: The PE3 receives a BIER VPN auto discovery route from the PE1, where the RD is 1:1, the BIER VPN ID is 1.1.1.1, and the route carries a PTA attribute of the PIM SSM type. Therefore, the PE3 triggers PIM signaling to send PIM SSM join of (1.1.1.1, 232.0.0.1) to the PE1. The PE3 receives a BIER VPN auto discovery route from the PE2, where the RD is 1:1, the BIER VPN ID is 2.2.2.2, and the route carries a PTA attribute of the PIM SSM type. Therefore, the PE3 triggers PIM signaling to send PIM SSM join of (2.2.2.2, 232.0.0.2) to the PE2.

(4) Configure BIER Sub-Domain 0 on PE1/PE2/PE3 and Enable ISIS and BGP BIER Prefix Advertisement
Configuration example;
bier vpn-instance bier_vpn
  sub-domain 0
    bfr-interface loopback 0
    encapsulation-type mpls bsl 64 max-si 255
    protocol isis
    protocol bgp Through the foregoing configurations, the PE1 sends BFR prefixes and BIER MPLS encapsulation information of the CE1 and the CE4 to the PE2 and the PE3, the PE2 sends BFR prefixes and BIER MPLS encapsulation information of the CE2 and the CE3 to the PE1 and the PE3, and the PE3 sends the BFR prefixes and the BIER MPLS encapsulation information of the CE2 and the CE3 to the PE2 and the PE1.

(5) Configure Priority Value of BFR Prefix of CE2 on PE2
It is assumed that the BFR prefix of the CE2 is 10.1.1.2
Configuration example corresponding to PE2;
acl 100
  rule permit source 10.1.1.2 32;
bier vpn-instance bier_vpn
  prefix acl 100 forwarding priority 2

Through the configuration of the priority value, a priority value carried in the BFR prefix of the CE2 sent by the PE2 to the PE1 and the PE3 is 2, no priority value is carried in a BFR prefix of the CE3 sent by the PE2 to the PE1 and the PE3, and no priority value is carried in the BFR prefixes of the CE2 and the CE3 sent by the PE3 to the PE2 and the PE1. The priority value of the prefix configured on the PE2 is 2, which is higher than a default forwarding priority. Therefore, when the PE2 and the PE3 perform forwarding priority negotiation, the prefix of the CE2 has a forwarding priority on the PE2. Because both the PE2 and the PE3 use a default forwarding priority value for the prefix of the CE3, a device with a larger BIER VPN ID has a higher forwarding priority, and the prefix of the CE3 has a forwarding priority on the PE3.

Forwarding relationships formed on the PE1, the PE2, and the PE3 based on the foregoing service deployment are respectively as follows:

When the PE1 sends a customer BIER packet to a remote site, a bit mask in a corresponding forwarding relationship table is 0110, a multicast tunnel used is an IPv4 SSM multicast tunnel (1.1.1.1, 232.0.0.1), a root PE of the tunnel is the PE1, and leaf PEs are the PE2 and the PE3. When the PE1 receives a customer BIER packet sent by a remote site, a preferential forwarding bit mask used by the PE1 is 1001 (for the CE1 and the CE4, only the PE1 receives advertisements from the local site, so that the PE1 has a forwarding priority for the CE1 and the CE4, and a bit corresponding to the BFR ID of the CE1 and a bit corresponding to the BFR ID of the CE4 in the preferential forwarding bit mask are set).

When the PE2 sends a customer BIER packet to a remote site, a bit mask in a corresponding forwarding relationship table is 1001, a multicast tunnel used is an IPv4 SSM multicast tunnel (2.2.2.2, 232.0.0.2), a root PE of the tunnel is the PE2, and leaf PEs are the PE1 and the PE3. When the PE2 receives a customer BIER packet sent by a remote site, a preferential forwarding bit mask used by the PE2 is 0010.

When the PE3 sends a customer BIER packet to a remote site, a bit mask in a corresponding forwarding relationship table is 1001, a multicast tunnel used is an IPv4 SSM multicast tunnel (3.3.3.3, 232.0.0.3), a root PE of the tunnel is the PE3, and leaf PEs are the PE2 and the PE3. When the PE2 receives a customer BIER packet sent by a remote site, a preferential forwarding bit mask used by the PE2 is 0100.

Figure 25:
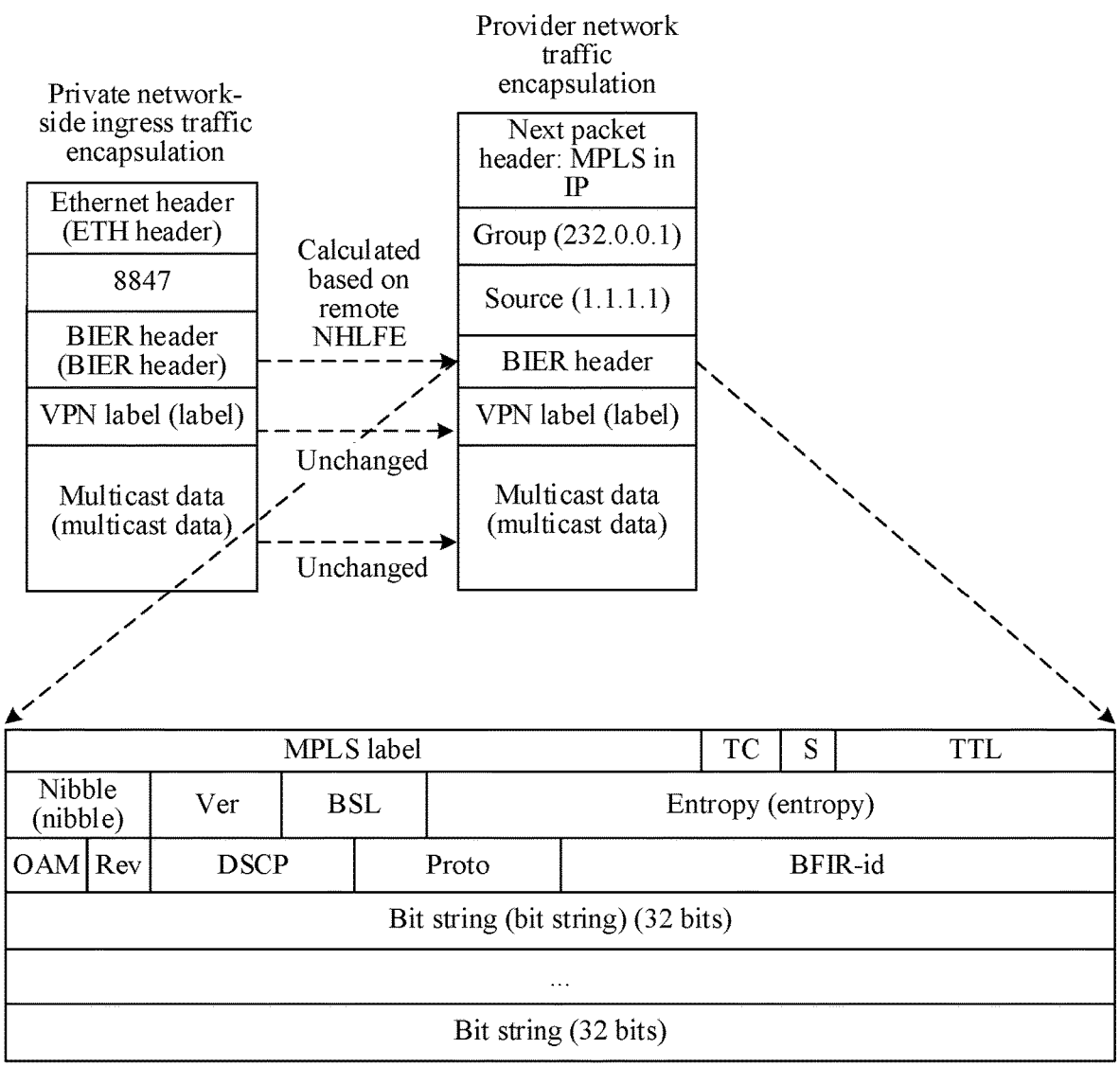
FIG. 25 is a schematic diagram of another mapping relationship between private network BIER traffic encapsulation and public network encapsulation on a PE1 for traffic sent by a multicast source according to an embodiment of this application.

Through the foregoing configuration deployment, a mapping relationship between private network BIER traffic encapsulation and public network encapsulation on a PE1 for traffic sent by a multicast source is shown in FIG. 25. A VPN instance can be determined based on a source address and a group address. When the PE1 encapsulates a whole customer BIER packet (including a BIER header) in a public network P-tunnel, the PE1 encapsulates a whole customer BIER MPLS packet into an IP packet as a load (a destination address of an IP header is the group address, and a source address is the source address), and a PE that receives the BIER packet may determine the VPN instance based on the source address and the group address. After receiving data from the public network P-tunnel and decapsulating the data, another PE determines the corresponding BIER VPN instance based on the source address and the group address in the packet, searches for a forwarding relationship in the instance, and sends a data stream to the user equipment in the local site.

Scenario 4: BIERv6 Over IPv6 Multicast

BIERv6 over IPv6 multicast means that BIERv6 is used between a customer network and a PE thereof, and IPv6 multicast is used between PEs, that is, a BIER encapsulation type of the customer network is BIERv6, and a type of the provider public network multicast tunnel is IPv6 multicast.

Figure 26:
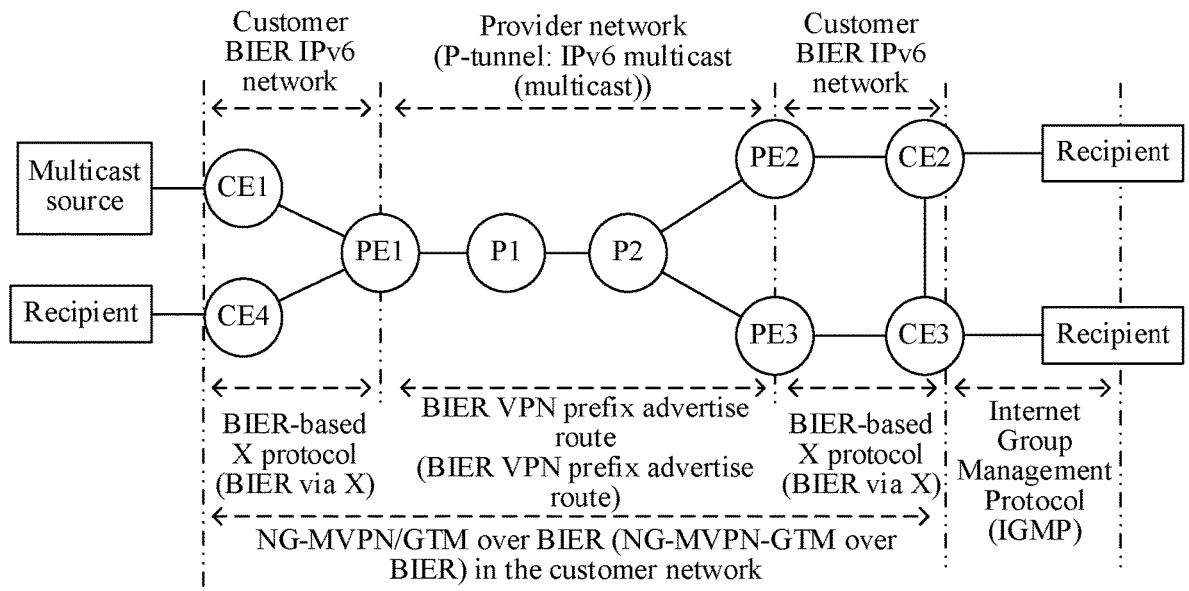
FIG. 26 is a diagram of another implementation environment of packet transmission according to an embodiment of this application.

For example, as shown in FIG. 26, in this embodiment, the customer network performs BIER IPv6 encapsulation and carries BIER information through ISIS signaling, and an IPv6 multicast public network multicast tunnel is used between provider PEs. In this embodiment, only PIM SSM signaling is used for establishing the IPv6 multicast public network multicast tunnel. In actual deployment and application, PIM SM signaling may be used. This is not limited in this embodiment of this application. In this embodiment, an example in which BFR IDs of devices CE1, CE2, CE3, and CE4 in the customer BIER network are respectively 1, 2, 3, and 4 and the BFR IDs are all located in a sub-domain 0 is used. Before the packet transmission method provided in embodiments of this application is performed, the following several configurations may be performed.

(1) Basic BIER VPN Configuration

RD and RT information of a VPN instance in which a BIER VPN is located are configured on a PE1, a PE2, and a PE3 respectively. For example, on the PE1, the RD of the BIER VPN is configured to be 1:1, and both an import RT and an export RT are configured to be 1:1; on the PE2, the RD of the BIER VPN is configured to be 1:1, both the import RT and the export RT are configured to be 1:1; and on the PE3, the RD of the BIER VPN is configured to be 1:1, and both the import RT and the export RT are configured to be 1:1.

(2) Basic BGP Configuration

Public network loopback addresses 1::1, 2::2, and 3::3 are configured on the PE1, the PE2, and the PE3 respectively. An ISIS protocol is enabled on the provider public network to advertise loopback addresses to each other. BGP neighbors are configured on the PE1, the PE2, and the PE3, so that every two of the PE1, the PE2, and the PE3 establish a neighbor relationship with each other based on the loopback addresses, and each BGP neighbor is enabled to advertise the BGP route in this embodiment of this application.

(3) BIER VPN ID and P-Tunnel Configuration
Configuration example corresponding to PE1;
   bier ipv6-vpn-id 1::1
   bier vpn-instance bier_vpn
    pmsi tunnel
    pim ipv6 ssm group ff3f::1 source 1::1
Configuration example corresponding to PE2;
   bier vpn-id 2::2
   bier vpn-instance bier_vpn
    pmsi tunnel
    pim ipv6 ssm group ff3f::2 source 2::2
Configuration example corresponding to PE3;
   bier vpn-id 3::3
   bier vpn-instance bier_vpn
    pmsi tunnel
    pim ssm group ff3f::3 source 3::3

In addition, IPv6 PIM signaling needs to be configured between PE-P-PE devices in the provider public network to establish a PIM SSM public network P-tunnel.

Through the foregoing configurations, the PE1, the PE2, and the PE3 trigger sending of BIER VPN auto discovery routes to each other:

A4: The PE1 receives a BIER VPN auto discovery route from the PE2, where the RD is 1:1, the BIER VPN ID is 2::2, and the route carries a PTA attribute of the PIM SSM type. Therefore, the PE1 triggers PIM signaling to send PIM SSM join of (2::2, ff3f::2) to the PE2. The PE1 receives a BIER VPN auto discovery route from the PE3, where the RD is 1:1, the BIER VPN ID is 3::3, and the route carries a PTA attribute of the PIM SSM type. Therefore, the PE1 triggers PIM signaling to send PIM SSM join of (3::3, ff3f::3) to the PE3.

B4: The PE2 receives a BIER VPN auto discovery route from the PE1, where the RD is 1:1, the BIER VPN ID is 1::1, and the route carries a PTA attribute of the PIM SSM type. Therefore, the PE2 triggers PIM signaling to send PIM SSM join of (1::1, ff3f::1) to the PE1. The PE2 receives a BIER VPN auto discovery route from the PE3, where the RD is 1:1, the BIER VPN ID is 3::3, and the route carries a PTA attribute of the PIM SSM type. Therefore, the PE2 triggers PIM signaling to send PIM SSM join of (3::3, ff3f::3) to the PE3.

C4: The PE3 receives a BIER VPN auto discovery route from the PE1, where the RD is 1:1, the BIER VPN ID is 1::1, and the route carries a PTA attribute of the PIM SSM type. Therefore, the PE3 triggers PIM signaling to send PIM SSM join of (1::1, ff3f::1) to the PE1. The PE3 receives a BIER VPN auto discovery route from the PE2, where the RD is 1:1, the BIER VPN ID is 2::2, and the route carries a PTA attribute of the PIM SSM type. Therefore, the PE3 triggers PIM signaling to send PIM SSM join of (2::2, ff3f::2) to the PE2.

(4) Configure BIER Sub-Domain 0 on PE1/PE2/PE3 and Enable ISIS and BGP BIER Prefix Advertisement
Configuration example;
   bier vpn-instance bier_vpn
    sub-domain 0 ipv6
      bfr-interface loopback 0
      encapsulation-type ipv6 bsl 64 max-si 255
      protocol isis
      protocol bgp Through the foregoing configurations, the PE1 sends BFR prefixes and BIER IPv6 encapsulation information of the CE1 and the CE4 to the PE2 and the PE3, the PE2 sends BFR prefixes and BIER IPv6 encapsulation information of the CE2 and the CE3 to the PE1 and the PE3, and the PE3 sends the BFR prefixes and the BIER IPv6 encapsulation information of the CE2 and the CE3 to the PE2 and the PE1.

(5) Configure Priority Value of BFR Prefix of CE2 on PE2
It is assumed that the BFR prefix of the CE2 is 10::1:2
Configuration example corresponding to PE2;
   acl 100
    rule permit source 10::1:2 128;
   bier vpn-instance bier_vpn
    prefix acl 100 forwarding priority 2

Through the configuration of the priority value, a priority value carried in the BFR prefix of the CE2 sent by the PE2 to the PE1 and the PE3 is 2, no priority value is carried in a BFR prefix of the CE3 sent by the PE2 to the PE1 and the PE3, and no priority value is carried in the BFR prefixes of the CE2 and the CE3 sent by the PE3 to the PE2 and the PE1. The priority value of the prefix configured on the PE2 is 2, which is higher than a default forwarding priority. Therefore, when the PE2 and the PE3 perform forwarding priority negotiation, the prefix of the CE2 has a forwarding priority on the PE2. Because both the PE2 and the PE3 use a default forwarding priority value for the prefix of the CE3, a device with a larger BIER VPN ID has a higher forwarding priority, and the prefix of the CE3 has a forwarding priority on the PE3.

Forwarding relationships formed on the PE1, the PE2, and the PE3 based on the foregoing service deployment are respectively as follows:

When the PE1 sends a customer BIER packet to a remote site, a bit mask in a corresponding forwarding relationship table is 0110, a multicast tunnel used is an IPv6 SSM multicast tunnel (1::1, ff3f::1), a root PE of the tunnel is the PE1, and leaf PEs are the PE2 and the PE3. When the PE1 receives a customer BIER packet sent by a remote site, a preferential forwarding bit mask used by the PE1 is 1001 (for the CE1 and the CE4, only the PE1 receives advertisements from the local site, so that the PE1 has a forwarding priority for the CE1 and the CE4, and a bit corresponding to the BFR ID of the CE1 and a bit corresponding to the BFR ID of the CE4 in the preferential forwarding bit mask are set).

When the PE2 sends a customer BIER packet to a remote site, a bit mask in a corresponding forwarding relationship table is 1001, a multicast tunnel used is an IPv6 SSM multicast tunnel (2::2, ff3f::2), a root PE of the tunnel is the PE2, and leaf PEs are the PE1 and the PE3. When the PE2 receives a customer BIER packet sent by a remote site, a preferential forwarding bit mask used by the PE2 is 0010.

When the PE3 sends a customer BIER packet to a remote site, a bit mask in a corresponding forwarding relationship table is 1001, a multicast tunnel used is an IPv6 SSM multicast tunnel (3::3, ff3f::3), a root PE of the tunnel is the PE3, and leaf PEs are the PE2 and the PE3. When the PE2 receives a customer BIER packet sent by a remote site, a preferential forwarding bit mask used by the PE2 is 0100.

Figure 27:
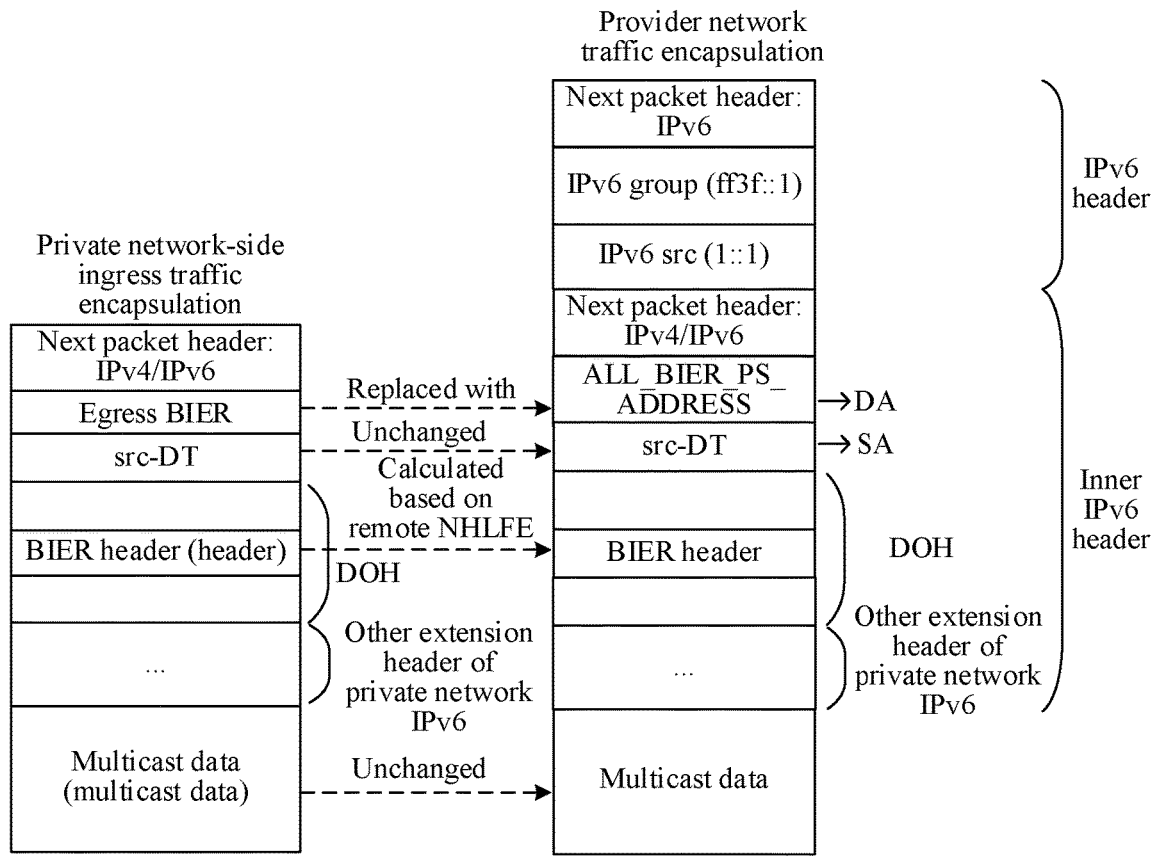
FIG. 27 is a schematic diagram of another mapping relationship between private network BIER traffic encapsulation and public network encapsulation on a PE1 for traffic sent by a multicast source according to an embodiment of this application.

Through the foregoing configuration deployment, a mapping relationship between private network BIER traffic encapsulation and public network encapsulation on a PE1 for traffic sent by a multicast source is shown in FIG. 27. A VPN instance can be determined based on an IPv6 src address and a group address. ALL_BIER_PE_ADDRESS is a reserved multicast address. The PE1 encapsulates ALL_BIER_PE_ADDRESS in a destination address of a customer BIER IPv6 header when encapsulating a whole customer BIER packet (including a BIER header) in a public network P-tunnel. After receiving data from the public network P-tunnel and decapsulating the data, another PE determines the VPN instance based on the src address and the group address, identifies the specific IPv6 multicast address, searches for a BIER IPv6 forwarding relationship in the BIER VPN instance, and sends a data stream to the user equipment in the local site.

Scenario 5: BIERv6 Over VXLAN Multicast

BIERv6 over VXLAN multicast means that BIERv6 is used between a customer network and a PE thereof, and VXLAN is used between PEs, that is, a BIER encapsulation type of the customer network is BIERv6, and a type of the provider public network multicast tunnel is VXLAN multicast.

Figure 28:
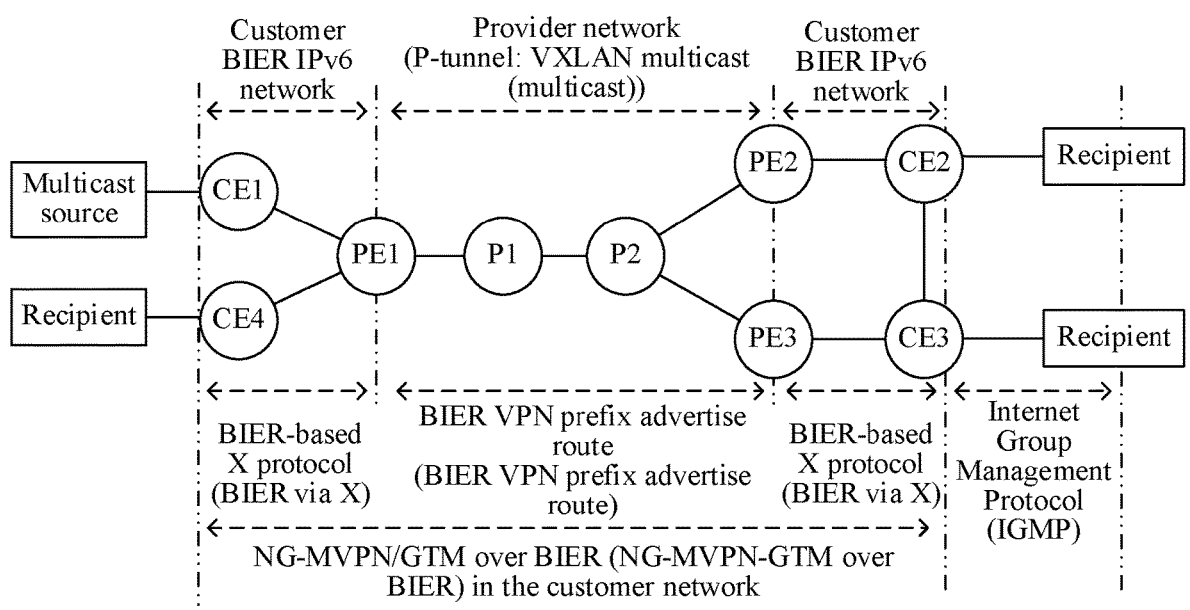
FIG. 28 is a diagram of another implementation environment of packet transmission according to an embodiment of this application.

For example, as shown in FIG. 28, in this embodiment, the customer network performs BIER IPv6 encapsulation and carries BIER information through ISIS signaling, and a VXLAN overlay IPv4 multicast public network multicast tunnel is used between provider PEs. In this embodiment, only PIM SM signaling is used for establishing the IPv4 multicast public network multicast tunnel. In actual deployment and application, PIM SSM signaling may be used. This is not limited in this embodiment of this application. In this embodiment, an example in which BFR IDs of devices CE1, CE2, CE3, and CE4 in the customer BIER network are respectively 1, 2, 3, and 4 and the BFR IDs are all located in a sub-domain 0 is used. Before the packet transmission method provided in embodiments of this application is performed, the following several configurations may be performed.

(1) Basic BIER VPN Configuration

RD and RT information of a VPN instance in which a BIER VPN is located are configured on a PE1, a PE2, and a PE3 respectively. For example, on the PE1, the RD of the BIER VPN is configured to be 1:1, and both an import RT and an export RT are configured to be 1:1; on the PE2, the RD of the BIER VPN is configured to be 1:1, both the import RT and the export RT are configured to be 1:1; and on the PE3, the RD of the BIER VPN is configured to be 1:1, and both the import RT and the export RT are configured to be 1:1.

(2) Basic BGP Configuration

Public network loopback addresses 1.1.1.1, 2.2.2.2, and 3.3.3.3 are configured on the PE1, the PE2, and the PE3 respectively. An ISIS protocol is enabled on the provider public network to advertise loopback addresses to each other. BGP neighbors are configured on the PE1, the PE2, and the PE3, so that every two of the PE1, the PE2, and the PE3 establish a neighbor relationship with each other based on the loopback addresses, and each BGP neighbor is enabled to advertise the BGP route in this embodiment of this application.

(3) BIER VPN ID and P-Tunnel Configuration

Configuration example corresponding to PE1;
   bier vpn-id 1.1.1.1 #Configure BIER VPN ID
interface nve
vni 5010 multicast group 225.0.0.1 #Configure VXLAN multicast tunnel
ip vpn-instance bier_vpn
vxlan vni 5010 #VXLAN VNI used by L3VPN instance corresponding to BIER VPN
bier vpn-instance bier_vpn
pmsi tunnel #Configure VXLAN multicast tunnel used by BIER VPN
vxlan static

Configuration example corresponding to PE2;
   bier vpn-id 2.2.2.2 #Configure BIER VPN ID
interface nve
vni 5010 multicast group 225.0.0.1 #Configure VXLAN multicast tunnel
ip vpn-instance bier_vpn
vxlan vni 5010 #VXLAN VNI used by L3VPN instance corresponding to BIER VPN
bier vpn-instance bier_vpn
pmsi tunnel #Configure VXLAN multicast tunnel used by BIER VPN
vxlan static

Configuration example corresponding to PE3;
   bier vpn-id 3.3.3.3 #Configure BIER VPN ID
interface nve
vni 5010 multicast group 225.0.0.1 #Configure VXLAN multicast tunnel
ip vpn-instance bier_vpn
vxlan vni 5010 #VXLAN VNI used by L3VPN instance corresponding to BIER VPN
bier vpn-instance bier_vpn
pmsi tunnel #Configure VXLAN multicast tunnel used by BIER VPN
vxlan static In addition, PIM signaling also needs to be configured between PE-P-PE devices in the provider public network to establish a VXLAN over PIM SM multicast tunnel. The interface nve configuration on each PE triggers PIM SM signaling to send (*, G) join on the provider public network to establish a PIM SM forwarding entry to carry VXLAN data.

Through the foregoing configurations, the PE1, the PE2, and the PE3 trigger sending of BIER VPN auto discovery routes to each other:

A5: The PE1 receives a BIER VPN auto discovery route from the PE2, where the RD is 1:1, and the BIER VPN ID is 2.2.2.2. The PE1 receives a BIER VPN auto discovery route from the PE3, where the RD is 1:1, and the BIER VPN ID is 3.3.3.3.

B5: The PE2 receives a BIER VPN auto discovery route from the PE1, where the RD is 1:1, and the BIER VPN ID is 1.1.1.1. The PE2 receives a BIER VPN auto discovery route from the PE3, where the RD is 1:1, and the BIER VPN ID is 3.3.3.3.

C5: The PE3 receives a BIER VPN auto discovery route from the PE1, where the RD is 1:1, and the BIER VPN ID is 1.1.1.1. The PE3 receives a BIER VPN auto discovery route from the PE2, where the RD is 1:1, and the BIER VPN ID is 2.2.2.2.

(4) Configure BIER Sub-Domain 0 on PE1/PE2/PE3 and Enable ISIS and BGP BIER Prefix Advertisement

Configuration example;
bier vpn-instance bier_vpn
   sub-domain 0 ipv6
     bfr-interface loopback 0
     encapsulation-type ipv6 bsl 64 max-si 255
     protocol isis
     protocol bgp Through the foregoing configurations, the PE1 sends BFR prefixes and BIER IPv6 encapsulation information of the CE1 and the CE4 to the PE2 and the PE3, the PE2 sends BFR prefixes and BIER IPv6 encapsulation information of the CE2 and the CE3 to the PE1 and the PE3, and the PE3 sends the BFR prefixes and the BIER IPv6 encapsulation information of the CE2 and the CE3 to the PE2 and the PE1.

(5) Configure Priority Value of BFR Prefix of CE2 on PE2

It is assumed that the BFR prefix of the CE2 is 10::1:2

Configuration example corresponding to PE2;
acl 100
    rule permit source 10::1:2 128;
bier vpn-instance bier_vpn
    prefix acl 100 forwarding priority 2

Through the configuration of the priority value, a priority value carried in the BFR prefix of the CE2 sent by the PE2 to the PE1 and the PE3 is 2, no priority value is carried in a BFR prefix of the CE3 sent by the PE2 to the PE1 and the PE3, and no priority value is carried in the BFR prefixes of the CE2 and the CE3 sent by the PE3 to the PE2 and the PE1. The priority value of the prefix configured on the PE2 is 2, which is higher than a default forwarding priority. Therefore, when the PE2 and the PE3 perform forwarding priority negotiation, the prefix of the CE2 has a forwarding priority on the PE2. Because both the PE2 and the PE3 use a default priority value for the prefix of the CE3, a device with a larger BIER VPN ID has a higher forwarding priority, and the prefix of the CE3 has a forwarding priority on the PE3.

Forwarding relationships formed on the PE1, the PE2, and the PE3 based on the foregoing service deployment are respectively as follows:

When the PE1 sends a customer BIER packet to a remote site, a bit mask in a corresponding forwarding relationship table is 0110, a multicast tunnel used is a VXLAN multicast tunnel (a VNI is 5010, a source ip is 1.1.1.1, and a group ip is 225.0.0.1), a root PE of the tunnel is the PE1, and leaf PEs are the PE2 and the PE3. When the PE1 receives a customer BIER packet sent by a remote site, a preferential forwarding bit mask used by the PE1 is 1001 (for the CE1 and the CE4, only the PE1 receives advertisements from the local site, so that the PE1 has a forwarding priority for the CE1 and the CE4, and a bit corresponding to the BFR ID of the CE1 and a bit corresponding to the BFR ID of the CE4 in the preferential forwarding bit mask are set).

When the PE2 sends a customer BIER packet to a remote site, a bit mask in a corresponding forwarding relationship table is 1001, a multicast tunnel used is a VXLAN multicast tunnel (a VNI is 5010, a source ip is 2.2.2.2, and a group ip is 225.0.0.1), a root PE of the tunnel is the PE2, and leaf PEs are the PE1 and the PE3. When the PE2 receives a customer BIER packet sent by a remote site, a preferential forwarding bit mask used by the PE2 is 0010.

When the PE3 sends a customer BIER packet to a remote site, a bit mask in a corresponding forwarding relationship table is 1001, a multicast tunnel used is a VXLAN multicast tunnel (a VNI is 5010, a source ip is 3.3.3.3, and a group ip is 225.0.0.1), a root PE of the tunnel is the PE3, and leaf PEs are the PE2 and the PE3. When the PE2 receives a customer BIER packet sent by a remote site, a preferential forwarding bit mask used by the PE2 is 0100.

Figure 29:
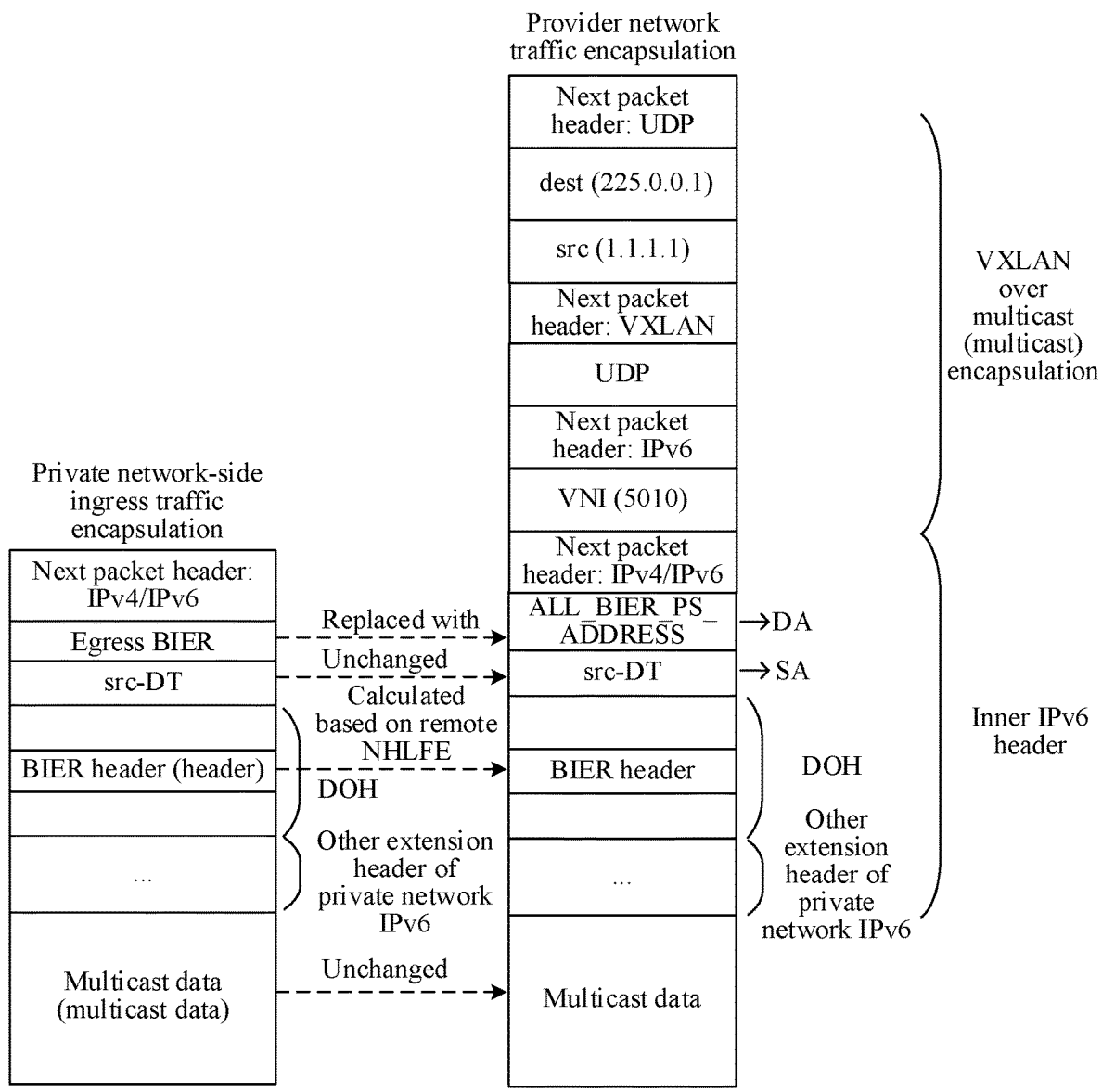
FIG. 29 is a schematic diagram of another mapping relationship between private network BIER traffic encapsulation and public network encapsulation on a PE1 for traffic sent by a multicast source according to an embodiment of this application.

Through the foregoing configuration deployment, a mapping relationship between private network BIER traffic encapsulation and public network encapsulation on a PE1 for traffic sent by a multicast source is shown in FIG. 29. The VNI is used for determining a VPN instance. ALL_BIER_PE_ADDRESS is a reserved multicast address. The PE1 encapsulates ALL_BIER_PE_ADDRESS in a destination address of a customer BIER IPv6 header when encapsulating a whole customer BIER packet (including a BIER header) in a public network P-tunnel. After receiving data from the public network P-tunnel and decapsulating the data, another PE determines the VPN instance based on the VNI, identifies the specific IPv6 multicast address, searches for a BIER IPv6 forwarding relationship in the BIER VPN instance, and sends a data stream to the user equipment in the local site.

Scenario 6: BIER MPLS Over BIER MPLS

BIER MPLS over BIER MPLS means that BIER MPLS is used between a customer network and a PE thereof, and BIER MPLS is used between PEs, that is, a BIER encapsulation type of the customer network is BIER MPLS, and a type of the provider public network multicast tunnel is BIER MPLS.

Figure 30:
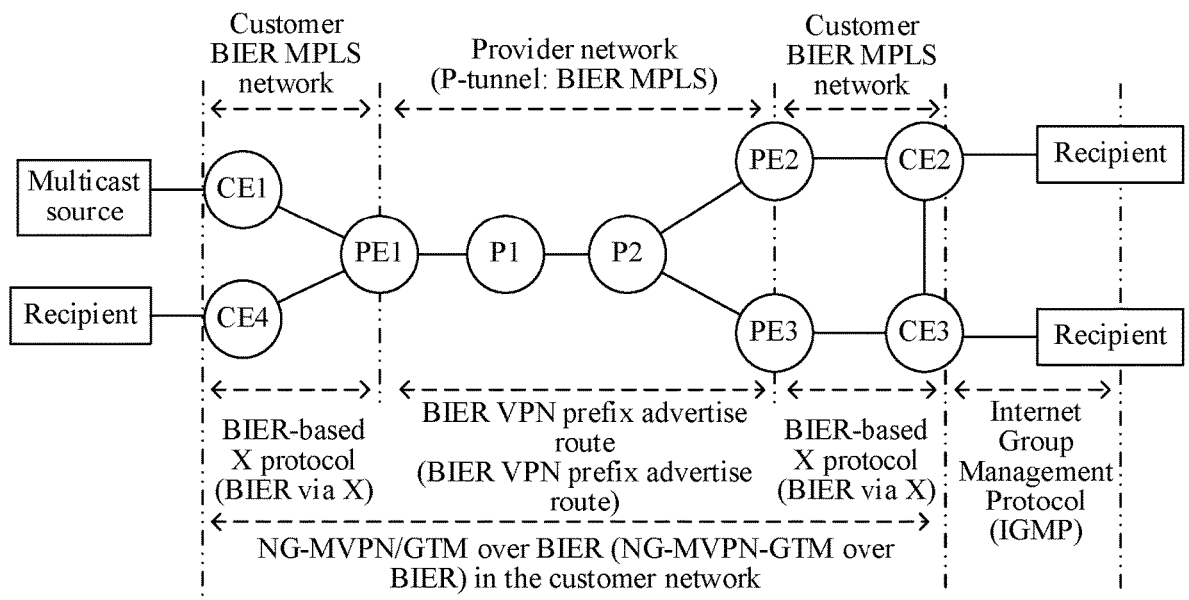
FIG. 30 is a diagram of another implementation environment of packet transmission according to an embodiment of this application.

For example, as shown in FIG. 30, in this embodiment, the customer network performs BIER MPLS encapsulation and carries BIER information through ISIS signaling, and a BIER MPLS public network multicast tunnel is used between provider PEs. In this embodiment, an example in which BFR IDs of devices CE1, CE2, CE3, and CE4 in the customer BIER network are respectively 1, 2, 3, and 4 and the BFR IDs are all located in a sub-domain 0 is used. BFR IDs of a PE1, a PE2, and a PE3 in a BIER MPLS tunnel of the provider public network are 1, 2, and 3 respectively, the BFR IDs are all located in the sub-domain 0 in the provider public network, and ISIS signaling is used for advertising public network BIER encapsulation information. Before the packet transmission method provided in embodiments of this application is performed, the following several configurations may be performed.

(1) Basic BIER VPN Configuration

RD and RT information of a VPN instance in which a BIER VPN is located are configured on a PE1, a PE2, and a PE3 respectively. For example, on the PE1, the RD of the BIER VPN is configured to be 1:1, and both an import RT and an export RT are configured to be 1:1; on the PE2, the RD of the BIER VPN is configured to be 1:1, both the import RT and the export RT are configured to be 1:1; and on the PE3, the RD of the BIER VPN is configured to be 1:1, and both the import RT and the export RT are configured to be 1:1.

(2) Basic BGP Configuration

Public network loopback addresses 1.1.1.1, 2.2.2.2, and 3.3.3.3 are configured on the PE1, the PE2, and the PE3 respectively. An ISIS protocol is enabled on the provider public network to advertise loopback addresses to each other. BGP neighbors are configured on the PE1, the PE2, and the PE3, so that every two of the PE1, the PE2, and the PE3 establish a neighbor relationship with each other based on the loopback addresses, and each BGP neighbor is enabled to advertise the BGP route in this embodiment of this application.

(3) BIER VPN ID and P-Tunnel Configuration

Configuration example corresponding to PE1;
    bier vpn-id 1.1.1.1
    bier vpn-instance bier_vpn
pmsi tunnel
sub-domain 0 bsl 256 #Select underlay BIER MPLS
    sub-domain
Configuration example corresponding to PE2;
    bier vpn-id 2.2.2.2
bier vpn-instance bier_vpn
    pmsi tunnel
        sub-domain 0 bsl 256 #Select underlay BIER MPLS
            sub-domain
Configuration example corresponding to PE3;
    bier vpn-id 3.3.3.3
bier vpn-instance bier_vpn
    pmsi tunnel
        sub-domain 0 bsl 256 #Select underlay BIER MPLS
            sub-domain In addition, ISIS and BIER MPLS also needs to be configured between PE-P-PE devices in the provider public network to establish a public network BIER MPLS multicast tunnel.

Through the foregoing configurations, the PE1, the PE2, and the PE3 trigger sending of BIER VPN auto discovery routes to each other:

A6: The PE1 receives a BIER VPN auto discovery route from the PE2, where the RD is 1:1, the BIER VPN ID is 2.2.2.2, and the route carries a PTA attribute of the BIER MPLS type, where a sub-domain carried in the attribute is 0, a BSL is 256, a BFR ID is 2, and a vpn-label is an upstream label allocated by the PE2 for a corresponding BIER VPN instance and is set to 200. The PE1 receives a BIER VPN auto discovery route from the PE3, where the RD is 1:1, the BIER VPN ID is 3.3.3.3, and the route carries a PTA attribute of the BIER MPLS type, where a sub-domain carried in the attribute is 0, a BSL is 256, a BFR ID is 3, and a vpn-label is an upstream label allocated by the PE3 for a corresponding BIER VPN instance and is set to 300.

B6: The PE2 receives a BIER VPN auto discovery route from the PE1, where the RD is 1:1, the BIER VPN ID is 1.1.1.1, and the route carries a PTA attribute of the BIER MPLS type, where a sub-domain carried in the attribute is 0, a BSL is 256, a BFR ID is 1, and a vpn-label is an upstream label allocated by the PE1 for a corresponding BIER VPN instance and is set to 100. The PE2 receives a BIER VPN auto discovery route from the PE3, where the RD is 1:1, the BIER VPN ID is 3.3.3.3, and the route carries a PTA attribute of the BIER MPLS type, where a sub-domain carried in the attribute is 0, a BSL is 256, a BFR ID is 3, and a vpn-label is an upstream label allocated by the PE3 for a corresponding BIER VPN instance and is set to 300.

C6: The PE3 receives a BIER VPN auto discovery route from the PE1, where the RD is 1:1, the BIER VPN ID is 1.1.1.1, and the route carries a PTA attribute of the BIER MPLS type, where a sub-domain carried in the attribute is 0, a BSL is 256, a BFR ID is 1, and a vpn-label is an upstream label allocated by the PE1 for a corresponding BIER VPN instance and is set to 100. The PE3 receives a BIER VPN auto discovery route from the PE2, where the RD is 1:1, the BIER VPN ID is 2.2.2.2, and the route carries a PTA attribute of the BIER MPLS type, where a sub-domain carried in the attribute is 0, a BSL is 256, a BFR ID is 2, and a vpn-label is an upstream label allocated by the PE2 for a corresponding BIER VPN instance and is set to 200.

(4) Configure BIER Sub-Domain 0 on PE1/PE2/PE3 and Enable ISIS and BGP BIER Prefix Advertisement

Configuration example;
bier vpn-instance bier_vpn
  sub-domain 0
    bfr-interface loopback 0
    encapsulation-type mpls bsl 64 max-si 255
    protocol isis
    protocol bgp Through the foregoing configurations, the PE1 sends BFR prefixes and BIER MPLS encapsulation information of the CE1 and the CE4 to the PE2 and the PE3, the PE2 sends BFR prefixes and BIER MPLS encapsulation information of the CE2 and the CE3 to the PE1 and the PE3, and the PE3 sends the BFR prefixes and the BIER MPLS encapsulation information of the CE2 and the CE3 to the PE2 and the PE1.

(5) Configure priority value of BFR prefix of CE2 on PE2
It is assumed that the BFR prefix of the CE2 is 10.1.1.2
Configuration example corresponding to PE2;
acl 100
  rule permit source 10.1.1.2 32;
    bier vpn-instance bier_vpn
    prefix acl 100 forwarding priority 2

Through the configuration of the priority value, a priority value carried in the BFR prefix of the CE2 sent by the PE2 to the PE1 and the PE3 is 2, no priority value is carried in a BFR prefix of the CE3 sent by the PE2 to the PE1 and the PE3, and no priority value is carried in the BFR prefixes of the CE2 and the CE3 sent by the PE3 to the PE2 and the PE1. The priority value of the prefix configured on the PE2 is 2, which is higher than a default forwarding priority. Therefore, when the PE2 and the PE3 perform forwarding priority negotiation, the prefix of the CE2 has a forwarding priority on the PE2. Because both the PE2 and the PE3 use a default priority value for the prefix of the CE3, a device with a larger BIER VPN ID has a higher forwarding priority, so that the prefix of the CE3 has a forwarding priority on the PE3.

Forwarding relationships formed on the PE1, the PE2, and the PE3 based on the foregoing service deployment are respectively as follows:

When the PE1 sends a customer BIER packet to a remote site, a bit mask in a corresponding forwarding relationship table is 0110, a multicast tunnel used is a BIER MPLS tunnel, a bit string in an encapsulated public network BIER header is 0110, and a VPN label in the public network BIER header is 100. When the PE1 receives a customer BIER packet sent by a remote site, a preferential forwarding bit mask used by the PE1 is 1001 (for the CE1 and the CE4, only the PE1 receives advertisements from the local site, so that the PE1 has a forwarding priority for the CE1 and the CE4, and a bit corresponding to the BFR ID of the CE1 and a bit corresponding to the BFR ID of the CE4 in the preferential forwarding bit mask are set).

When the PE2 sends a customer BIER packet to a remote site, a bit mask in a corresponding forwarding relationship table is 1001, a multicast tunnel used is a BIER MPLS tunnel, a bit string in an encapsulated public network BIER header is 0101, and a VPN label in the public network BIER header is 200. When the PE2 receives a customer BIER packet sent by a remote site, a preferential forwarding bit mask used by the PE2 is 0010.

When the PE3 sends a customer BIER packet to a remote site, a bit mask in a corresponding forwarding relationship table is 1001, a multicast tunnel used is a BIER MPLS tunnel, a bit string in an encapsulated public network BIER header is 0011, and a VPN label in the public network BIER header is 300. When the PE2 receives a customer BIER packet sent by a remote site, a preferential forwarding bit mask used by the PE2 is 0100.

Figure 31:
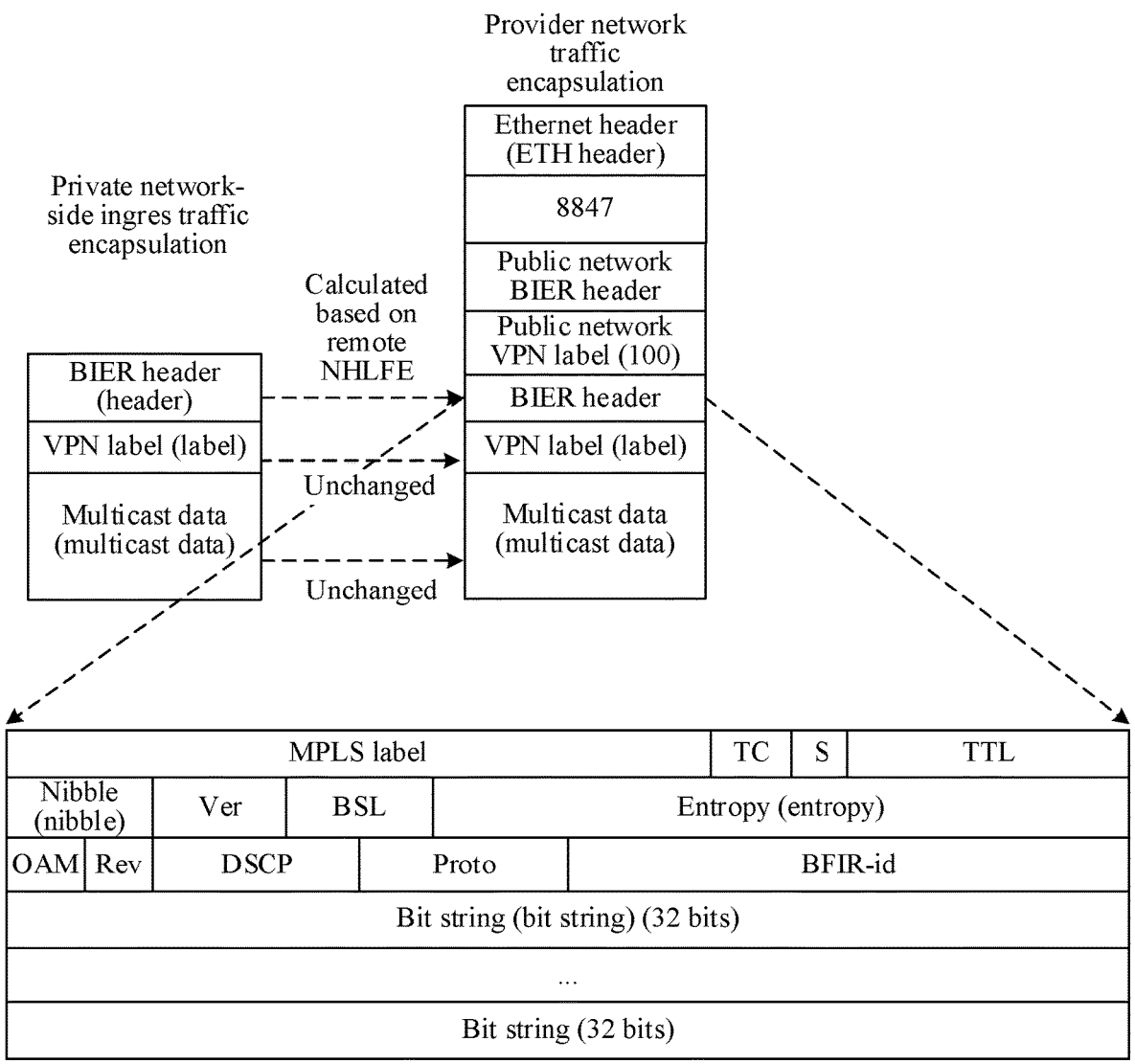
FIG. 31 is a schematic diagram of another mapping relationship between private network BIER traffic encapsulation and public network encapsulation on a PE1 for traffic sent by a multicast source according to an embodiment of this application.

Through the foregoing configuration deployment, a mapping relationship between private network BIER traffic encapsulation and public network encapsulation on a PE1 for traffic sent by a multicast source is shown in FIG. 31. A public network VPN label is used for determining a VPN. The PE1 encapsulates the public network VPN label in a public network BIER packet when encapsulating a whole customer BIER packet (including a BIER header) in a public network P-tunnel. After the customer BIER header and a customer VPN label are placed in the public network P-tunnel, and after receiving data from the public network P-tunnel and decapsulating the data, another PE determines the VPN instance based on the public network VPN label, searches for a BIER forwarding relationship in the BIER VPN instance, and sends a data stream to the user equipment in the local site.

Scenario 7: BIERv6 Over BIERv6

BIERv6 over BIERv6 means that BIERv6 is used between a customer network and a PE thereof, and BIERv6 is used between PEs, that is, a BIER encapsulation type of the customer network is BIERv6, and a type of the provider public network multicast tunnel is BIERv6.

Figure 32:
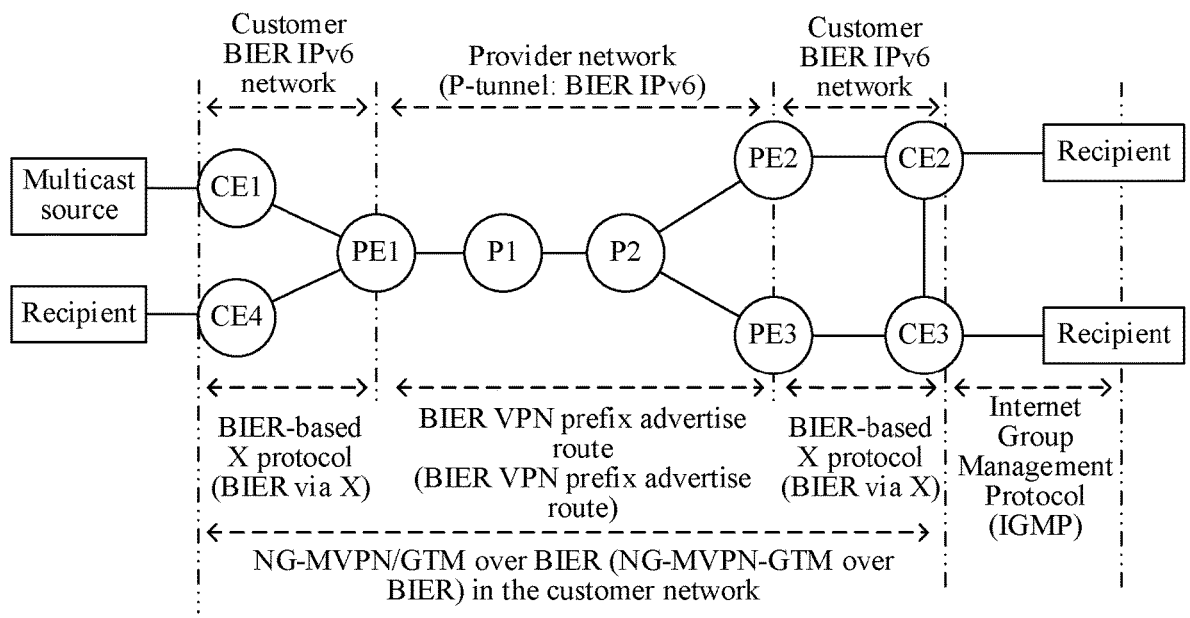
FIG. 32 is a diagram of another implementation environment of packet transmission according to an embodiment of this application.

For example, as shown in FIG. 32, in this embodiment, the customer network performs BIER IPv6 encapsulation and carries BIER information through ISIS signaling, and a BIER IPv6 public network multicast tunnel is used between provider PEs. In this embodiment, an example in which BFR IDs of devices CE1, CE2, CE3, and CE4 in the customer BIER network are respectively 1, 2, 3, and 4 and the BFR IDs are all located in a sub-domain 0 is used. BFR IDs of a PE1, a PE2, and a PE3 in a BIER MPLS tunnel of the provider network public network are 1, 2, and 3 respectively, the BFR IDs are all located in the sub-domain 0 in the provider public network, and ISIS signaling is used for advertising public network BIER encapsulation information. Before the packet transmission method provided in embodiments of this application is performed, the following several configurations may be performed.

(1) Basic BIER VPN Configuration

RD and RT information of a VPN instance in which a BIER VPN is located are configured on a PE1, a PE2, and a PE3 respectively. For example, on the PE1, the RD of the BIER VPN is configured to be 1:1, and both an import RT and an export RT are configured to be 1:1; on the PE2, the RD of the BIER VPN is configured to be 1:1, both the import RT and the export RT are configured to be 1:1; and on the PE3, the RD of the BIER VPN is configured to be 1:1, and both the import RT and the export RT are configured to be 1:1.

(2) Basic BGP Configuration

Public network loopback addresses 1::1, 2::2, and 3::3 are configured on the PE1, the PE2, and the PE3 respectively. An ISIS protocol is enabled on the provider public network to advertise loopback addresses to each other. BGP neighbors are configured on the PE1, the PE2, and the PE3, so that every two of the PE1, the PE2, and the PE3 establish a neighbor relationship with each other based on the loopback addresses, and each BGP neighbor is enabled to advertise the BGP route in the solution of the present invention.

(3) BIER VPN ID and P-Tunnel Configuration

Configuration example corresponding to PE1;
bier ipv6-vpn-id 1::1
address pool pe1 11::/64 #Configure address pool used by BS-id
bier vpn-instance bier_vpn
   bs-id pool pe1 11::1 #Configure BS-id used by BIER VPN
pmsi tunnel
sub-domain 0 bsl 256 #Select underlay BIER IPv6 sub-domain
Configuration example corresponding to PE2;
bier ipv6-vpn-id 2::2
address pool pe1 22::/64 #Configure address pool used by BS-id
bier vpn-instance bier_vpn
bs-id pool pe1 22::2 #Configure BS-id used by BIER VPN
pmsi tunnel
sub-domain 0 bsl 256 #Select underlay BIER IPv6 sub-domain

Configuration example corresponding to PE3;
bier ipv6-vpn-id 3::3
address pool pe1 33::/64 #Configure address pool used by BS-id
bier vpn-instance bier_vpn
bs-id pool pe1 33::3 #Configure BS-id used by BIER VPN
pmsi tunnel
   sub-domain 0 bsl 256 #Select underlay BIER IPv6 sub-domain In addition, ISIS and BIER IPv6 also needs to be configured between PE-P-PE devices in the provider public network to establish a public network BIER IPv6 multicast tunnel.

Through the foregoing configurations, the PE1, the PE2, and the PE3 trigger sending of BIER VPN auto discovery routes to each other:

A7: The PE1 receives a BIER VPN auto discovery route from the PE2, where the RD is 1:1, the BIER VPN ID is 2::2, the route carries a PTA attribute of the BIER IPv6 type, where a sub-domain carried in the attribute is 0, a BSL is 256, and a BFR ID is 2, and the route further carries a BS-id attribute, where the attribute carries an IPv6 address of 22::2. The PE1 receives a BIER VPN auto discovery route from the PE3, where the RD is 1:1, the BIER VPN ID is 3::3, the route carries a PTA attribute of the BIER IPv6 type, where a sub-domain carried in the attribute is 0, a BSL is 256, and a BFR ID is 3, and the route further carries a BS-id attribute, where the attribute carries an IPv6 address of 33::3.

B7: The PE2 receives a BIER VPN auto discovery route from the PE1, where the RD is 1:1, the BIER VPN ID is 1::1, the route carries a PTA attribute of the BIER IPv6 type, where a sub-domain carried in the attribute is 0, a BSL is 256, and a BFR ID is 1, and the route further carries a BS-id attribute, where the attribute carries an IPv6 address of 11::1. The PE2 receives a BIER VPN auto discovery route from the PE3, where the RD is 1:1, the BIER VPN ID is 3::3, the route carries a PTA attribute of the BIER IPv6 type, where a sub-domain carried in the attribute is 0, a BSL is 256, and a BFR ID is 3, and the route further carries a BS-id attribute, where the attribute carries an IPv6 address of 33::3.

C7: The PE3 receives a BIER VPN auto discovery route from the PE1, where the RD is 1:1, the BIER VPN ID is 1::1, the route carries a PTA attribute of the BIER IPv6 type, where a sub-domain carried in the attribute is 0, a BSL is 256, and a BFR ID is 1, and the route further carries a BS-id attribute, where the attribute carries an IPv6 address of 11::1. The PE3 receives a BIER VPN auto discovery route from the PE2, where the RD is 1:1, the BIER VPN ID is 2::2, the route carries a PTA attribute of the BIER IPv6 type, where a sub-domain carried in the attribute is 0, a BSL is 256, and a BFR ID is 2, and the route further carries a BS-id attribute, where the attribute carries an IPv6 address of 22::2.

(4) Configure BIER Sub-Domain 0 on PE1/PE2/PE3 and Enable ISIS and BGP BIER Prefix Advertisement
Configuration example;
bier vpn-instance bier_vpn
  sub-domain 0 ipv6
    bfr-interface loopback 0
    encapsulation-type ipv6 bsl 64 max-si 255
    protocol isis
    protocol bgp Through the foregoing configurations, the PE1 sends BFR prefixes and BIER IPv6 encapsulation information of the CE1 and the CE4 to the PE2 and the PE3, the PE2 sends BFR prefixes and BIER IPv6 encapsulation information of the CE2 and the CE3 to the PE1 and the PE3, and the PE3 sends the BFR prefixes and the BIER IPv6 encapsulation information of the CE2 and the CE3 to the PE2 and the PE1.

(5) Configure Priority Value of BFR Prefix of CE2 on PE2

It is assumed that the BFR prefix of the CE2 is 10::1:2

Configuration example corresponding to PE2;
acl 100
   rule permit source 10::1:2 128;
bier vpn-instance bier_vpn
   prefix acl 100 forwarding priority 2

Through the configuration of the priority value, a priority value carried in the BFR prefix of the CE2 sent by the PE2 to the PE1 and the PE3 is 2, no priority value is carried in a BFR prefix of the CE3 sent by the PE2 to the PE1 and the PE3, and no priority value is carried in the BFR prefixes of the CE2 and the CE3 sent by the PE3 to the PE2 and the PE1. The priority value of the prefix configured on the PE2 is 2, which is higher than a default forwarding priority. Therefore, when the PE2 and the PE3 perform forwarding priority negotiation, the prefix of the CE2 has a forwarding priority on the PE2. Because both the PE2 and the PE3 use a default priority value for the prefix of the CE3, a device with a larger BIER VPN ID has a higher forwarding priority, so that the prefix of the CE3 has a forwarding priority on the PE3.

Forwarding relationships formed on the PE1, the PE2, and the PE3 based on the foregoing service deployment are respectively as follows:

When the PE1 sends a customer BIER packet to a remote site, a bit mask in a corresponding forwarding relationship table is 0110, a multicast tunnel used is a BIER MPLS tunnel, a bit string in an encapsulated public network BIER header is 0110, and a source IP address in a public network IPv6 header is 11::1. When the PE1 receives a customer BIER packet sent by a remote site, a preferential forwarding bit mask used by the PE1 is 1001 (for the CE1 and the CE4, only the PE1 receives advertisements from the local site, so that the PE1 has a forwarding priority for the CE1 and the CE4, and a bit corresponding to the BFR ID of the CE1 and a bit corresponding to the BFR ID of the CE4 in the preferential forwarding bit mask are set).

When the PE2 sends a customer BIER packet to a remote site, a bit mask in a corresponding forwarding relationship table is 1001, a multicast tunnel used is a BIER MPLS tunnel, a bit string in an encapsulated public network BIER header is 0101, and a source IP address in a public network IPv6 header is 22::2. When the PE2 receives a customer BIER packet sent by a remote site, a preferential forwarding bit mask used by the PE2 is 0010.

When the PE3 sends a customer BIER packet to a remote site, a bit mask in a corresponding forwarding relationship table is 1001, a multicast tunnel used is a BIER MPLS tunnel, a bit string in an encapsulated public network BIER header is 0011, and a source IP address in a public network IPv6 header is 33::3. When the PE2 receives a customer BIER packet sent by a remote site, a preferential forwarding bit mask used by the PE2 is 0100.

Figure 33:
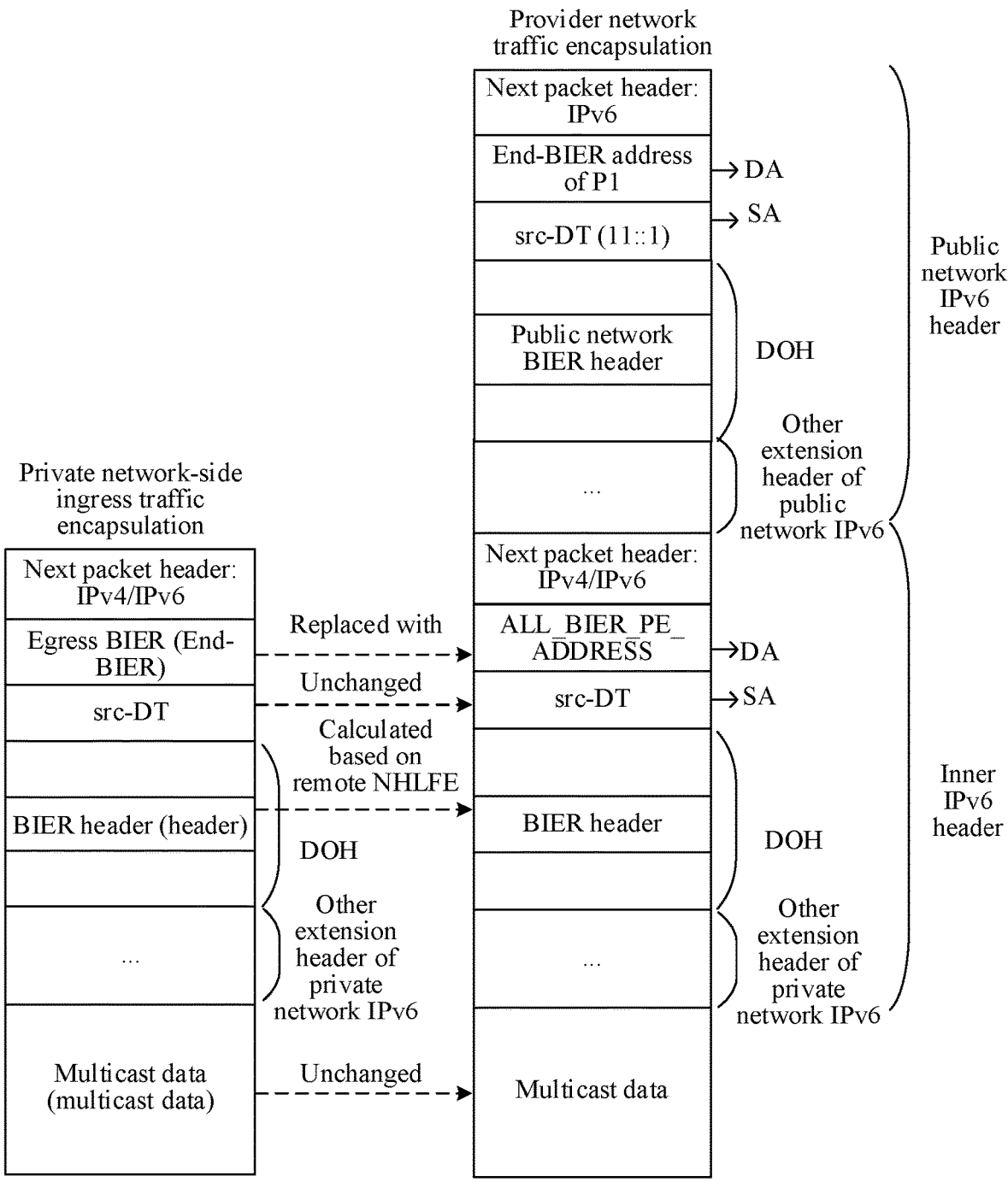
FIG. 33 is a schematic diagram of another mapping relationship between private network BIER traffic encapsulation and public network encapsulation on a PE1 for traffic sent by a multicast source according to an embodiment of this application.

Through the foregoing configuration deployment, a mapping relationship between private network BIER traffic encapsulation and public network encapsulation on a PE1 for traffic sent by a multicast source is shown in FIG. 33. An outer src-DT is used for determining a VPN instance. ALL_BIER_PE_ADDRESS is a reserved multicast address. The PE1 encapsulates ALL_BIER_PE_ADDRESS in a destination address of a customer BIER IPv6 header when encapsulating a whole customer BIER packet (including a BIER header) in a public network P-tunnel. After receiving the BIER packet from the public network P-tunnel and performing data decapsulation, another PE determines the VPN instance based on the outer src-DT, identifies the specific IPv6 multicast address, searches for a BIER IPv6 forwarding relationship in the BIER VPN instance, and sends a data stream to the user equipment in the local site.

Scenario 8: BIER MPLS Over BIERv6

BIER MPLS over BIERv6 means that BIER MPLS is used between a customer network and a PE thereof, and BIERv6 is used between PEs, that is, a BIER encapsulation type of the customer network is BIER MPLS, and a type of the provider public network multicast tunnel is BIERv6.

Figure 34:
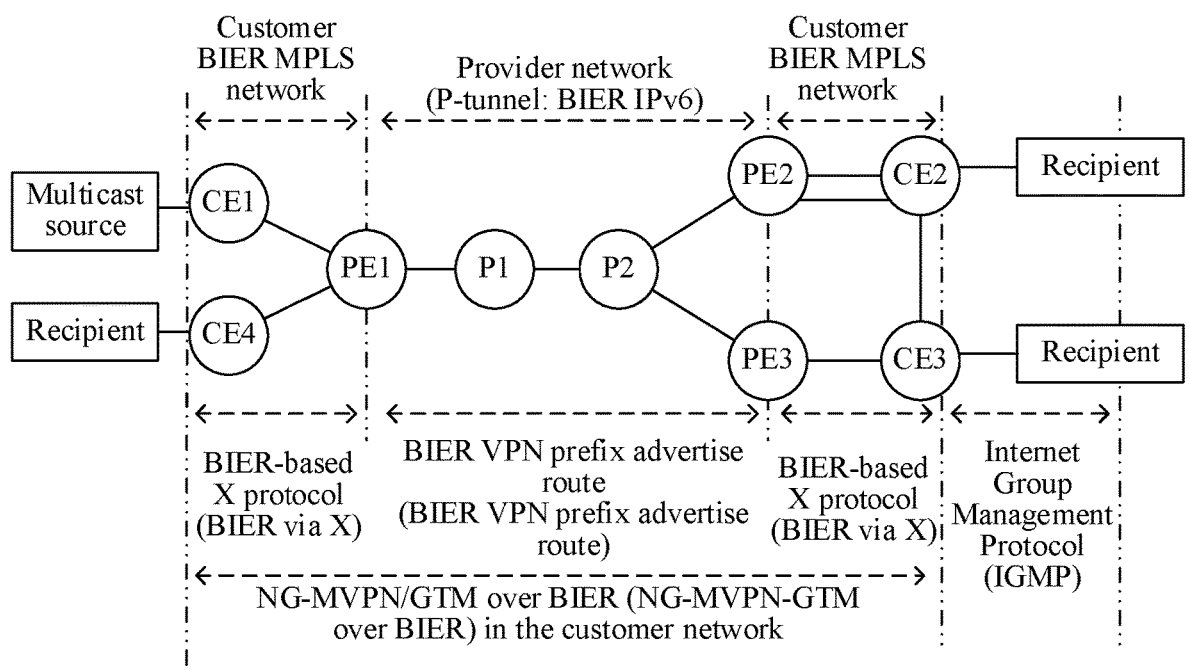
FIG. 34 is a diagram of another implementation environment of packet transmission according to an embodiment of this application.

For example, as shown in FIG. 34, in this embodiment, the customer network performs BIER MPLS encapsulation and carries BIER information through ISIS signaling, and a BIER IPv6 public network multicast tunnel is used between provider PEs. In this embodiment, an example in which BFR IDs of devices CE1, CE2, CE3, and CE4 in the customer BIER network are respectively 1, 2, 3, and 4 and the BFR IDs are all located in a sub-domain 0 is used. BFR IDs of a PE1, a PE2, and a PE3 in a BIER MPLS tunnel of the provider network public network are 1, 2, and 3 respectively, the BFR IDs are all located in the sub-domain 0 in the provider public network, and ISIS signaling is used for advertising public network BIER encapsulation information. Before the packet transmission method provided in embodiments of this application is performed, the following several configurations may be performed.

(1) Basic BIER VPN Configuration

RD and RT information of a VPN instance in which a BIER VPN is located are configured on a PE1, a PE2, and a PE3 respectively. For example, on the PE1, the RD of the BIER VPN is configured to be 1:1, and both an import RT and an export RT are configured to be 1:1; on the PE2, the RD of the BIER VPN is configured to be 1:1, both the import RT and the export RT are configured to be 1:1; and on the PE3, the RD of the BIER VPN is configured to be 1:1, and both the import RT and the export RT are configured to be 1:1.

(2) Basic BGP Configuration

Public network loopback addresses 1::1, 2::2, and 3::3 are configured on the PE1, the PE2, and the PE3 respectively. An ISIS protocol is enabled on the provider public network to advertise loopback addresses to each other. BGP neighbors are configured on the PE1, the PE2, and the PE3, so that every two of the PE1, the PE2, and the PE3 establish a neighbor relationship with each other based on the loopback addresses, and each BGP neighbor is enabled to advertise the BGP route in this embodiment of this application.

(3) BIER VPN ID and P-Tunnel Configuration

Configuration example corresponding to PE1;
bier ipv6-vpn-id 1::1
address pool pe1 11::/64 #Configure address pool used by BS-id
bier vpn-instance bier_vpn
bs-id pool pe1 11::1 #Configure BS-id used by BIER VPN
pmsi tunnel
sub-domain 0 bsl 256 #Select underlay BIER IPv6 sub-domain
Configuration example corresponding to PE2;
bier ipv6-vpn-id 2::2
address pool pe1 22::/64 #Configure address pool used by BS-id
bier vpn-instance bier_vpn
bs-id pool pe1 22::2 #Configure BS-id used by BIER VPN
pmsi tunnel
sub-domain 0 bsl 256 #Select underlay BIER IPv6 sub-domain

Configuration example corresponding to PE3;
bier ipv6-vpn-id 3::3
address pool pe1 33::/64 #Configure address pool used by BS-id
bier vpn-instance bier_vpn
bs-id pool pe1 33::3 #Configure BS-id used by BIER VPN pmsi tunnel
sub-domain 0 bsl 256 #Select underlay BIER IPv6 sub-domain In addition, ISIS and BIER IPv6 also needs to be configured between PE-P-PE devices in the provider public network to establish a public network BIER IPv6 multicast tunnel.

Through the foregoing configurations, the PE1, the PE2, and the PE3 trigger sending of BIER VPN auto discovery routes to each other:

- A8: The PE1 receives a BIER VPN auto discovery route from the PE2, where the RD is 1:1, the BIER VPN ID is 2::2, the route carries a PTA attribute of the BIER IPv6 type, where a sub-domain carried in the attribute is 0, a BSL is 256, and a BFR ID is 2, and the route further carries a BS-id attribute, where the attribute carries an IPv6 address of 22::2. The PE1 receives a BIER VPN auto discovery route from the PE3, where the RD is 1:1, the BIER VPN ID is 3::3, the route carries a PTA attribute of the BIER IPv6 type, where a sub-domain carried in the attribute is 0, a BSL is 256, and a BFR ID is 3, and the route further carries a BS-id attribute, where the attribute carries an IPv6 address of 33::3.
- B8: The PE2 receives a BIER VPN auto discovery route from the PE1, where the RD is 1:1, the BIER VPN ID is 1::1, the route carries a PTA attribute of the BIER IPv6 type, where a sub-domain carried in the attribute is 0, a BSL is 256, and a BFR ID is 1, and the route further carries a BS-id attribute, where the attribute carries an IPv6 address of 11::1. The PE2 receives a BIER VPN auto discovery route from the PE3, where the RD is 1:1, the BIER VPN ID is 3::3, the route carries a PTA attribute of the BIER IPv6 type, where a sub-domain carried in the attribute is 0, a BSL is 256, and a BFR ID is 3, and the route further carries a BS-id attribute, where the attribute carries an IPv6 address of 33::3.
- C8: The PE3 receives a BIER VPN auto discovery route from the PE1, where the RD is 1:1, the BIER VPN ID is 1::1, the route carries a PTA attribute of the BIER IPv6 type, where a sub-domain carried in the attribute is 0, a BSL is 256, and a BFR ID is 1, and the route further carries a BS-id attribute, where the attribute carries an IPv6 address of 11::1. The PE3 receives a BIER VPN auto discovery route from the PE2, where the RD is 1:1, the BIER VPN ID is 2::2, the route carries a PTA attribute of the BIER IPv6 type, where a sub-domain carried in the attribute is 0, a BSL is 256, and a BFR ID is 2, and the route further carries a BS-id attribute, where the attribute carries an IPv6 address of 22::2.

(4) Configure BIER Sub-Domain 0 on PE1/PE2/PE3 and Enable ISIS and BGP BIER Prefix Advertisement
Configuration example;
bier vpn-instance bier_vpn
  sub-domain 0
    bfr-interface loopback 0
    encapsulation-type mpls bsl 64 max-si 255
    protocol isis
    protocol bgp Through the foregoing configurations, the PE1 sends BFR prefixes and BIER MPLS encapsulation information of the CE1 and the CE4 to the PE2 and the PE3, the PE2 sends BFR prefixes and BIER MPLS encapsulation information of the CE2 and the CE3 to the PE1 and the PE3, and the PE3 sends the BFR prefixes and the BIER MPLS encapsulation information of the CE2 and the CE3 to the PE2 and the PE1.

(5) Configure Priority Value of BFR Prefix of CE2 on PE2
It is assumed that the BFR prefix of the CE2 is 10.1.1.2
Configuration example corresponding to PE2;
acl 100
   rule permit source 10.1.1.2 32;
bier vpn-instance bier_vpn
   prefix acl 100 forwarding priority 2

Through the configuration of the priority value, a priority value carried in the BFR prefix of the CE2 sent by the PE2 to the PE1 and the PE3 is 2, no priority value is carried in a BFR prefix of the CE3 sent by the PE2 to the PE1 and the PE3, and no priority value is carried in the BFR prefixes of the CE2 and the CE3 sent by the PE3 to the PE2 and the PE1. The priority value of the prefix configured on the PE2 is 2, which is higher than a default forwarding priority. Therefore, when the PE2 and the PE3 perform forwarding priority negotiation, the prefix of the CE2 has a forwarding priority on the PE2. Because both the PE2 and the PE3 use a default priority value for the prefix of the CE3, a device with a larger BIER VPN ID has a higher forwarding priority, so that the prefix of the CE3 has a forwarding priority on the PE3.

Forwarding relationships formed on the PE1, the PE2, and the PE3 based on the foregoing service deployment are respectively as follows:

When the PE1 sends a customer BIER packet to a remote site, a bit mask in a corresponding forwarding relationship table is 0110, a multicast tunnel used is a BIER MPLS tunnel, a bit string in an encapsulated public network BIER header is 0110, and a source IP address in a public network IPv6 header is 11::1. When the PE1 receives a customer BIER packet sent by a remote site, a preferential forwarding bit mask used by the PE1 is 1001 (for the CE1 and the CE4, only the PE1 receives advertisements from the local site, so that the PE1 has a forwarding priority for the CE1 and the CE4, and a bit corresponding to the BFR ID of the CE1 and a bit corresponding to the BFR ID of the CE4 in the preferential forwarding bit mask are set).

When the PE2 sends a customer BIER packet to a remote site, a bit mask in a corresponding forwarding relationship table is 1001, a multicast tunnel used is a BIER MPLS tunnel, a bit string in an encapsulated public network BIER header is 0101, and a source IP address in a public network IPv6 header is 22::2. When the PE2 receives a customer BIER packet sent by a remote site, a preferential forwarding bit mask used by the PE2 is 0010.

When the PE3 sends a customer BIER packet to a remote site, a bit mask in a corresponding forwarding relationship table is 1001, a multicast tunnel used is a BIER MPLS tunnel, a bit string in an encapsulated public network BIER header is 0011, and a source IP address in a public network IPv6 header is 33::3. When the PE2 receives a customer BIER packet sent by a remote site, a preferential forwarding bit mask used by the PE2 is 0100.

Figure 35:
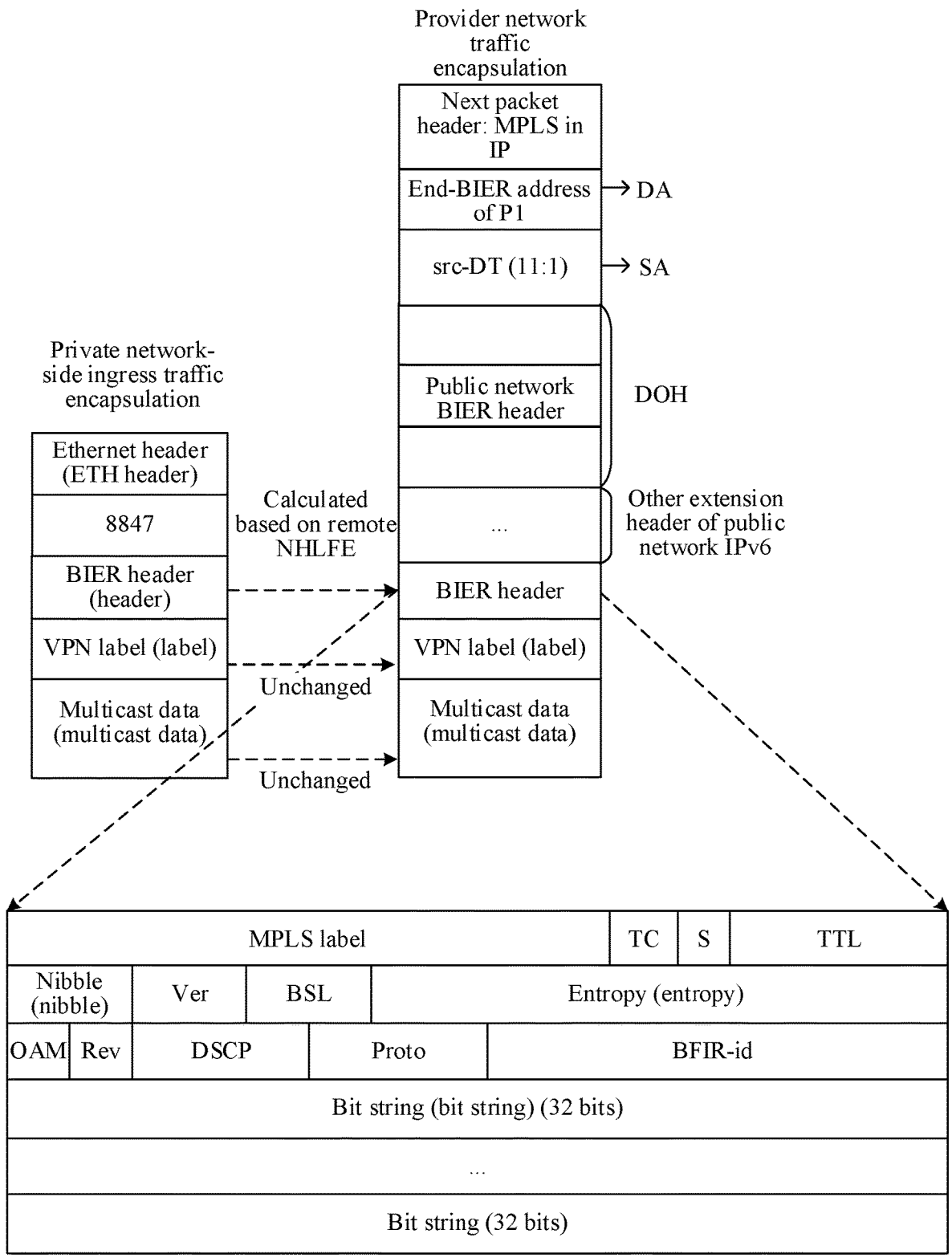
FIG. 35 is a schematic diagram of another mapping relationship between private network BIER traffic encapsulation and public network encapsulation on a PE1 for traffic sent by a multicast source according to an embodiment of this application.

Through the foregoing configuration deployment, a mapping relationship between private network BIER traffic encapsulation and public network encapsulation on a PE1 for traffic sent by a multicast source is shown in FIG. 35. An src-DT is used for determining a VPN instance. The PE1 encapsulates a customer BIER packet (including a BIER MPLS header) in an MPLS IN IP header when encapsulating the whole customer BIER packet (including a BIER header) in a public network P-tunnel. After receiving the BIER packet from the public network P-tunnel and performing data decapsulation, another PE determines the VPN instance based on the src-DT, searches for a BIER forwarding relationship in the BIER VPN instance, and sends a data stream to the user equipment in the local site.

It should be noted that, the foregoing scenario 1 to scenario 8 are all described by using an example in which BIER via X and X is an ISIS protocol.

In the method provided in this embodiment of this application, BIER is provided to a customer side as a service, so that a customer network implements interconnection and interworking across VPN sites through the BIER. A per-stream multicast forwarding status of the customer network does not need to be perceived by any node in the provider network, thereby improving flexibility and resilience of multicast service deployment.

In addition, by using a multicast tunnel to transmit a BIER packet, an occupied bandwidth can be reduced, and the network bandwidth utilization can be improved.

Figure 36:
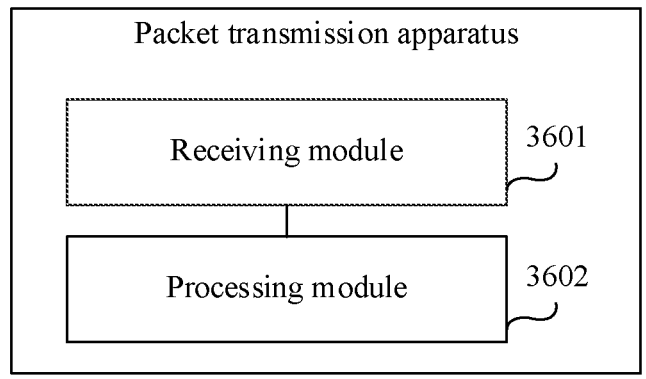
FIG. 36 is a schematic diagram of a structure of a packet transmission apparatus according to an embodiment of this application.

FIG. 36 is a schematic diagram of a packet transmission apparatus according to an embodiment of this application. The apparatus is used in a second PE, and may be configured to perform the packet transmission method performed by the second PE. For example, the apparatus may be the PE2 or the PE3 in FIG. 1 and FIG. 2, or may be the second PE in FIG. 3, and have a corresponding function, so as to perform packet transmission steps and methods. In a possible implementation, the apparatus includes the following modules and functions of the modules.

A receiving module 3601 is configured to receive, through a multicast tunnel, a BIER packet sent by a first PE, where the BIER packet includes a bit string, and the bit string indicates a customer edge CE that receives the BIER packet; and a processing module 3602 is configured to process, based on the bit string, the BIER packet sent to the CE.

In a possible implementation, the processing module 3602 is configured to determine that the second PE has a forwarding priority for the CE; and send the BIER packet to the CE based on the bit string.

In a possible implementation, the processing module 3602 is configured to obtain a router identifier of a third PE communicating with the CE; and determine, based on a router identifier of the second PE and the router identifier of the third PE, that the second PE has a forwarding priority for the CE.

In a possible implementation, the processing module 3602 is configured to obtain a priority value of a third PE communicating with the CE; and determine, based on a priority value of the second PE and the priority value of the third PE, that the second PE has a forwarding priority for the CE.

In a possible implementation, the processing module 3602 is further configured to obtain a first forwarding bit mask based on a bit-forwarding router identifier BFR ID of the CE, where the first forwarding bit mask indicates to send the BIER packet to the CE.

In a possible implementation, the processing module 3602 is configured to perform an AND operation on the bit string and the first forwarding bit mask, and send the BIER packet to the CE when a result of the AND operation is not zero.

In a possible implementation, the processing module 3602 is configured to determine that the second PE has no forwarding priority for the CE; and skip sending the BIER packet to the CE.

In a possible implementation, the processing module 3602 is configured to obtain a router identifier of a third PE communicating with the CE; and determine, based on a router identifier of the second PE and the router identifier of the third PE, that the second PE has no forwarding priority for the CE.

In a possible implementation, the processing module 3602 is configured to obtain a priority value of a third PE communicating with the CE; and determine, based on a priority value of the second PE and the priority value of the third PE, that the second PE has no forwarding priority for the CE.

In a possible implementation, the processing module 3602 is further configured to obtain a second forwarding bit mask, where the second forwarding bit mask indicates not to send the BIER packet to the CE.

In a possible implementation, the processing module 3602 is configured to perform an AND operation on the bit string and the second forwarding bit mask, and skip sending the BIER packet to the CE when a result of the AND operation is zero.

In a possible implementation, the multicast tunnel includes: an internet protocol version 6 IPv6 multicast tunnel, an internet protocol version 4 IPv4 multicast tunnel, a multiprotocol label switching MPLS multicast tunnel, a virtual extensible local area network VXLAN multicast tunnel, a BIER multicast tunnel, or an IR tunnel.

In a possible implementation, the processing module 3602 is further configured to send a routing message to the first PE, where the routing message includes a type of the multicast tunnel and an identifier of the second PE, and the identifier of the second PE is for addressing the second PE.

Figure 37:
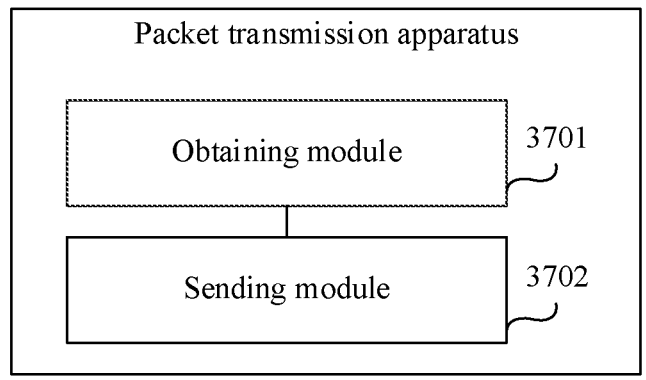
FIG. 37 is a schematic diagram of a structure of another packet transmission apparatus according to an embodiment of this application.

FIG. 37 is a schematic diagram of a packet transmission apparatus according to an embodiment of this application. The apparatus is used in a first PE, and may be configured to perform the packet transmission method performed by the first PE. For example, the apparatus may be the PE1 in FIG. 1 and FIG. 2, or may be the first PE in FIG. 3, and have a corresponding function, so as to perform packet transmission steps and methods.

In a possible implementation, the apparatus includes the following modules and functions of the modules.

An obtaining module 3701 is configured to obtain a BIER packet, where the BIER packet includes a bit string, and the bit string indicates a customer edge CE that receives the BIER packet; and a sending module 3702 is configured to send the BIER packet to a second PE corresponding to the CE through a multicast tunnel based on the bit string.

In a possible implementation, the sending module 3702 is configured to obtain an identifier of the second PE based on the bit string; perform tunnel encapsulation on the BIER packet based on the identifier of the second PE, to obtain an encapsulated BIER packet, where an encapsulation format included in the encapsulated BIER packet matches the multicast tunnel; and send the encapsulated BIER packet to the second PE through the multicast tunnel.

In a possible implementation, the multicast tunnel includes: an IPv6 multicast tunnel, an IPv4 multicast tunnel, an MPLS multicast tunnel, a VXLAN multicast tunnel, a BIER multicast tunnel, or an IR tunnel.

Figure 38:
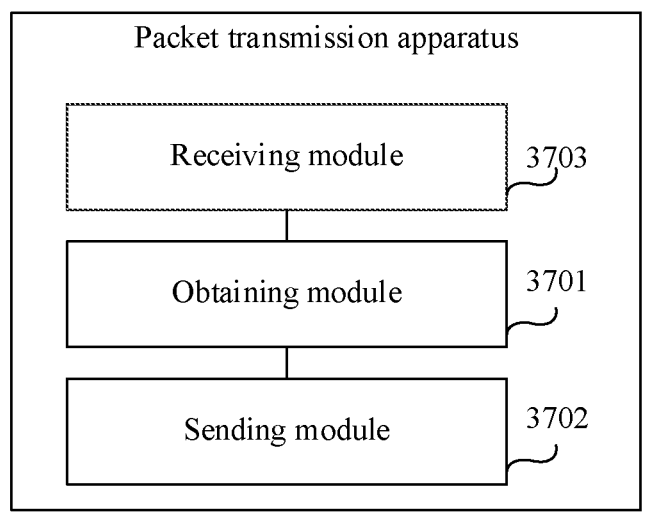
FIG. 38 is a schematic diagram of a structure of another packet transmission apparatus according to an embodiment of this application.

In a possible implementation, refer to FIG. 38. The apparatus further includes:

a receiving module 3703, configured to receive a routing message sent by the second PE, where the routing message sent by the second PE includes a type of the multicast tunnel and the identifier of the second PE, and the identifier of the second PE is for addressing the second PE.

It should be noted that, when the apparatus provided in FIG. 36 to FIG. 38 implements functions of the apparatus, it is illustrated with an example of division of each functional module. In an actual application, the functions may be allocated to and completed by different functional modules as required, that is, an internal structure of a device is divided into different functional modules, so as to complete all or some of the functions described above. In addition, the apparatus and method embodiments provided in the foregoing embodiments belong to the same concept. For a specific implementation process, refer to the method embodiments, and details are not described herein again.

Figure 39:
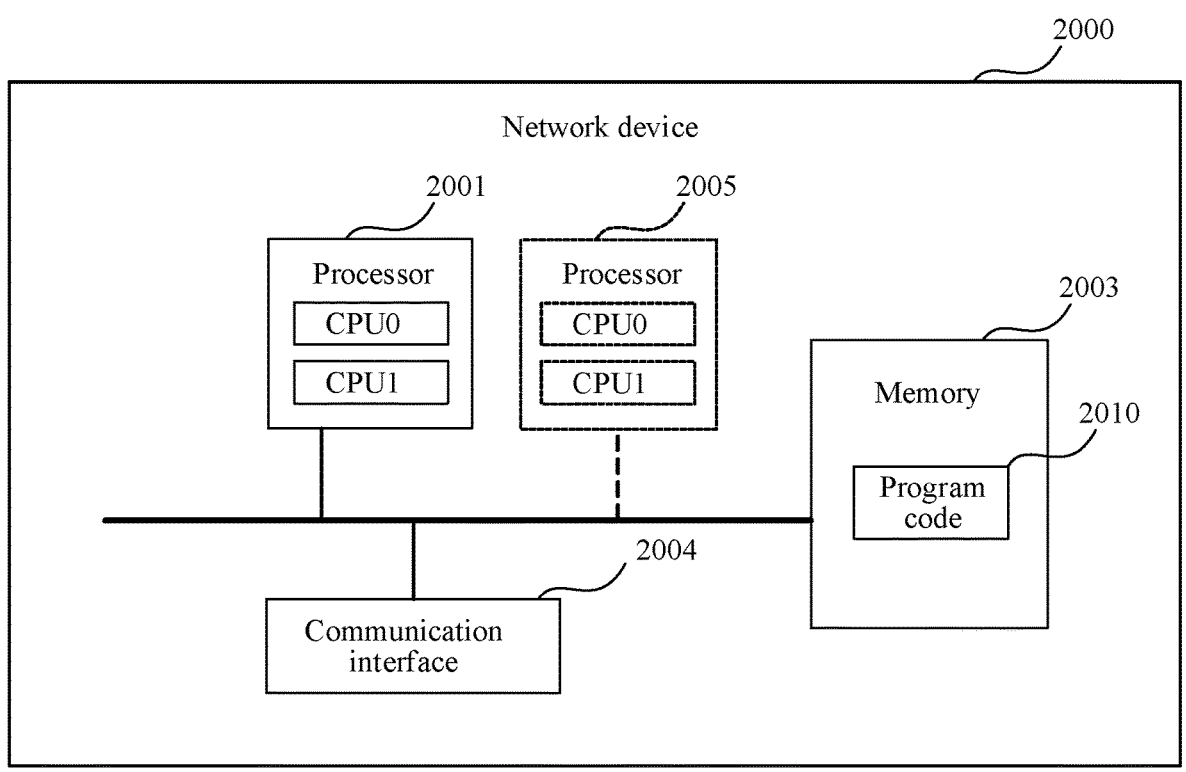
FIG. 39 is a schematic diagram of a structure of a network device according to an embodiment of this application.

FIG. 39 is a schematic diagram of a structure of a network device 2000 according to an example embodiment of this application. The network device 2000 shown in FIG. 39 may be a packet transmission device, which is configured to perform the packet transmission method shown in FIG. 3. For example, the network device 2000 may perform operations related to any device of the first PE or the second PE in the packet transmission method shown in FIG. 3. The network device 2000 is, for example, a switch or a router, and the network device 2000 may be implemented by using a general bus system structure.

As shown in FIG. 39, the network device 2000 includes at least one processor 2001, a memory 2003, and at least one communication interface 2004.

The processor 2001 is, for example, a general-purpose central processing unit (CPU), a digital signal processor (DSP), a network processor (NP), a graphics processing unit (GPU), a neural-network processing unit (NPU), a data processing unit (DPU), a microprocessor, or one or more integrated circuits configured to implement the solutions of this application. For example, the processor 2001 includes an application-specific integrated circuit (ASIC), a programmable logic device (PLD) or another programmable logic device, a transistor logic device, a hardware component, or any combination thereof. The PLD may be a complex programmable logic device (CPLD), a field programmable gate array (FPGA), generic array logic (GAL), or any combination thereof. The processor can implement or perform various logic blocks, modules, and circuits described with reference to content disclosed in embodiments of the present invention. Alternatively, the processor may be a combination for implementing a computing function, for example, a combination of one or more microprocessors, or a combination of a DSP and a microprocessor.

Optionally, the network device 2000 further includes a bus. The bus is configured to transmit information between components of the network device 2000. The bus may be a peripheral component interconnect (PCI for short) bus, an extended industry standard architecture (EISA for short) bus, or the like. The bus may be classified into an address bus, a data bus, a control bus, or the like. For ease of description, the bus in FIG. 39 is represented by using only one bold line, but which does not indicate that there is only one bus or one type of bus.

The memory 2003 may be, for example, a read-only memory (ROM) or another type of static storage device capable of storing static information and instructions, a random access memory (RAM) or another type of dynamic storage device capable of storing information and instructions, an electrically erasable programmable read-only memory (EEPROM), a compact disc read-only memory (CD-ROM), or other compact disc storage or optical disc storage (including a compressed optical disc, a laser disc, an optical disc, a digital universal optical disc, a blue-ray optical disc, and the like), a magnetic disk storage medium or another magnetic storage device, or any other medium capable of carrying or storing expected program code in a form of instructions or data structures and capable of being accessed by a computer, but is not limited thereto. The memory 2003 may exist independently, and is connected to the processor 2001 through the bus. The memory 2003 may alternatively be integrated in the processor 2001.

The communication interface 2004 is applicable to any transceiver-type apparatus, and is configured to communicate with another device or a communication network such as Ethernet, a radio access network (RAN), or a wireless local area network (WLAN). The communication interface 2004 may include a wired communication interface, and may further include a wireless communication interface. Specifically, the communication interface 2004 may be an Ethernet (ETH) interface, a fast Ethernet (FE) interface, a gigabit Ethernet (GE) interface, an asynchronous transfer mode (ATM) interface, a wireless local area network (WLAN) interface, a cellular network communication interface, or a combination thereof. The Ethernet interface may be an optical interface, an electrical interface, or a combination thereof. In this embodiment of this application, the communication interface 2004 may be used by the network device 2000 to communicate with another device.

In a specific implementation, in an embodiment, the processor 2001 may include one or more CPUs, for example, a CPU0 and a CPU1 shown in FIG. 39. Each of the processors may be a single-core (single-CPU) processor, or may be a multi-core (multi-CPU) processor. The processor herein may be one or more devices or circuits, and/or a processing core configured to process data (for example, computer program instructions).

In a specific implementation, in an embodiment, the network device 2000 may include a plurality of processors, for example, a processor 2001 and a processor 2005 shown in FIG. 39. Each of the processors may be a single-core processor (single-CPU) or may be a multi-core processor (multi-CPU). The processor herein may be one or more devices or circuits, and/or a processing core configured to process data (for example, computer program instructions).

In some embodiments, the memory 2003 is configured to store program code 2010 for executing the solutions of this application, and the processor 2001 may execute the program code 2010 stored in the memory 2003. In other words, the network device 2000 may implement the packet transmission method provided in the method embodiments by using the processor 2001 and the program code 2010 in the memory 2003. The program code 2010 may include one or more software modules. Optionally, the processor 2001 may store program code or instructions for executing the solutions of this application.

In a specific embodiment, the network device 2000 in this embodiment of this application may correspond to the first PE in the foregoing packet transmission method embodiments, and the processor 2001 in the network device 2000 reads the instructions in the memory 2003, so that the network device 2000 shown in FIG. 39 can perform all or some operations performed by the first PE.

In another example, the network device 2000 in this embodiment of this application may correspond to the second PE in the foregoing method embodiments, and the processor 2001 in the network device 2000 reads the instructions in the memory 2003, so that the network device 2000 shown in FIG. 39 can perform all or some operations performed by the second PE.

The network device 2000 may further correspond to the packet transmission apparatus shown in FIG. 36 to FIG. 38, and each functional module in the packet transmission apparatus is implemented by using software of the network device 2000. In other words, each functional module included in the packet transmission apparatus is generated after the processor 2001 of the network device 2000 reads the program code 2010 stored in the memory 2003.

The steps of the packet transmission method shown in FIG. 3 are completed by using an integrated logic circuit of hardware in the processor of the network device 2000 or instructions in a form of software. Steps of the methods disclosed with reference to embodiments of this application may be directly executed and completed by using a hardware processor, or may be executed and completed by using a combination of hardware and software modules in the processor. The software module may be stored in a storage medium that is mature in the art, such as a random access memory, a flash memory, a read-only memory, a programmable read-only memory, an electrically erasable programmable memory, or a register. The storage medium is located in the memory. The processor reads information in the memory and completes the steps of the foregoing methods in combination with hardware thereof. To avoid repetition, details are not described herein again.

Figure 40:
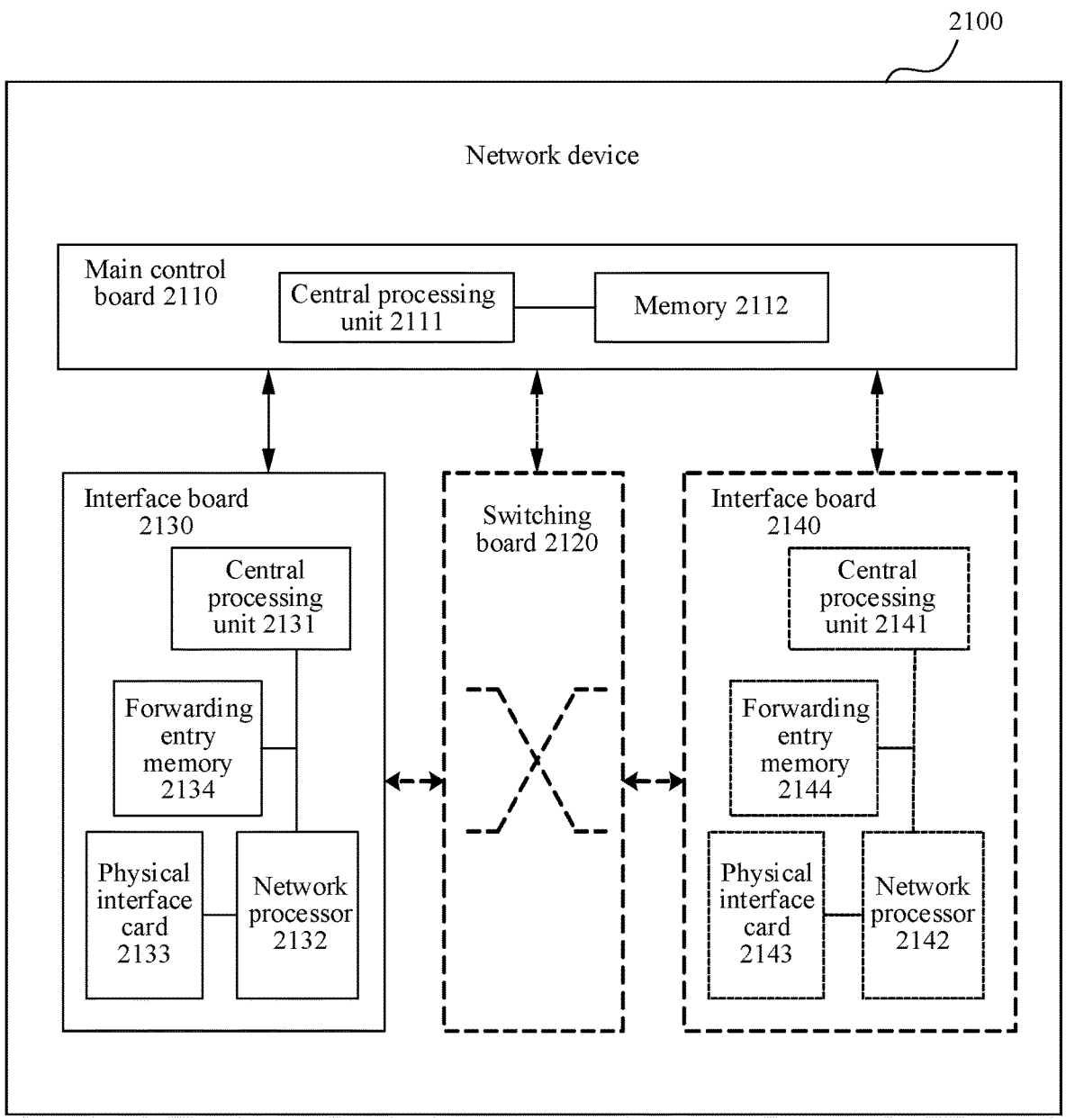
FIG. 40 is a schematic diagram of a structure of another network device according to an embodiment of this application.

FIG. 40 is a schematic diagram of a structure of a network device 2100 according to another example embodiment of this application. The network device 2100 shown in FIG. 40 may be a packet transmission device, which is configured to perform the packet transmission method shown in FIG. 3. For example, the network device 2100 may perform operations related to any device of the first PE or the second PE in the packet transmission method shown in FIG. 3. The network device 2100 is, for example, a switch or a router, and the network device 2100 may be implemented by using a general bus system structure.

As shown in FIG. 40, the network device 2100 includes a main control board 2110 and an interface board 2130.

The main control board is also referred to as a main processing unit (MPU) or a route processor card. The main control board 2110 is configured to control and manage each component in the network device 2100, and includes functions of route calculation, device management, device maintenance, and protocol processing. The main control board 2110 includes a central processing unit 2111 and a memory 2112.

The interface board 2130 is also referred to as a line processing unit (LPU), a line card, or a service board. The interface board 2130 is configured to provide various service interfaces and implement data packet forwarding. The service interface includes but is not limited to an Ethernet interface, a POS (packet over SONET/SDH) interface, and the like. The Ethernet interface is, for example, a flexible Ethernet service interface (FlexE Clients). The interface board 2130 includes: a central processing unit 2131, a network processor 2132, a forwarding entry memory 2134, and a physical interface card (PIC) 2133.

The central processing unit 2131 on the interface board 2130 is configured to control and manage the interface board 2130 and communicate with the central processing unit 2111 on the main control board 2110.

The network processor 2132 is configured to implement packet forwarding processing. A form of the network processor 2132 may be a forwarding chip. The forwarding chip may be a network processor (NP). In some embodiments, the forwarding chip may be implemented by using an application-specific integrated circuit (ASIC) or a field programmable gate array (FPGA). Specifically, the network processor 2132 is configured to: forward a received packet based on a forwarding table stored in the forwarding entry memory 2134; if a destination address field of the packet is an address of the network device 2100, continue to send the packet to an upper-layer device for processing by the CPU (for example, the central processing unit 2131); and if the destination address field of the packet is not the address of the network device 2100, search for a next hop and an outgoing interface corresponding to the destination address field from the forwarding table based on the destination address field, and forward the packet to the outgoing interface corresponding to the destination address field. Processing of an uplink packet may include: processing of an ingoing interface of the packet and searching for a forwarding table. Processing of a downlink packet may include: searching for a forwarding table, and the like. In some embodiments, the central processing unit may also perform a function of the forwarding chip, for example, implement software forwarding based on a general-purpose CPU. Therefore, the forwarding chip is not required in the interface board.

The physical interface card 2133 is configured to implement a physical layer interconnection function, so that original traffic enters the interface board 2130 through the physical interface card, and a processed packet is sent out from the physical interface card 2133. The physical interface card 2133 is also referred to as a subcard, may be installed on the interface board 2130, and is responsible for converting an optical/electrical signal into a packet, performing validity check on the packet, and forwarding the packet to the network processor 2132 for processing. In some embodiments, the central processing unit 2131 may also perform a function of the network processor 2132, for example, implement software forwarding based on a general-purpose CPU. Therefore, the network processor 2132 is not required in the physical interface card 2133.

Optionally, the network device 2100 includes a plurality of interface boards. For example, the network device 2100 further includes an interface board 2140. The interface board 2140 includes a central processing unit 2141, a network processor 2142, a forwarding entry memory 2144, and a physical interface card 2143. Functions and implementations of components in the interface board 2140 are the same as or similar to those in the interface board 2130, and details are not described herein again.

Optionally, the network device 2100 further includes a switching board 2120. The switching board 2120 may also be referred to as a switch fabric unit (SFU). When the packet transmission device has a plurality of interface boards, the switching board 2120 is configured to complete data exchange between the interface boards. For example, the interface board 2130 and the interface board 2140 may communicate with each other through the switching board 2120.

The main control board 2110 is coupled to the interface boards. For example, the main control board 2110, the interface board 2130, the interface board 2140, and the switching board 2120 are connected to a system backplane by using a system bus to implement interworking. In a possible implementation, an inter-process communication (IPC) protocol channel is established between the main control board 2110 with the interface board 2130 and the interface board 2140. The main control board 2110 communicates with the interface board 2130 and the interface board 2140 through the IPC channel.

Logically, the network device 2100 includes a control plane and a forwarding plane. The control plane includes the main control board 2110 and the central processing unit 2111. The forwarding plane includes components that perform forwarding, for example, the forwarding entry memory 2134, the physical interface card 2133, and the network processor 2132. The control plane performs functions such as a router, generating a forwarding table, processing signaling and protocol packets, and configuring and maintaining a state of a network device. The control plane delivers a generated forwarding table to the forwarding plane. On the forwarding plane, the network processor 2132 performs table look-up on and forwards, based on the forwarding table delivered by the control plane, the packet received by the physical interface card 2133. The forwarding table delivered by the control plane may be stored in the forwarding entry memory 2134. In some embodiments, the control plane and the forwarding plane may be completely separated, and are not located on a same network device.

It should be noted that there may be one or more main control boards, and when there are a plurality of main control boards, an active main control board and a standby main control board may be included. There may be one or more interface boards. A stronger data processing capability of the packet transmission device indicates more provided interface boards. Each interface board can also have one or more physical interface cards. There may be no switching board, or may be one or more switching boards. If there are a plurality of switching boards, the switching boards can implement load sharing and redundancy backup together. In a centralized forwarding architecture, the packet transmission device may not require the switching board, and the interface board takes on a service data processing function of the entire system. In a distributed forwarding architecture, the packet transmission device may have at least one switching board, and data exchange between a plurality of interface boards is implemented by using the switching board, thereby providing a large-capacity data exchange and processing capability. Therefore, a data access and processing capability of a packet transmission device in a distributed architecture is greater than that of a packet transmission device in a centralized architecture. Optionally, a form of the packet transmission device may be including only one board, that is, there is no switching board, and functions of the interface board and the main control board are integrated on the board. In this case, the central processing unit on the interface board and the central processing unit on the main control board may be combined into one central processing unit on the same board, and functions after the two central processing units are combined are performed. This form of packet transmission device has a low data exchange and processing capability (for example, network devices such as a low-end switch or router). A specific selected architecture depends on a specific networking deployment scenario, and is not limited herein.

In a specific embodiment, the network device 2100 corresponds to the packet transmission apparatus used in a second PE shown in FIG. 36. In some embodiments, the receiving module 3601 in the packet transmission apparatus shown in FIG. 36 is equivalent to the physical interface card 2133 in the network device 2100. The processing module 3602 is equivalent to the central processing unit 2111 or the network processor 2132 in the network device 2100.

In some embodiments, the network device 2100 further corresponds to the packet transmission apparatus used in a first PE shown in FIG. 37 or FIG. 38. In some embodiments, the sending module 3702 in the packet transmission apparatus shown in FIG. 37 and the receiving module 3703 in the packet transmission apparatus shown in FIG. 38 are equivalent to the physical interface card 2133 in the network device 2100. The obtaining module 3701 is equivalent to the central processing unit 2111 or the network processor 2132 in the network device 2100.

Based on the network device shown in FIG. 39 and FIG. 40, an embodiment of this application further provides a packet transmission system. The system includes a first PE and a second PE. Optionally, the first PE is the network device 2000 shown in FIG. 39 or the network device 2100 shown in FIG. 40, and the second PE is the network device 2000 shown in FIG. 39 or the network device 2100 shown in FIG. 40.

For packet transmission methods performed by the first PE and the second PE, refer to related descriptions of the first PE and the second PE in the embodiment shown in FIG. 3. Details are not described herein again.

An embodiment of this application further provides a communication apparatus. The apparatus includes a transceiver, a memory, and a processor. The transceiver, the memory, and the processor communicate with each other by using an internal connection path. The memory is configured to store instructions. The processor is configured to execute the instructions stored in the memory, to control the transceiver to receive a signal and control the transceiver to send a signal. When the processor executes the instructions stored in the memory, the processor is enabled to perform the packet transmission method that needs to be performed by the first PE.

An embodiment of this application further provides a communication apparatus. The apparatus includes a transceiver, a memory, and a processor. The transceiver, the memory, and the processor communicate with each other by using an internal connection path. The memory is configured to store instructions. The processor is configured to execute the instructions stored in the memory, to control the transceiver to receive a signal and control the transceiver to send a signal. When the processor executes the instructions stored in the memory, the processor is enabled to perform the packet transmission method that needs to be performed by the second PE.

It should be understood that, the processor may be a central processing unit (CPU), or may be another general-purpose processor, a digital signal processor (DSP), an application-specific integrated circuit (ASIC), a field programmable gate array (FPGA), or another programmable logic device, a discrete gate or a transistor logic device, a discrete hardware component, or the like. The general-purpose processor may be a microprocessor, any conventional processor, or the like. It should be noted that the processor may be a processor that supports an advanced reduced instruction set computer machine (advanced RISC machine, ARM) architecture.

Further, in an optional embodiment, the memory may include a read-only memory and a random access memory, and provide instructions and data to the processor. The memory may further include a non-volatile random access memory. For example, the memory may further store device type information.

The memory may be a volatile memory or a non-volatile memory, or include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (random access memory, RAM), used as an external cache. Through example but non-limitative descriptions, many forms of RAM are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

An embodiment of this application further provides a computer-readable storage medium. The computer-readable storage medium includes instructions or code, and when the instructions or code is executed on a computer, the computer is enabled to perform any one of the foregoing packet transmission methods.

An embodiment of this application further provides a computer program product. The computer program product includes a program or code. When the program or code is run on a computer, the computer is enabled to perform any one of the foregoing packet transmission methods.

An embodiment of this application further provides a chip, including a processor configured to invoke, from a memory, instructions stored in the memory and run the instructions, so that a communication device on which the chip is installed performs any one of the foregoing packet transmission methods.

An embodiment of this application further provides another chip, including an input interface, an output interface, a processor, and a memory. The input interface, the output interface, the processor, and the memory are connected by using an internal connection path. The processor is configured to execute code in the memory, and when the code is executed, the processor is configured to perform any one of the packet transmission methods.

All or some of the foregoing embodiments may be implemented by using software, hardware, firmware, or any combination thereof. When software is used for implementing the embodiments, the embodiments may be implemented completely or partially in a form of a computer program product. The computer program product includes one or more computer instructions. When the computer program instructions are loaded and executed on a computer, the procedure or functions according to this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk), or the like.

A person of ordinary skill in the art may be aware that, in combination with the method steps and modules described in the embodiments disclosed in this specification, the method steps and modules may be implemented by software, hardware, firmware, or any combination thereof. To clearly describe the interchangeability between the hardware and the software, the steps and compositions of each embodiment has been generally described according to functions in the foregoing descriptions. Whether the functions are executed in a mode of hardware or software depends on particular applications and design constraint conditions of the technical solutions. A person of ordinary skill in the art may use different methods to implement the described functions for each particular application, but it should not be considered that the implementation goes beyond the scope of this application.

A person of ordinary skill in the art may understand that all or some of the steps of the foregoing embodiments may be implemented by hardware, or may be implemented by a program instructing related hardware. The program may be stored in a computer-readable storage medium. The storage medium may be a read-only memory, a magnetic disk, or an optical disc.

When software is used for implementing the embodiments, the embodiments may be implemented completely or partially in a form of a computer program product. The computer program product includes one or more computer program instructions. In an example, the method of embodiments of this application may be described in the context of machine-executable instructions, and the machine-executable instructions are included in a program module that is executed in a device on a real or virtual processor of a target. In general, program modules include routines, programs, libraries, objects, classes, components, data structures, and the like, which perform specific tasks or implement specific abstract data structures. In various embodiments, functions of the program modules may be combined or split between the described program modules. The machine-executable instructions for the program modules may be executed locally or within a distributed device. In a distributed device, the program modules may be located in both local and remote storage media.

Computer program code for implementing the method of embodiments of this application may be written by using one or more programming languages. The computer program code may be provided to a processor of a general-purpose computer, a dedicated computer, or another programmable data processing apparatus, so that when the program code is executed by the computer or another programmable data processing apparatus, a function/operation specified in a flowchart and/or block diagram is implemented. The program code may be completely executed on a computer, partially executed on a computer, executed as an independent software package, partially executed on a computer and partially executed on a remote computer, or completely executed on a remote computer or server.

In the context of this embodiment of this application, computer program code or related data may be carried by any appropriate carrier, so that a device, apparatus, or processor can perform various processing and operations described above. Examples of the carriers include a signal, a computer-readable medium, and the like.

Examples of the signal may include electrical, optical, radio, acoustic, or other forms of propagated signals, such as carrier waves, infrared signals, and the like.

A computer-readable medium may be any tangible medium that includes or stores programs for or with respect to an instruction execution system, apparatus, or device. The computer-readable medium may be a machine-readable signal medium or a machine-readable storage medium. The computer-readable medium may include, but is not limited to, an electronic, magnetic, optical, electromagnetic, infrared or semiconductor system, apparatus or device, or any proper combination thereof. More detailed examples of the machine-readable storage medium include an electrical connection with one or more wires, a portable computer disk, a hard disk, a random access memory (RAM), a read-only memory (ROM), an erasable programmable read-only memory (EPROM or flash memory), an optical storage device, a magnetic storage device, or any proper combination thereof.

It may be clearly understood by a person skilled in the art that, for the purpose of convenient and brief description, for a detailed working process of the base system, device, and module described above, refer to a corresponding process in the foregoing method embodiments, and details are not described herein again.

In the several embodiments provided in this application, it should be understood that the disclosed system, apparatus, and method may be implemented in other manners. For example, the described device embodiment is merely an example. For example, the module division is merely logical function division and may be other division during actual implementation. For example, a plurality of modules or components may be combined or integrated into another system, or some features may be ignored or not performed. In addition, the displayed or discussed mutual couplings or direct couplings or communication connections may be implemented by using some interfaces. The indirect couplings or communication connections between the devices or modules may be implemented in electronic, mechanical, or other forms.

The modules described as separate parts may or may not be physically separate, and parts displayed as modules may or may not be physical modules, may be located in one position, or may be distributed on a plurality of network modules. Some or all of the modules may be selected according to actual requirements to implement the objectives of the solutions of embodiments of this application.

In addition, functional modules in embodiments of this application may be integrated into one processing module, or each of the modules may exist alone physically, or two or more modules may be integrated into one module. The integrated module may be implemented in a form of hardware, or may be implemented in a form of a software functional module.

When the integrated module is implemented in the form of a software functional module and sold or used as an independent product, the integrated module may be stored in a computer-readable storage medium. Based on such an understanding, the technical solutions of this application essentially, or the part contributing to the current technology, or all or some of the technical solutions may be implemented in a form of a software product. The software product is stored in a storage medium, and includes several instructions for instructing a computer device (which may be a personal computer, a server, a network device, or the like) to perform all or some of the steps of the method described in embodiments of this application. The foregoing storage medium includes any medium that can store program code, such as a USB flash drive, a removable hard disk, a read-only memory (ROM), a random access memory (RAM), a magnetic disk, a compact disc, or the like.

The terms "first", "second", and the like in this application are used for distinguishing between same items or similar items of which effects and functions are basically the same. It should be understood that, the "first", "second", and "$n^{th}$" do not have a dependency relationship in logic or time sequence, and a quantity and an execution order thereof are not limited. It should be further understood that, although the terms such as first and second are used for describing various elements in the following description, these elements should not be limited to these terms. These terms are merely used for distinguishing one element from another element. For example, a first image may be referred to as a second image, and similarly, a second image may be referred to as a first image without departing from the scope of the various examples. Both the first image and the second image may be images, and in some cases, may be separate and different images.

It should be further understood that, sequence numbers of the processes do not mean execution sequences in various embodiments of this application. The execution sequences of the processes should be determined based on functions and internal logic of the processes, and should not constitute any limitation on implementation processes of embodiments of this application.

The term "at least one" in this application means one or more, and the term "a plurality of" in this application means two or more. For example, a plurality of second packets means two or more second packets. The terms "system" and "network" generally may be used interchangeably in this specification.

It should be understood that, the terms used in the descriptions of the various examples in this specification are merely for describing specific examples and are not intended to impose limitations. As used in the descriptions of the various examples and the appended claims, singular forms "one ("a" and "an")" and "the" are intended to also include plural forms, unless otherwise indicated in the context clearly.

It should be further understood that, the term "and/or" used in this specification refers to and cover any and all possible combinations of one or more items of associated listed items. The term "and/or" describes an association relationship for describing associated objects and represents that three relationships may exist. For example, A and/or B may represent the following three cases: Only A exists, both A and B exist, and only B exists. In addition, the character "/" in this application generally indicates an "or" relationship between the associated objects.

It should be further understood that, the term "include" (also referred to as "includes", "including", "comprises", and/or "comprising"), when used in this specification, specifies the presence of stated features, integers, steps, operations, elements, and/or components, but do not preclude the presence or addition of one or more other features, integers, steps, operations, elements, components, and/or groups thereof.

It should be further understood that, the term "if" may be interpreted as a meaning of "when . . . " ("when" or "upon"), "in response to determining", or "in response to detecting". Similarly, based on the context, the phrase "if determining" or "if detecting (a stated condition or event)" may be interpreted as a meaning of "when determining . . . ", "in response to determining . . . ", "when detecting (a stated condition or event)", or "in response to detecting (a stated condition or event)".

However, it should be further understood that determining B based on A does not mean that determining B only based on A, and B may be determined based on A and/or other information.

It should be further understood that "one embodiment", "an embodiment", or "a possible implementation" mentioned throughout the specification means that specific features, structures, or characteristics related to the embodiment or implementation are included in at least one embodiment of this application. Therefore, "in one embodiment", "in an embodiment" or "a possible implementation" occurs in everywhere throughout the specification may not necessarily refer to the same embodiment. In addition, these specific features, structures, or characteristics may be combined in one or more embodiments in any proper manner.

The foregoing descriptions are merely optional embodiments of this application, but are not intended to limit this application. Any modification, equivalent replacement, or improvement made within the spirit and principle of this application shall fall within the protection scope of this application.

What is claimed is:

1. A packet transmission method, wherein the method comprises:
   receiving, by a second provider edge (PE) through a multicast tunnel, a bit indexed explicit replication (BIER) packet sent by a first PE, wherein the BIER packet comprises a bit string, and the bit string indicates a customer edge (CE) designated to receive the BIER packet; and
   processing, by the second PE based on the bit string, the BIER packet.

2. The method according to claim 1, wherein processing the BIER packet comprises:
   determining, by the second PE, that the second PE has a forwarding priority for the CE; and
   sending, by the second PE, the BIER packet to the CE based on the bit string.

3. The method according to claim 2, wherein determining that the second PE has the forwarding priority for the CE comprises:
   obtaining, by the second PE, a router identifier of a third PE communicating with the CE; and
   determining, by the second PE based on a router identifier of the second PE and the router identifier of the third PE, that the second PE has the forwarding priority for the CE.

4. The method according to claim 2, wherein determining that the second PE has the forwarding priority for the CE comprises:
   obtaining, by the second PE, a priority value of a third PE communicating with the CE; and
   determining, by the second PE based on a priority value of the second PE and the priority value of the third PE, that the second PE has the forwarding priority for the CE.

5. The method according to claim 3, wherein determining that the second PE has the forwarding priority for the CE further comprises:
   obtaining, by the second PE, a first forwarding bit mask based on a bit-forwarding router identifier (BFR ID) of the CE, wherein the first forwarding bit mask indicates to send the BIER packet to the CE.

6. The method according to claim 5, wherein sending the BIER packet to the CE based on the bit string comprises:
   performing, by the second PE, an AND operation on the bit string and the first forwarding bit mask; and
   sending the BIER packet to the CE when a result of the AND operation is not zero.

7. The method according to claim 1, wherein processing the BIER packet sent to the CE comprises:
   determining, by the second PE, that the second PE has no forwarding priority for the CE; and
   skipping, by the second PE, sending the BIER packet to the CE.

8. The method according to claim 7, wherein determining that the second PE has no forwarding priority for the CE comprises:
   obtaining, by the second PE, a router identifier of a third PE communicating with the CE; and
   determining, by the second PE based on a router identifier of the second PE and the router identifier of the third PE, that the second PE has no forwarding priority for the CE.

9. The method according to claim 7, wherein determining that the second PE has no forwarding priority for the CE comprises:
   obtaining, by the second PE, a priority value of a third PE communicating with the CE; and
   determining, by the second PE based on a priority value of the second PE and the priority value of the third PE, that the second PE has no forwarding priority for the CE.

10. The method according to claim 8, wherein determining that the second PE has no forwarding priority for the CE further comprises:
    obtaining, by the second PE, a second forwarding bit mask, wherein the second forwarding bit mask indicates not to send the BIER packet to the CE.

11. A packet transmission apparatus, wherein the apparatus is used in a second provider edge (PE), and the apparatus comprises:
    a memory with instructions stored thereon; and
    a processor coupled to the memory, wherein the instructions, when executed by the processor enables the processor to:
    receive, through a multicast tunnel, a bit indexed explicit replication (BIER) packet sent by a first PE, wherein the BIER packet comprises a bit string, and the bit string indicates a customer edge (CE) designated to receive the BIER packet; and
    process, based on the bit string, the BIER packet.

12. The apparatus according to claim 11, wherein the instructions, when executed by the processor further enables the processor to:
    determine that the second PE has a forwarding priority for the CE; and
    send the BIER packet to the CE based on the bit string.

13. The apparatus according to claim 12, wherein the instructions, when executed by the processor further enables the processor to:
    obtain a router identifier of a third PE communicating with the CE; and
    determine, based on a router identifier of the second PE and the router identifier of the third PE, that the second PE has the forwarding priority for the CE.

14. The apparatus according to claim 12, wherein the instructions, when executed by the processor further enables the processor to:
    obtain a priority value of a third PE communicating with the CE; and
    determine, based on a priority value of the second PE and the priority value of the third PE, that the second PE has the forwarding priority for the CE.

15. The apparatus according to claim 13, wherein the instructions, when executed by the processor further enables the processor to: obtain a first forwarding bit mask based on a bit-forwarding router identifier (BFR ID) of the CE, wherein the first forwarding bit mask indicates to send the BIER packet to the CE.

16. The apparatus according to claim 15, wherein the instructions, when executed by the processor further enables the processor to:
perform an AND operation on the bit string and the first forwarding bit mask; and
send the BIER packet to the CE when a result of the AND operation is not zero.

17. The apparatus according to claim 11, wherein the instructions, when executed by the processor further enables the processor to: determine that the second PE has no forwarding priority for the CE; and skip sending the BIER packet to the CE.

18. The apparatus according to claim 17, wherein the instructions, when executed by the processor further enables the processor to:
obtain a router identifier of a third PE communicating with the CE; and
determine, based on a router identifier of the second PE and the router identifier of the third PE, that the second PE has no forwarding priority for the CE.

19. The apparatus according to claim 17, wherein the instructions, when executed by the processor further enables the processor to:
obtain a priority value of a third PE communicating with the CE; and
determine, based on a priority value of the second PE and the priority value of the third PE, that the second PE has no forwarding priority for the CE.

20. The apparatus according to claim 18, wherein the instructions, when executed by the processor further enables the processor to: obtain a second forwarding bit mask, wherein the second forwarding bit mask indicates not to send the BIER packet to the CE.

21. A non-transitory computer readable medium with instructions stored thereon, wherein the instructions, when executed by a processor, enable the processor to:
receive, through a multicast tunnel, a bit indexed explicit replication (BIER) packet sent by a first PE, wherein the BIER packet comprises a bit string, and the bit string indicates a customer edge (CE) designated to receive the BIER packet; and
process, based on the bit string, the BIER packet.

* * * * *